(12) United States Patent
Segawa et al.

(10) Patent No.: US 10,203,740 B2
(45) Date of Patent: Feb. 12, 2019

(54) INFORMATION PROCESSING DEVICE AND SEMICONDUCTOR DEVICE

(71) Applicant: TOSHIBA MEMORY CORPORATION, Minato-ku (JP)

(72) Inventors: Junichi Segawa, Kawasaki (JP); Tatsunori Kanai, Yokohama (JP); Tetsuro Kimura, Tokyo (JP); Koichi Fujisaki, Kawasaki (JP); Masaya Tarui, Yokohama (JP); Satoshi Shirai, Kawasaki (JP); Hiroyoshi Haruki, Kawasaki (JP); Yusuke Shirota, Yokohama (JP); Akihiro Shibata, Tokyo (JP); Shiyo Yoshimura, Kawasaki (JP); Haruhiko Toyama, Kawasaki (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 31 days.

(21) Appl. No.: 14/469,697

(22) Filed: Aug. 27, 2014

(65) Prior Publication Data

US 2015/0089261 A1    Mar. 26, 2015

(30) Foreign Application Priority Data

Sep. 24, 2013   (JP) ................................ 2013-197394

(51) Int. Cl.
    *G06F 1/32*       (2006.01)
(52) U.S. Cl.
    CPC .......... *G06F 1/3215* (2013.01); *G06F 1/3203* (2013.01); *G06F 1/324* (2013.01);
    (Continued)

(58) Field of Classification Search
    CPC .... G06F 1/3203; G06F 1/3215; G06F 1/3237; G06F 1/324; G06F 1/3275; G06F 1/3296;
    (Continued)

(56) References Cited

U.S. PATENT DOCUMENTS

| 6,574,739 B1 * | 6/2003 | Kung ................... G06F 1/3203 |
| | | 713/320 |
| 6,934,870 B1 * | 8/2005 | Amos ....................... G06F 1/04 |
| | | 713/300 |

(Continued)

FOREIGN PATENT DOCUMENTS

| JP | 3758477 | 2/2002 |
| JP | 2002-82743 | 3/2002 |

(Continued)

OTHER PUBLICATIONS

Taiwanese Office Action for Taiwanese Patent Application No. 103129230 dated Nov. 25, 2015.

*Primary Examiner* — Fahmida Rahman
(74) *Attorney, Agent, or Firm* — Oblon, McClelland, Maier & Neustadt, L.L.P.

(57) ABSTRACT

According to an embodiment, an information processing device includes a memory device, one or more peripheral devices, a processor, and a state controller. The processor is able to change between a first state, in which a command is executed, and a second state, in which an interrupt is awaited. When the processor enters the second state and if an operation for data transfer is being performed between at least one of the peripheral devices and the memory device, the state controller switches the information processing device to a third state in which power consumption is lower as compared to the first state. If the operation for data transfer is not being performed between any of the peripheral devices and the memory device, the state controller (Continued)

switches the information processing device to a fourth state in which power consumption is lower as compared to the third state.

25 Claims, 33 Drawing Sheets

(52) U.S. Cl.
CPC .......... *G06F 1/3237* (2013.01); *G06F 1/3275* (2013.01); *G06F 1/3296* (2013.01); *Y02B 60/1217* (2013.01); *Y02B 60/1221* (2013.01); *Y02B 60/1228* (2013.01); *Y02B 60/1285* (2013.01); *Y02D 10/126* (2018.01); *Y02D 10/128* (2018.01); *Y02D 10/14* (2018.01); *Y02D 10/172* (2018.01)

(58) Field of Classification Search
CPC ............ Y02B 60/1217; Y02B 60/1221; Y02B 60/1228; Y02B 60/1285; Y02D 10/126; Y02D 10/128; Y02D 10/14; Y02D 10/172
See application file for complete search history.

(56) References Cited

U.S. PATENT DOCUMENTS

| | | | |
|---|---|---|---|
| 7,254,667 B2 * | 8/2007 | Tran ................. | G06F 13/28 711/100 |
| 7,360,106 B2 | 4/2008 | Kato et al. | |
| 2005/0050312 A1 * | 3/2005 | Oshiba .................. | G06F 1/24 713/1 |
| 2005/0210312 A1 | 9/2005 | Maruichi et al. | |
| 2006/0236125 A1 * | 10/2006 | Sahita ................. | G06F 12/1458 713/193 |
| 2007/0130382 A1 * | 6/2007 | Moll .................. | G06F 12/0835 710/22 |
| 2008/0215836 A1 * | 9/2008 | Sutoh ................. | G06F 11/1451 711/162 |
| 2009/0132839 A1 * | 5/2009 | Rothman ............. | G06F 1/3209 713/320 |
| 2010/0027314 A1 * | 2/2010 | Chevallier ............. | G11C 5/02 365/148 |
| 2010/0106989 A1 * | 4/2010 | Chen .................... | G06F 1/3228 713/322 |
| 2010/0325457 A1 | 12/2010 | Lachwani et al. | |
| 2011/0283071 A1 * | 11/2011 | Yokoya ................ | G06F 1/3275 711/162 |
| 2011/0296211 A1 | 12/2011 | Ramaraju et al. | |
| 2012/0194283 A1 | 8/2012 | Funakawa et al. | |
| 2012/0246356 A1 | 9/2012 | Shibata et al. | |
| 2012/0246390 A1 | 9/2012 | Kanai et al. | |
| 2012/0246501 A1 | 9/2012 | Haruki et al. | |
| 2012/0246503 A1 | 9/2012 | Fujisaki et al. | |
| 2013/0080812 A1 | 3/2013 | Shirota et al. | |
| 2013/0080813 A1 | 3/2013 | Tarui et al. | |
| 2013/0091372 A1 | 4/2013 | Kimura et al. | |
| 2013/0191670 A1 | 7/2013 | Haruki et al. | |
| 2013/0219203 A1 | 8/2013 | Fujisaki et al. | |
| 2013/0254773 A1 | 9/2013 | Kimura et al. | |
| 2013/0268781 A1 | 10/2013 | Kanai et al. | |
| 2014/0013138 A1 | 1/2014 | Kanai et al. | |
| 2014/0013140 A1 | 1/2014 | Segawa et al. | |
| 2014/0075227 A1 | 3/2014 | Shirota et al. | |
| 2014/0077604 A1 | 3/2014 | Shibata et al. | |
| 2014/0089715 A1 | 3/2014 | Kimura et al. | |
| 2014/0139500 A1 | 5/2014 | Kimura et al. | |
| 2014/0240333 A1 | 8/2014 | Shirota et al. | |
| 2014/0245039 A1 | 8/2014 | Segawa et al. | |
| 2014/0245045 A1 | 8/2014 | Haruki et al. | |
| 2014/0245047 A1 | 8/2014 | Yoshimura et al. | |

FOREIGN PATENT DOCUMENTS

| | | |
|---|---|---|
| JP | 2004-152176 | 5/2004 |
| JP | 2005-234826 | 9/2005 |
| JP | 2006-023803 | 1/2006 |
| JP | 3758477 | 1/2006 |
| JP | 4749793 | 5/2011 |
| JP | 2012-530973 | 12/2012 |
| JP | 2013-020297 | 1/2013 |
| JP | 2013-62643 | 4/2013 |
| JP | 2013-528300 | 7/2013 |
| TW | 485281 | 5/2002 |

\* cited by examiner

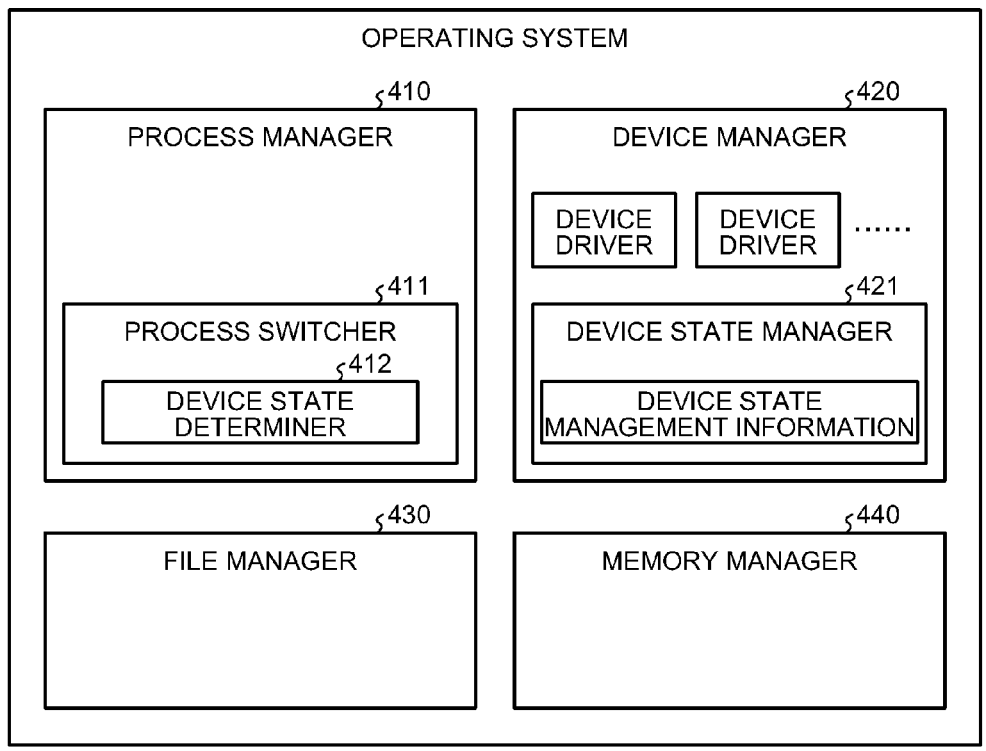

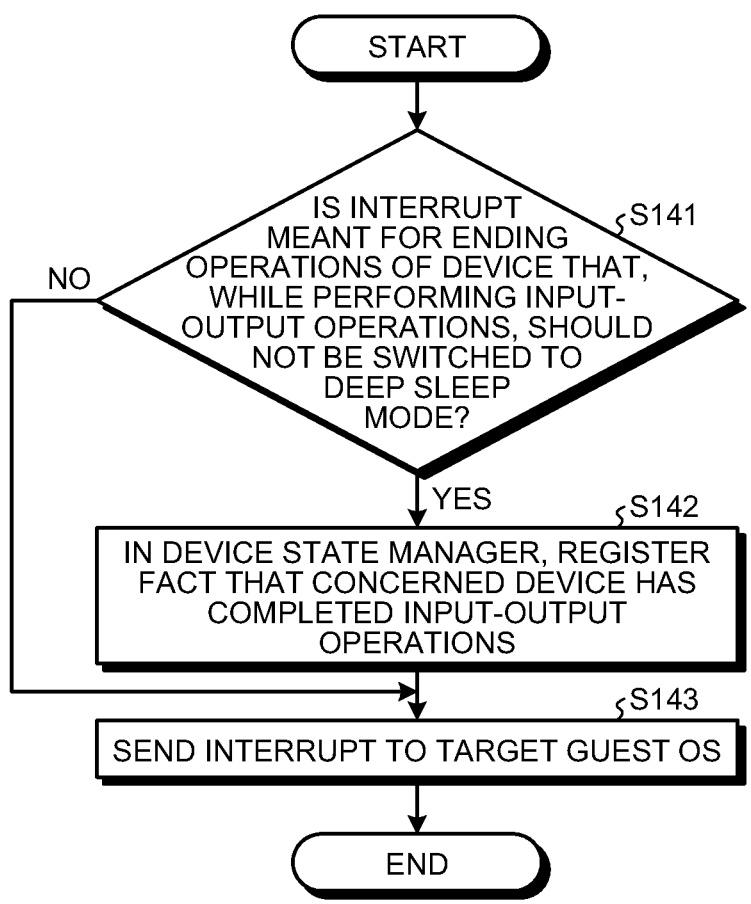

INFORMATION PROCESSING DEVICE AND SEMICONDUCTOR DEVICE

CROSS-REFERENCE TO RELATED APPLICATION(S)

This application is based upon and claims the benefit of priority from Japanese Patent Application No. 2013-197394, filed on Sep. 24, 2013; the entire contents of which are incorporated herein by reference.

FIELD

Embodiments described herein relate generally to an information processing device and a semiconductor device.

BACKGROUND

Regarding an information processing device having a built-in computer system, such as a mobile information device (for example, a tablet, a smartphone, or a glasses-type wearable terminal or a wrist-watch type wearable terminal), an in-vehicle information system, or a sensor system; achieving power saving is one of the important technical issues to be tackled. In such an information processing device, a system on chip (SoC), which is configured by integrating a computer system on a large-scale integration (LSI) chip, serves as the main constituent element (component). In an SoC, a processor core (sometimes also called a processor, or a central processing unit (CPU), or a micro processing unit (MPU)) implements various functions by executing computer programs (software).

In an in-use information processing device, the processor core has (changes between) two main states, namely, a running state (also called an active state) and an idle state. In the running state, the processor core keeps on executing computer programs (commands). In contrast, in the idle state, the processor core does not execute computer programs, and keeps waiting for an interrupt that is issued as a notification of the occurrence of an event such as the completion of operations performed by an I/O device (a peripheral device).

In a conventional information processing device, when the processor core enters the idle state, the SoC switches to a WAIT mode (also called a SLEEP mode). During the WAIT mode of the SoC, although the processor core stops executing the computer programs, the necessary I/O devices keep performing operations. Thus, for example, in response to the occurrence of an event such as completion of an I/O operation, a user input, arrival of communication data, or a timer; the processor core immediately switches to the state of being able to resume the execution of the computer programs, and continuously consumes electrical power required to remain in the present state.

In that regard, many types of the SoC have a DEEP SLEEP mode (also called a STOP mode). Thus, when the information processing device having an SoC installed therein is not being used by the user, the SoC switches to the DEEP SLEEP mode and stands by at low power consumption. When the SoC switches to the DEEP SLEEP mode, not only the processor is stopped but also the I/O devices that need not perform operations are stopped. Moreover, if possible, the power supply to those constituent elements is also stopped; or the supplied power-supply voltage is lowered within a range which enables retention of the state; or the clock is stopped. As a result, it becomes possible to reduce the power consumption.

Conventionally, if it is detected that a state in which the user is not operating the device has continued for a prolonged period of time, or if it is detected that the remaining battery level has decreased, or if a request for switching the information processing device to a power saving state is received from the user; then the information processing device performs a suspend operation (also called a standby operation) so that the SoC (or the entire information processing device or the processor core) is switched to the DEEP SLEEP mode having low power consumption. With that, reduction in the power consumption is achieved.

In the conventional suspend operation, the SoC (or the entire information processing device) is set to a stable state before switching it to the DEEP SLEEP mode. Hence, after the suspend operation is over, it is possible to continue with the operations from the state before performing the suspend operation. That is, in the suspend operation, the computer programs being executed in the processor core (i.e., the processes or the tasks managed by the operating system) are stopped, and issuance of new processing requests to the I/O devices (the peripheral devices) is not allowed. In addition, if operations are underway in an I/O device that is configured to stop performing operations during the DEEP SLEEP mode (i.e., if an I/O device is not an activation-enabled device capable of activating the SoC from the DEEP SLEEP mode); then the completion of the operations is awaited, and the SoC is set to a stable state before switching it to the DEEP SLEEP mode. For that reason, the SoC is not switched to the DEEP SLEEP mode immediately after the start of the suspend operation, and it takes time to set the SoC to a stable state.

Generally, as compared to the WAIT mode, power consumption is lower in the DEEP SLEEP mode. Hence, while the processor core is in the idle state, if the SoC can be switched to the DEEP SLEEP mode instead of the WAIT mode, then it becomes possible to further reduce the average power consumption of the information processing device.

However, for example, while the processor core is in the idle state, if an attempt is made to switch the SoC to the DEEP SLEEP mode using the method of the conventional suspend operation, the overhead of the suspend operation reaches an non-negligible length. Consequently, the performance of the information processing device is severely impaired.

BRIEF DESCRIPTION OF THE DRAWINGS

FIG. 11 is a diagram illustrating an exemplary functional configuration of an operating system (OS) according to the first embodiment;

FIG. 12 is a diagram illustrating an example of device state management information according to the first embodiment;

FIG. 35 is a flowchart for explaining an example of operations performed during interrupt handling according to the ninth embodiment.

DETAILED DESCRIPTION

According to an embodiment, an information processing device includes a memory device, one or more peripheral devices, a processor, and a state controller. The processor is able to change between a first state, in which a command is executed, and a second state, in which an interrupt is awaited. The state controller switches the information processing device to a third state when the processor enters the second state and if an operation for data transfer is being performed between at least one of the peripheral devices and the memory device. The third state is a state in which power consumption is lower as compared to the first state. The state controller switches the information processing device to a fourth state if the operation for data transfer is not being performed between any of the peripheral devices and the memory device. The fourth state is a state in which power consumption is lower as compared to the third state.

Various embodiments are described below in detail with reference to the accompanying drawings.

First Embodiment

Figure 1:
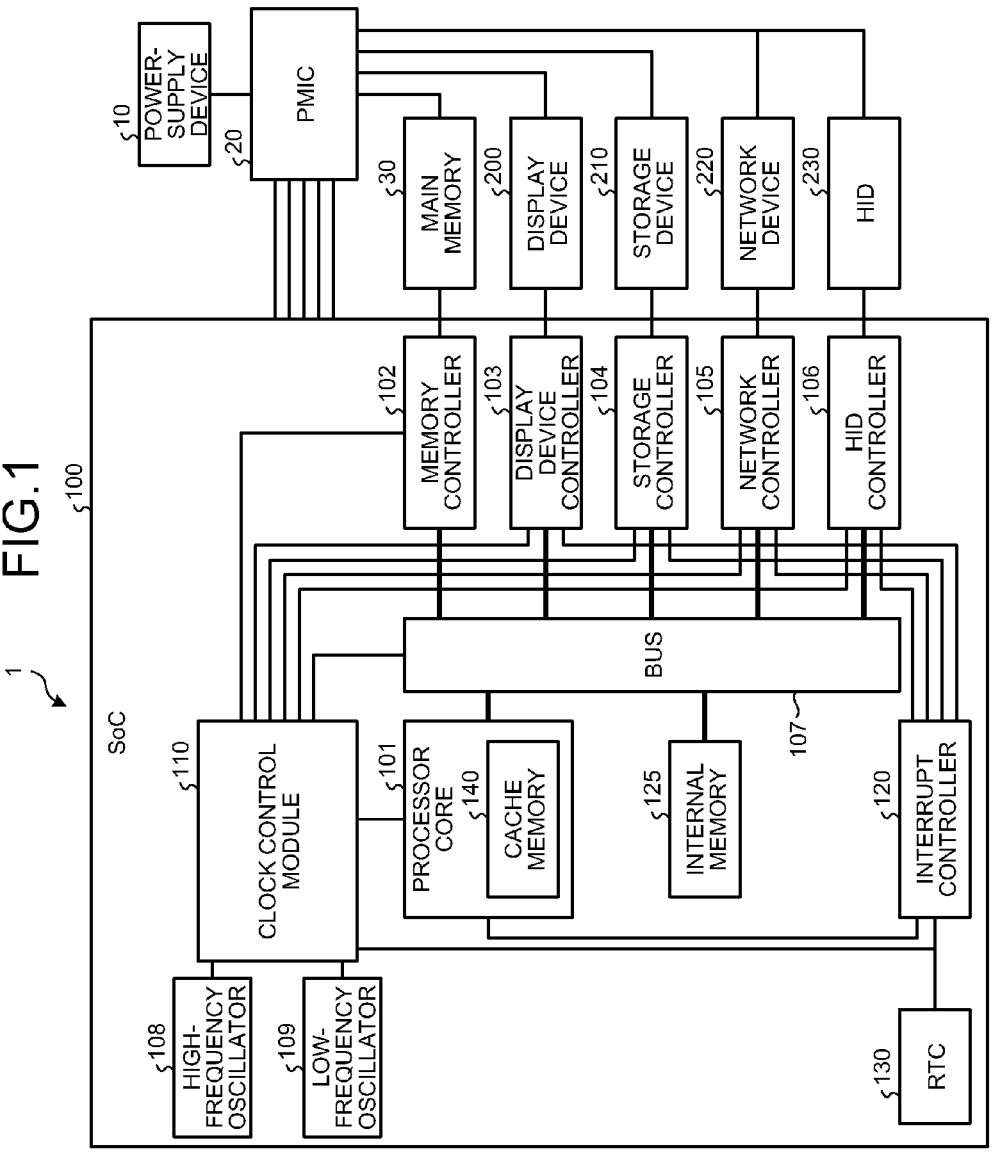
FIG. 1 is a diagram illustrating an exemplary hardware configuration of an information processing device according to a first embodiment.

FIG. 1 is a diagram illustrating an exemplary hardware configuration of an information processing device 1 according to a first embodiment. As illustrated in FIG. 1, the information processing device 1 includes a power-supply device 10, a power management integrated circuit (PMIC) 20, a main memory 30, a system on chip (SoC) 100, a display device 200, a storage device 210, a network device 220, and a human interface device (HID) 230. In the following explanation, when the display device 200, the storage device 210, the network device 220, and the HID 230 need not be distinguished from each other; they are sometimes collectively and simply referred to as "I/O devices". Thus, an I/O device is used by being connected to the SoC 100 (i.e., an I/O device is used in combination with a computer system (a processor core) installed in the information processing device 1), and can be considered to correspond to "peripheral devices" mentioned in claims.

Examples of the power-supply device 10 include the following various types: an alternating-current (AC) power supply such as an AC adapter; a primary battery such as an alkaline manganese battery; a secondary battery such as a nickel-metal-hydride battery; and a combination of a power-generating equipment and an electrical storage device, such as an energy harvesting device. For example, a photovoltaic cell which generates electric power from light energy or other harvesting device which generates electric power from heat energy or vibration energy can be used as an energy harvesting device. In case the electrical power generated by an energy harvesting device is not sufficient to cover the power consumption at the peak of the operations performed by the information processing device 1, then the surplus electricity during the periods of less power consumption can be stored in the electrical storage device and can be used to cover the electrical power required at the peak periods. Such a usage is called peak assist. Examples of the electrical storage device include a high-capacity capacitor such as an electrical double layer capacitor or a lithium-ion capacitor, and a battery such as a lithium-ion battery. Alternatively, the electrical storage device can be configured using the combination of a high-capacity capacitor and a battery.

Figure 2:
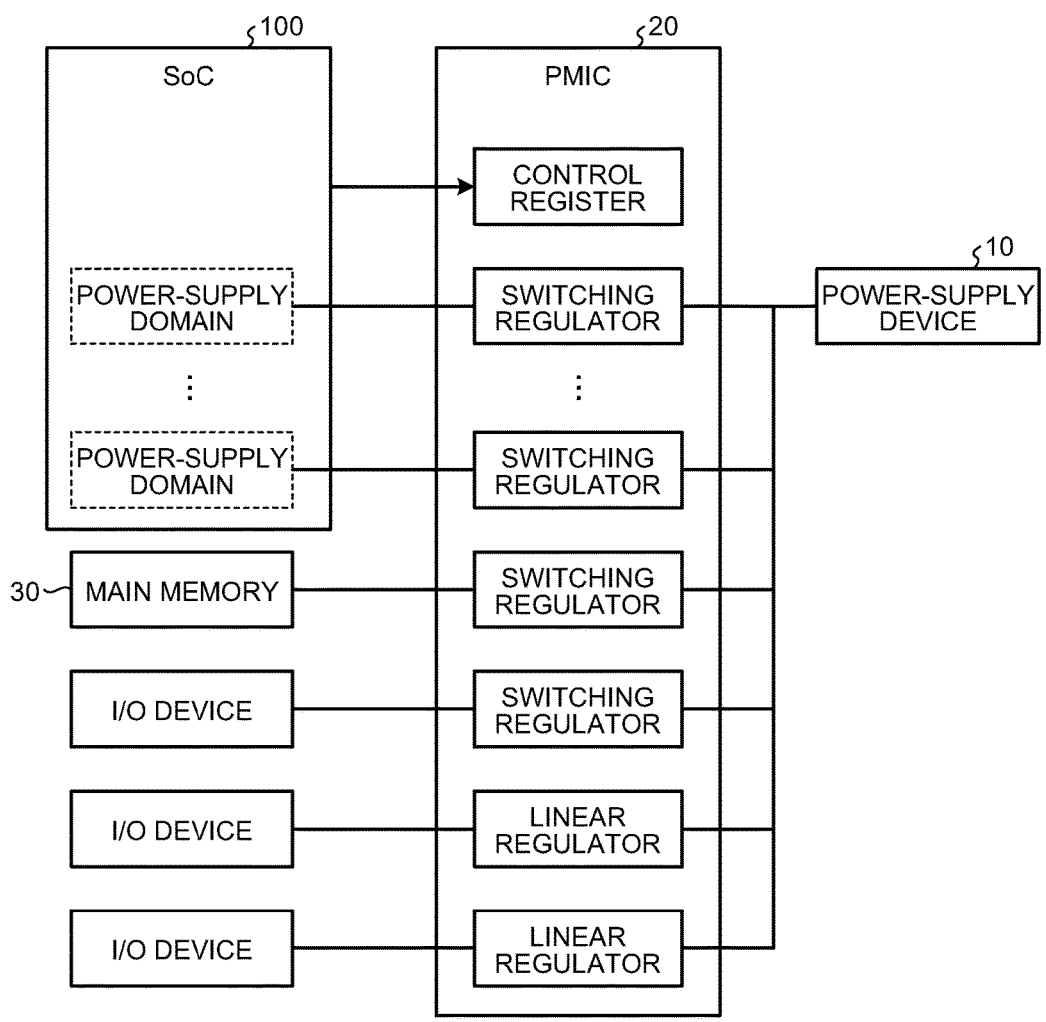
FIG. 2 is a diagram illustrating an exemplary configuration of a power management integrated circuit (PMIC) according to the first embodiment.

The PMIC 20 converts the electrical power, which is supplied by the power-supply device 10, into the voltages required by the SoC 100, the main memory 30, and the I/O device; and supplies the voltages to the constituent elements. In FIG. 2 is illustrated an exemplary configuration of the PMIC 20. Herein, the PMIC 20 has one or more built-in regulators of different types, such as a plurality of switching regulators or a plurality of linear regulators. With that, the PMIC 20 converts the input voltage, which is supplied from the power-supply device 10, into the voltage corresponding to each power-supply line. Moreover, the PMIC 20 has built-in control registers that are used to store information indicating the output voltage to be set for each power-supply line. Thus, the voltage output of the regulator of each power-supply line can be set based on the corresponding control register. In addition, the control registers can also be used to store information indicating the output voltage of the regulator of each power-supply line and indicating the ON/OFF control of the power supply at the time when an STBY signal (described later) is received. Thus, when an STBY signal (described later) is received, the PMIC 20 can set the output voltage of the regulator of each power-supply line and can set the ON/OFF control of the power supply based on the corresponding control register. Thus, for example, if the PMIC 20 is notified using an STBY signal that the SoC 100 has switched to the DEEP SLEEP mode, then the PMIC 20 either can change the output voltage of each power-supply line to the specified voltage or can stop the power supply.

Usually, the SoC 100 and the PMIC 20 are connected to each other by a serial bus (not illustrated) such as I2C or SPI. Thus, in the control registers in the PMIC 20, the values can be set from the SoC 100 via the serial bus. Meanwhile, instead of configuring the PMIC 20 using the components integrated in a single chip, it is also possible to use a combination of a plurality of DC/DC converters (chips or modules). Moreover, there are times when the SoC 100 is equipped with some or all of the functions of the PMIC 20. That is, the SoC 100 can have DC/DC converters and regulators as built-in components so that the ON/OFF control of the power supply and changes in the voltage can be done internally in the SoC 100.

Returning to the explanation with reference to FIG. 1, the main memory 30 can be configured either using a volatile memory or using a nonvolatile memory. Examples of a volatile memory include a dynamic random access memory (DRAM) and a static random access memory (SRAM). Examples of a nonvolatile memory include a magnetoresistive random access memory (MRAM), a phase change memory (PCM), a resistance random access memory (ReRAM), a ferroelectric random access memory (FeRAM), and a NOR Flash. Alternatively, for example, the main memory 30 types can be configured by combining a plurality of memory in such a way that computer programs are stored in a NOR Flash and data is stored in a DRAM. The memory that is used as the main memory 30 is connected to the computer system of the SoC 100 via a memory controller 102 that is installed in the SoC 100. Herein, the main memory 30 corresponds to a "memory device" mentioned in claims.

There are some types of memory that, while not being accessed by a processor core or a device controller, can be switched to a power saving mode in which the power consumption is less. For example, in the case of using a newer-version DRAM such as DDR3 or LPDDR2, the power consumption can be held down by switching to a self-refresh mode (a self-refresh state) in which it is possible to hold on to the data stored in the memory but it is not possible to perform reading and writing with respect to the data. On the other hand, regarding a nonvolatile memory, even if the power supply to the nonvolatile memory is stopped, the data stored therein is not lost. Hence, the power consumption can be held down by stopping the power supply to the nonvolatile memory. Meanwhile, in order to again perform a memory access with respect to a DRAM (as an example of a volatile memory) that has switched to the self-refresh mode or with respect to a nonvolatile memory to which the power supply has been stopped; it is necessary to reset the memory to a normal mode, such as to reset the DRAM from the self-refresh mode to the normal mode or to resume the power supply to the nonvolatile memory. Herein, the normal mode points to a state in which it is not only possible to hold on to the data stored in the memory but also possible to perform reading and writing with respect to the data.

Given below is the explanation about the SoC 100. Herein, the SoC 100 corresponds to a "semiconductor device" mentioned in claims. As illustrated in FIG. 1, the SoC 100 includes, as internal modules, a processor core 101; the memory controller 102 that controls the main memory 30; a display device controller 103 that controls the display device 200; a storage controller 104 that controls the storage device 210; a network controller 105 that controls the network device 220; an HID controller 106 that controls the HID 230; a bus 107 that communicates data among the internal modules; a high-frequency oscillator 108 that generates a high frequency clock; a low-frequency oscillator 109 that generates a low frequency clock; a clock control module 110 that converts a clock into various frequencies and controls whether or not to supply the clock (performs the ON/OFF control of the clock supply); an interrupt controller 120 that receives an interrupt from an I/O device and sends that interrupt to the processor core 101; an internal memory 125 (also called a local memory or a scratch-pad memory) that is a memory area inside the SoC 100; and a real time clock (RTC) 130 that has a clocking function. As the processor core 101, it is possible to use a processor of various architectures including an ARM processor. Meanwhile, in the example illustrated in FIG. 1, the processor core 101 includes a cache memory 140. In the following explanation, when the display device controller 103, the storage controller 104, the network controller 105, and the HID controller 106 need not be distinguished from each other; they are sometimes collectively and simply referred to as a "device controller". Moreover, the device controller corresponds to a "device controller" mentioned in claims.

Figure 3:
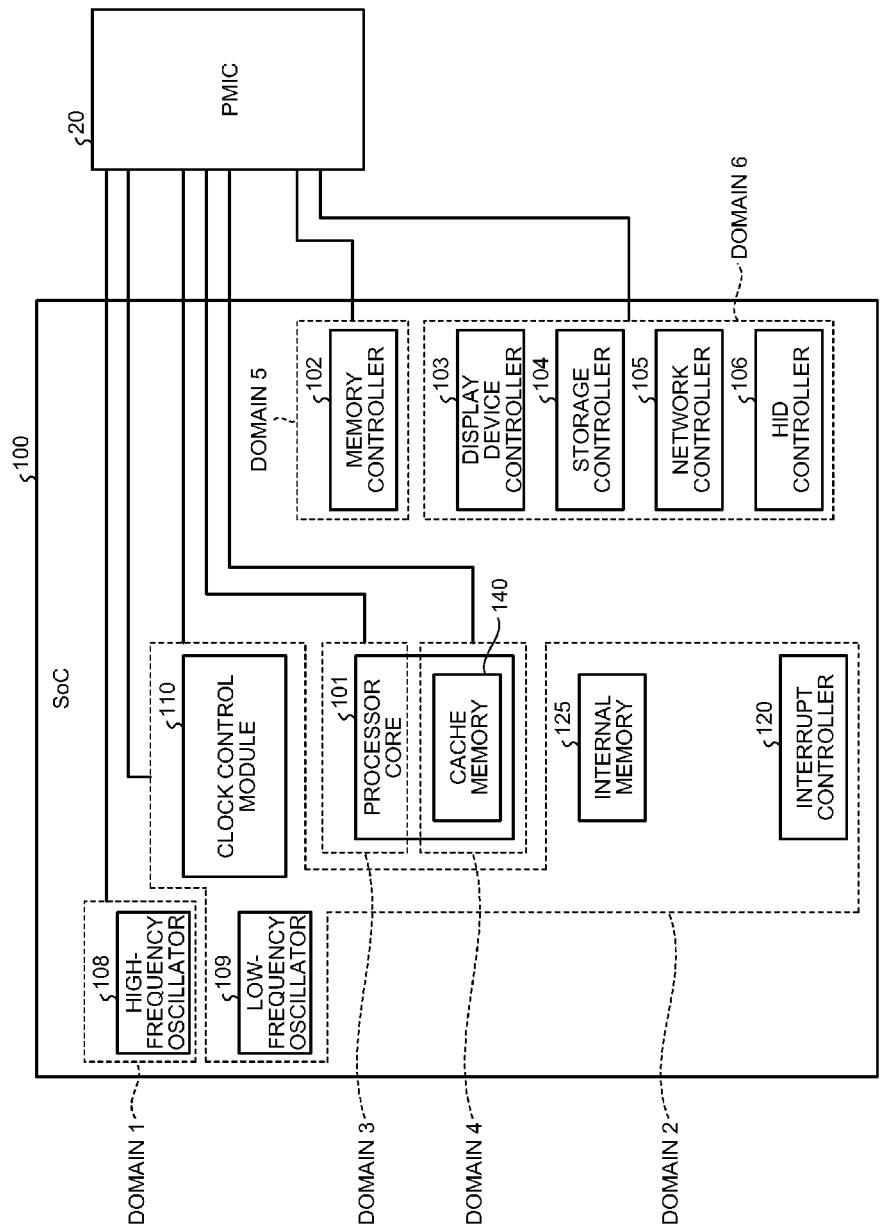
FIG. 3 is a diagram illustrating power-supply domains of a system on chip (SoC) according to the first embodiment.

As illustrated in FIG. 3, the SoC 100 is divided into a plurality of power-supply domains, and each internal module of the SoC 100 belongs to one of the power-supply domains. To each power-supply domain, the electrical power is supplied from an independent power-supply line. Thus, for each power-supply line, the changes in the voltage value or the ON/OFF control of the power supply can be done in an independent manner. In the example illustrated in FIG. 2, in the processor core 101, the portion other than the cache memory 140 belongs to a different power-supply domain than the power-supply domain to which the cache memory 140 belongs. Thus, for each power-supply line, the changes in the supply voltage or the ON/OFF control of the power supply can be done in an independent manner. Hence, for example, even if the power supply to the portion of the processor core 101 other than the cache memory 140 is stopped, as long as the power supply to the cache memory 140 is continued, the data stored in the cache memory 140 is not lost.

If the cache memory 140 is configured using a volatile memory, the cache memory 140 loses data when the power supply to the cache memory 140 is cut off. Hence, prior to switching OFF the power supply to the cache memory 140, it is necessary to perform a cleaning operation in which the dirty data stored in the cache memory 140 (i.e., the data that is stored only in the cache memory 140 of the processor core 101 but not stored in the main memory 30) is written to the main memory 30. Moreover, if the power supply to the cache memory 140 is switched OFF when the processor core 101 is in the idle state; then, at the time when the processor core 101 returns to the running state, it is necessary to perform an invalidation operation for the purpose of invalidating the data in the cache memory 140 having undefined values due to the power-off. However, if the cache memory 140 is configured using a nonvolatile memory, the data in the cache memory 140 is not lost even if the power supply is cut off. Therefore, the cleaning operation and the invalidation operation is not required.

Herein, the processor core 101 can be switched between the running state, in which computer programs (instructions) are executed, and the idle state, in which the processor core 101 is waiting for an interrupt from I/O device or a timer as a notification of the occurrence of an event. When the processor core 101 enters idle state from the running state; according to the setting of a control register (also called a special register) of the SoC 100, if the clock supplied to the processor core 101 is stopped or if the voltage is lowered within a range which enables retention of register values, then it becomes possible to reduce the power consumption of the processor core 101. When the processor core 101 in the idle state receives an interrupt, it enters the running state and resumes the execution of computer programs. Herein, the running state corresponds to a "first state" mentioned in claims, while the idle state corresponds to a "second state" mentioned in claims.

The SoC 100 illustrated in FIGS. 1 and 3 is an example of a single core SoC having a single processor core 101 built into it. However, alternatively, it is also possible to configure the SoC 100 as a multicore SoC having plural processor cores. The invention can be implemented in a single core SoC as well as in a multicore SoC. In the case of implementing the invention in a multicore SoC, the cache memories in the processor cores can have various configurations as explained below.

(a) a case, in which each processor core includes an L1 cache memory and an L2 cache memory
(b) a case in which each processor core includes an L1 cache memory, and an L2 cache memory is shared in a group of a plurality of processor cores
(c) a case in which each processor core includes an L1 cache memory, and an L2 cache memory is shared among all processor cores The invention can be implemented in any one of these multicore configurations. Moreover, the configuration is not limited to the configurations given above. Alternatively, it is also possible to use more levels of cache memories such as an L3 cache memory.

Returning to the explanation with reference to FIG. 1, the high-frequency oscillator 108 is an oscillating circuit for generating a main clock that serves as the source for generating the various clock required by each module of the SoC 100. That is, the high-frequency oscillator 108 generates the main clock (in the following explanation, sometimes referred to as a "high-frequency clock") that represents the clock used in the running state of the processor core 101 and other modules. For example, the frequency of the high-frequency clock is 24 MHz. As compared to the low-frequency oscillator 109, the high-frequency oscillator 108 consumes higher power consumption while generating the clock. For that reason, in a state such as the DEEP SLEEP mode in which the main clock is not required, stopping the high-frequency oscillator 108 enables to reduce the power consumption of the entire information processing device 1.

Figure 4:
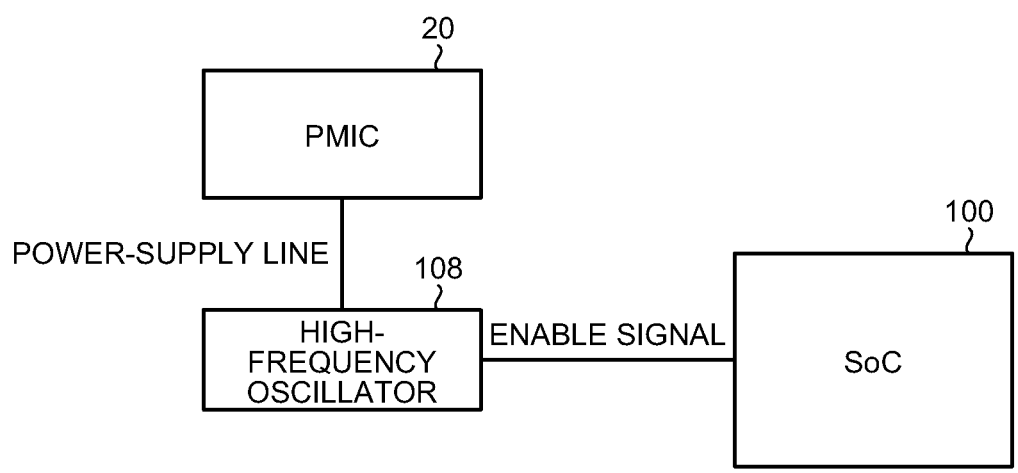
FIG. 4 is a diagram for explaining activation/stopping of a high-frequency oscillator according to the first embodiment.

FIG. 4 illustrated the methods of starting/stopping the high-frequency oscillator 108. It is possible to implement a method of setting ON/OFF (active/inactive) control by using an enable signal (indicating whether oscillator 108 generate the clock or not) which is connected with the SoC 100, or it is possible to implement a method of performing ON/OFF control of the power supply to the high-frequency oscillator 108 from the PMIC 20.

Returning to the explanation with reference to FIG. 1, the low-frequency oscillator 109 is an oscillating circuit for generating a sub-clock (in the following explanation, sometimes referred to as a "low-frequency clock") that is required by the modules which perform operations even during the DEEP SLEEP mode (i.e., the I/O devices capable of activating the SoC 100); generating a sub-clock required by the interrupt controller 120; and generating a sub-clock required by the RTC 130. A sub-clock generated by the low-frequency oscillator 109 has a frequency of, for example, 32 KHz that is lower than the frequency of the main clock. Thus, the low-frequency oscillator 109 generates clocks having low frequency and low power consumption. Hence, even if the low-frequency oscillator 109 permanently oscillates for generating the clocks, the power consumption remains low.

Figure 5:
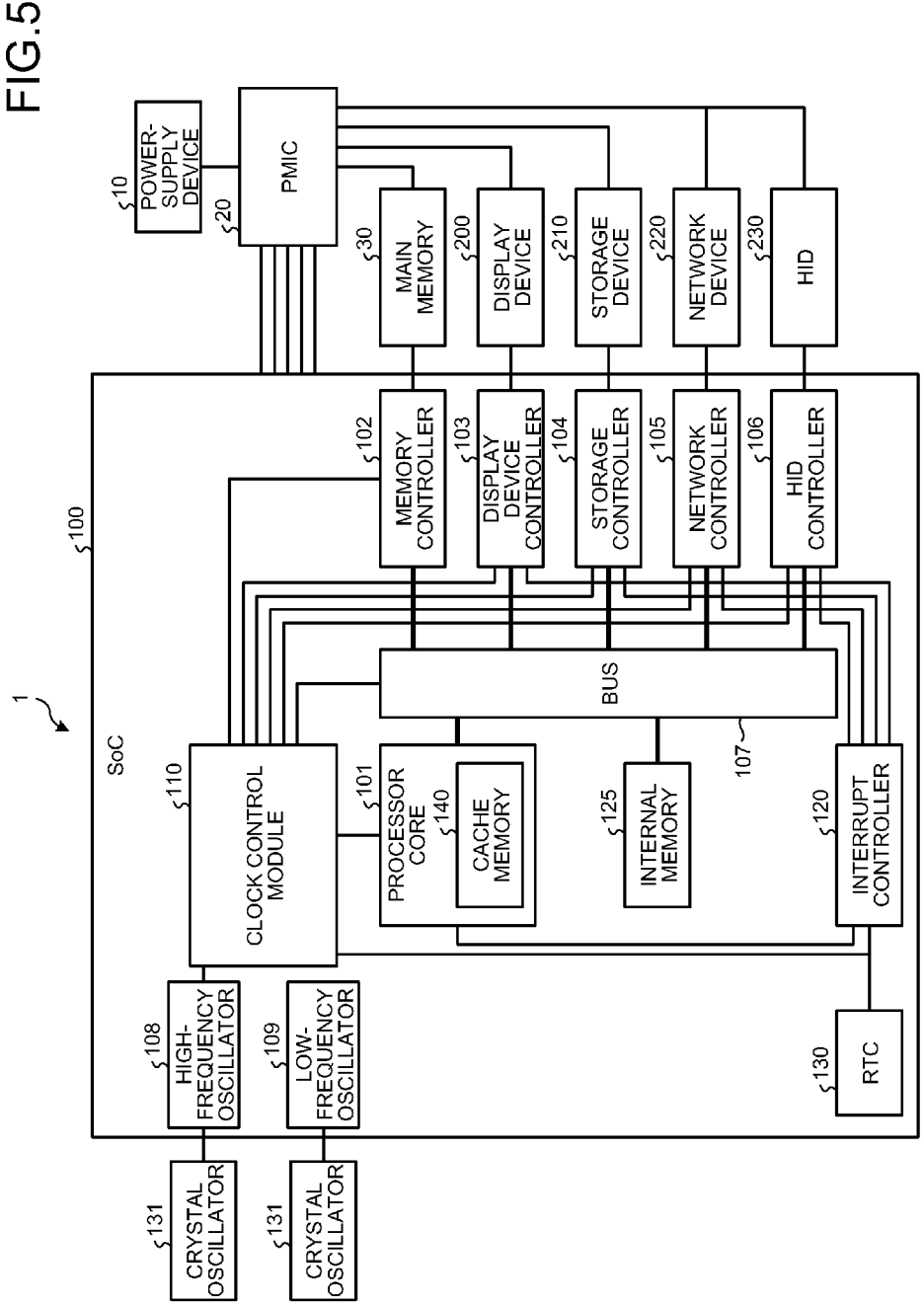
FIG. 5 is a diagram illustrating an exemplary of the information processing device according to a modification example.
Figure 6:
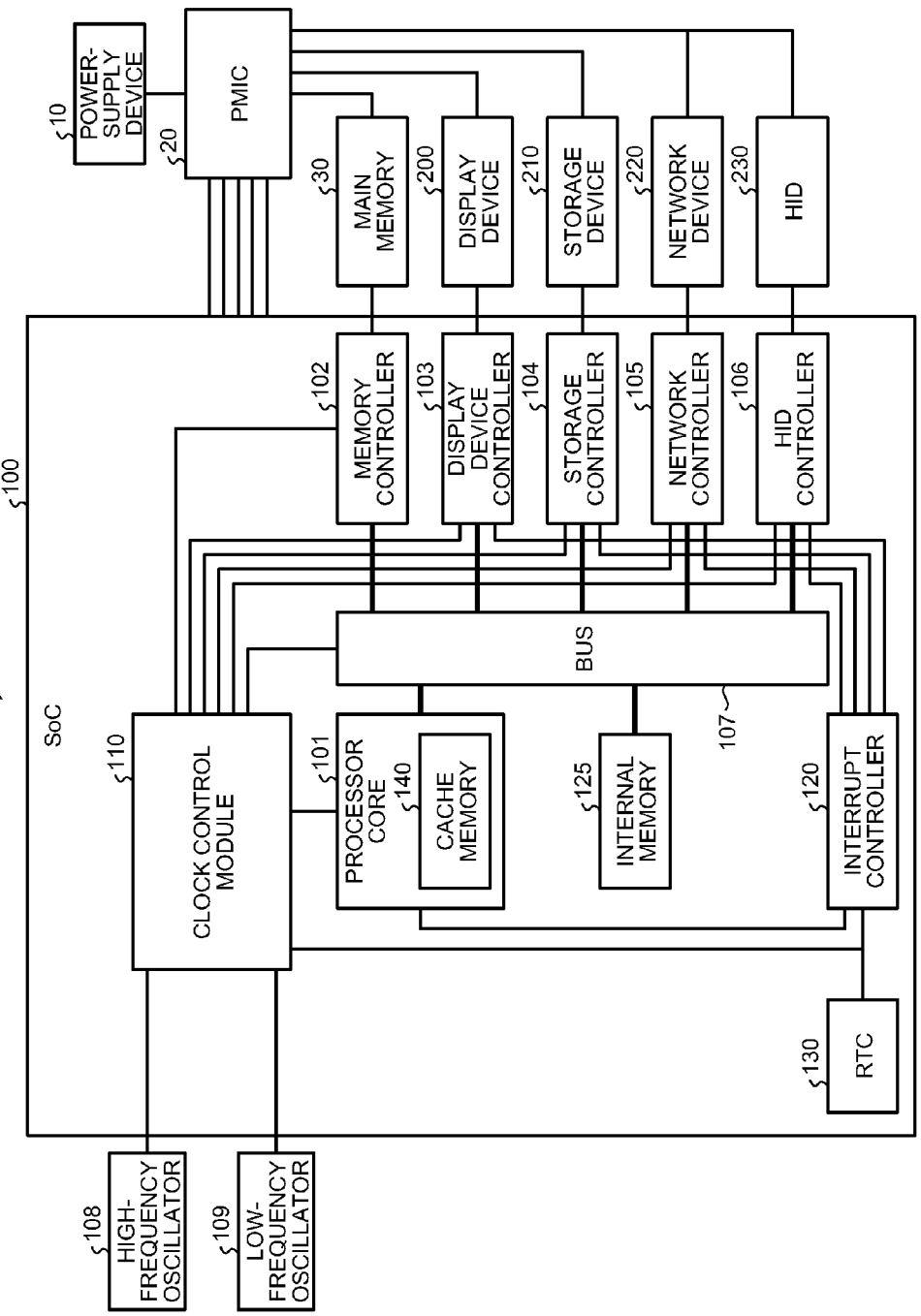
FIG. 6 is a diagram illustrating an exemplary of the information processing device according to a modification example.
Figure 7:
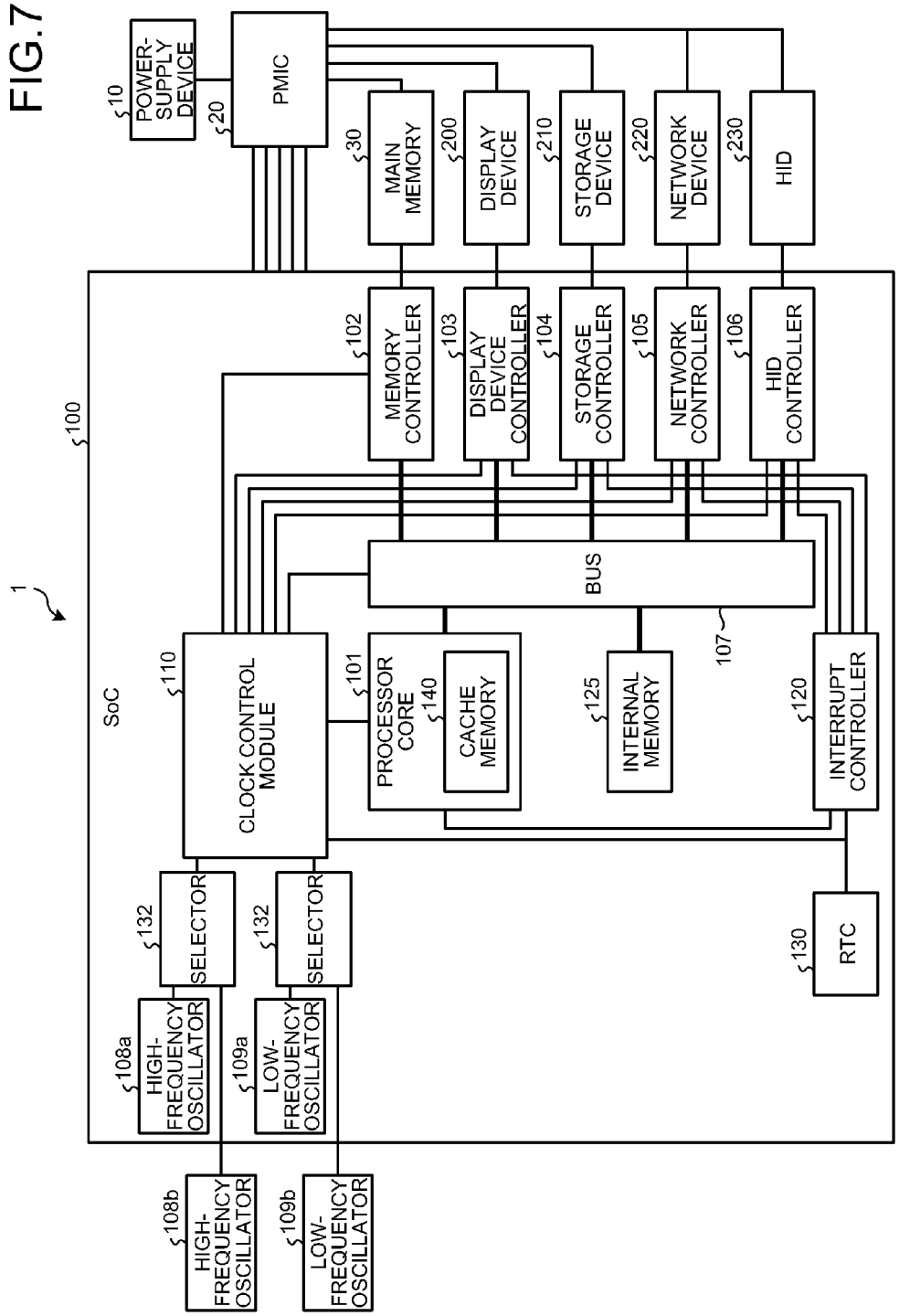
FIG. 7 is a diagram illustrating an exemplary of the information processing device according to a modification example.

In the example illustrated in FIG. 1, the SoC 100 has the high-frequency oscillator 108 and the low-frequency oscillator 109 as built-in components. Herein, the high-frequency oscillator 108 and the low-frequency oscillator 109 that are built into the SoC 100 can be implemented using oscillators of various types such as crystal oscillator circuits, CR oscillation circuits, silicon oscillation circuits, and MEMS oscillation circuits. Particularly, crystal oscillation circuits are more commonly used. In the case of using crystal oscillation circuits; for example, as illustrated in FIG. 5, crystal oscillators 131 can be externally attached to the SoC 100 for the purpose of determining the oscillator frequency. Alternatively, for example, as illustrated in FIG. 6, instead of embedding the high-frequency oscillator 108 and the low-frequency oscillator 109 in the SoC 100, the configuration can be such that the SoC 100 receives clock signals from the high-frequency oscillator 108 and the low-frequency oscillator 109 that are externally attached to the SoC 100. In such a configuration, oscillation circuits such as crystal oscillation circuits or silicon oscillation circuits are externally connected, and the SoC 100 operates according to the clocks generated by those oscillation circuits. Still alternatively, for example, as illustrated in FIG. 7, the configuration can be such that clock signals are selected using selectors 132. In such a configuration, it not only becomes possible to use the clocks generated by the high-frequency oscillator 108 and the low-frequency oscillator 109 built into the SoC 100 (FIGS. 1 and 5); but it also becomes possible to input the clocks generated by the high-frequency oscillator 108 and the low-frequency oscillator 109 that are externally attached to the SoC 100, and then use those clocks (FIG. 6). Thus, it is possible to select an arbitrary method according to the intended purpose.

Generally, regarding the start-up time taken by an oscillator to start oscillation from a stopped state (i.e., from a state in which the power supply to the oscillator is stopped or from a state in which, although the power is supplied to the oscillator, the enable signal is turned OFF (inactive) thereby stopping the oscillation) and to become stable; a crystal oscillator takes a few milliseconds (msec), while a silicon oscillator takes a few hundred of microseconds (μsec). Thus, consider a usage in which the ON/OFF control of the high-frequency oscillator 108 is frequently repeated. For example, consider a case in which, once the processor core 101 enters the idle state from the running state, the SoC 100 is switched to the DEEP SLEEP mode and the high-frequency oscillator 108 is stopped with the aim of achieving power saving. In such a case, if a silicon oscillator is used as the high-frequency oscillator 108, then it becomes possible to reduce the temporal overhead during the processor core 101 switches to the running state from the idle state. Hence, it is desirable to use a silicon oscillator as the high-frequency oscillator 108.

Figure 8:
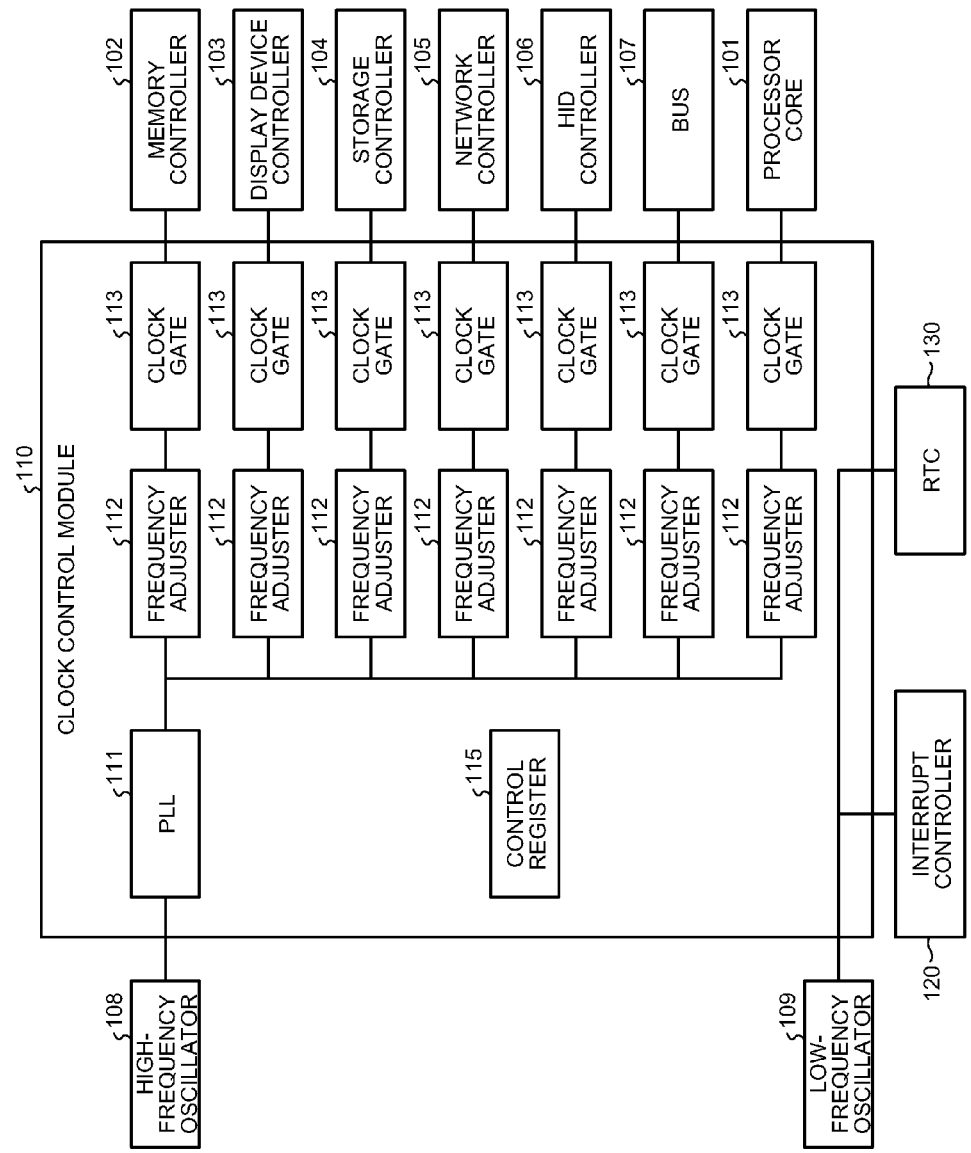
FIG. 8 is a diagram illustrating an exemplary of a clock control module according to the first embodiment.

A clock signal generated by the high-frequency oscillator 108 or the low-frequency oscillator 109 is then converted by the clock control module 110 of the SoC 100 into clock signals of a plurality of different frequencies before being distributed to the modules in the SoC 100. FIG. 8 is a diagram illustrating an exemplary configuration of the clock control module 110. As illustrated in FIG. 8, the clock control module 110 includes a phase locked loop (PLL) 111, frequency adjusters 112, and clock gates 113.

Figure 9:
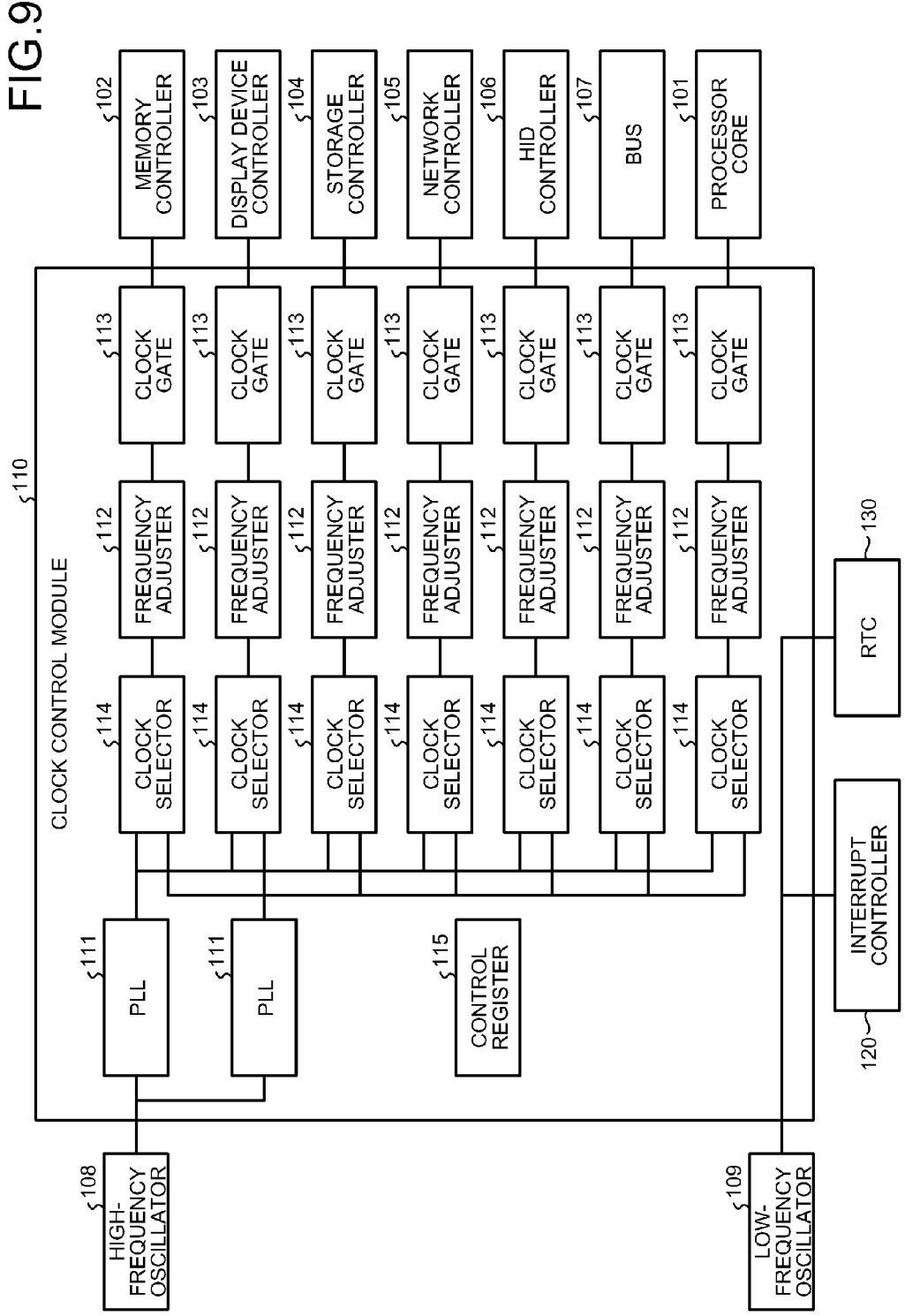
FIG. 9 is a diagram illustrating an exemplary configuration of the clock control module according to a modification example.

The PLL 111 changes a clock signal (the main clock), which is input from the high-frequency oscillator 108, to a clock signal having a stable and high frequency. In the SoC 100, since it is necessary to have clock signals of a plurality of different frequencies, a plurality of frequency adjusters 112 can be disposed so that each frequency adjuster 112 can further multiply or divide the clock signal supplied from the PLL 111 and change that clock signal into a clock signal of the desired frequency. Meanwhile, although the clock control module 110 illustrated in FIG. 8 includes only a single PLL 111; that is not the only possible case. Alternatively, for example, as illustrated in FIG. 9, the clock control module 110 can be configured to include a plurality of PLLs 111. When the clock control module 110 is configured to include a plurality of PLLs 111; each PLL 111 can generate a clock signal of a different frequency, and each clock selector 114 can select a suitable clock signal and input it to the corresponding frequency adjuster 112. The clock gates 113 perform the ON/OFF control of the control signals that are sent from the respective frequency adjusters 112 to the internal modules of the SoC 100. Herein, by setting a control register 115 of the clock control module 110 (i.e., by setting a variety of control information in the control register 115), the following factors can be controlled: the value for multiplication or division used by the frequency adjusters 112; the ON/OFF control performed by the clock gates 113 with respect to the output of the clock signals; and, when a plurality of PLLs 111 is present, the selection of the PLL 111 (an input PLL 111) with respect to each frequency adjuster 112. Meanwhile, alternatively, the clock control module 110 can output the clock signals directly to the internal modules without using the PLLs 111. For example, a clock generated by a low-frequency clock generating device can be directly sent to the interrupt controller 120 and the RTC 130.

In the examples illustrated in FIGS. 8 and 9, when any clock gate 113 of the clock control module 110 turns OFF (stops) the output of a clock signal, it becomes possible to perform what is called clock gating in which the operations of the internal module connected subsequent to that clock gate 113 are stopped, thereby achieving reduction in the power consumption. Alternatively, clock gating can be performed in the following manner too: instead of performing ON/OFF control of the clock signals output from the clock control module 110; each internal module can include a register for performing ON/OFF control of the clock input, and the clock input is set to OFF by setting the register.

Returning to the explanation with reference to FIG. 1, the information processing device 1 includes the display device 200, the storage device 210, the network device 220, and the human interface device (hereinafter, sometimes referred to as "HID") 230 as the I/O devices. However, the types of I/O devices are not limited to these devices. In addition, the SoC in which the invention is implemented can also include general purpose serial interfaces such as I2C, SPI, UART, USB, and SDIO having a variety of usages. Moreover, the SoC can also include an interface for receiving input of image data from an image capturing device such as a camera. In essence, various types of devices such as a storage device, a communication device, a display device, and an image capturing device can be used as the I/O devices.

An I/O device is connected to the computer system (such as the processor core 101) in the SoC 100 via a device controller that controls the concerned I/O device. Herein, a device controller performs control such as issuing an instruction to start/stop the operations of the corresponding I/O device, and transferring data between the corresponding device and the main memory 30. It is often the case that a device controller is an internal module of the SoC 100 as illustrated in FIG. 1. However, that is not the only possible case. Alternatively, for example, a circuit (a chip or an LSI) of a device controller can be externally connected to the SoC 100. Meanwhile, for example, as is the case of a wireless communication device; except for the minimal external components such as an antenna, the I/O device itself is often built into the SoC 100. In that case, the I/O device and the corresponding device controller are disposed in an integrated manner, and the entire integrated configuration is sometimes called an I/O device. Meanwhile, device controllers such as I2C, SPI, USB, SATA, and SDIO that are general-purpose communication interfaces for connecting the SoC 100 to external devices are sometimes called interfaces.

Examples of the display device 200 include a liquid crystal display, a panel self-refresh (PSR) compatible liquid crystal display, and an electrophoretic display (EPD: an electronic paper). However, that is not the only possible case. The liquid crystal display performs, in a repeated manner at a frequency of a few dozen times per second (for example, 30 times or 60 times per second), a refresh operation in which, even if there is no change in the display content, display data stored in the main memory 30 or display data stored in a frame buffer of a memory in a display controller (as an example of the display device controller 103) is sent to the liquid crystal display. During a refresh operation, since data transfer is done from the frame buffer to the liquid crystal display, the display device controller 103 and the bus 107 for data transfer need to be continuously supplied with a clock so that the data transfer is not interrupted. Moreover, the memory used as the frame buffer also needs to be kept in the accessible state.

A PSR compatible liquid crystal display has a buffer for storing display data for displaying. When there is no change in the display content, the PSR compatible liquid crystal display performs a refresh operation in the display using the display data stored in the buffer of the display. For that reason, when there is no change in the display content, the SoC 100 need not send the display data stored in the main memory 30 or stored in the memory of a display controller to the display. Hence, unlike a liquid crystal display, when there is no change in the display content, it becomes possible to stop the clock provided to the display device controller 103 and the bus 107 for data transfer. Moreover, the memory used as the frame buffer can be switched to a power saving state in which it cannot be accessed. That enables achieving reduction in the power consumption.

An EPD is able to hold the display content without the power. For that reason, during a period of time in which there is no change in the display content, it is possible to stop the power supply to the EPD or to stop the clock supply to an EPD controller (an example of the display device controller 103). That enables achieving reduction in the power consumption. In the case of changing the display content, in order to transfer the data of the display content (the data of the frame buffer of the main memory 30) to the EPD controller or in order to generate signals for rewriting the EPD based on the data of the display content, it is naturally necessary to supply the power or a clock to the EPD or the EPD controller. Besides, the main memory 30 in which the data of the display content is stored needs to be switched to the accessible state.

The storage device 210 is used as a secondary storage of the information processing device 1 for the purpose of storing data and computer programs. Examples of the storage device 210 include various memory cards such as a NAND flash memory (a chip), a NOR flash memory (a chip), and an SD card; a hard disk, an SSD, and a DVD-RAM. However, the storage device 210 is not limited to these devices, and can be configured in an arbitrary manner. The storage device 210 is connected to the computer system of the SoC 100 via the storage controller 104. For example, when an SD card is used as the storage device 210, the storage controller 104 to which the storage device 210 is connected is an SD controller or an SDIO controller. Alternatively, when an SATA interface HDD or an SSD is used as the storage device 210, the storage controller 104 to which the storage device 210 is connected is an SATA controller. Still alternatively, when a chip of a NAND flash memory is used as the storage device 210, the storage controller 104 to which the storage device 210 is connected is a NAND controller. Still alternatively, when a NOR flash memory (a chip) having an SPI interface is used as the storage device 210, the storage controller 104 to which the storage device 210 is connected is an SPI controller.

The storage controller 104 receives an instruction from an application program or an operating system (OS), and performs operations such as reading and writing of data with respect to the storage device 210. In the case of reading data from the storage device 210, the storage controller 104 instructs the storage device 210 to read the data and send it back. Then, the data that has been sent back is stored by a DMA controller, which is disposed in the SoC 100 separately from the storage controller 104, in a buffer area provided by the application program in the main memory 30 or in an area in the main memory 30 that is managed by the OS as a page cache (also called a buffer cache or a disk cache). In the case in which an application program writes data from the buffer cache into the storage device 210, or in the case in which the changed data (the dirty data) in the page cache is periodically written back in the storage device 210 by the OS; the storage controller 104 sends the data, which has been read by the DMA controller, to the storage device 210 for writing. Then, the storage controller 104 notifies the processor core 101 about the completion of writing or reading of data by issuing an interrupt via the interrupt controller 120. While the storage controller 104 is performing reading or writing of data, the power and the clock need to be supplied to the storage controller 104. Besides, the power also needs to be supplied to the storage device 210. Moreover, the main memory 30 needs to be switched to the accessible state.

As the network device (communication device) 220, it is possible to use devices implementing various communication methods. For example, it is possible to use a wired LAN device such as Ethernet (registered trademark); a wireless LAN device having the transmission standard of 802.11a/802.11b/802.11g/802.11n/802.11ac; or a device for near field transmission such as Bluetooth, ZigBee (registered trademark), and TransferJet.

Between the external network device 220 of the SoC 100 and the network controller 105 that is built into the SoC 100, the sharing of functions has different variations. For example, in the case of using Ethernet, many of the necessary functions for communication are implemented in the network controller (Ethernet controller) 105 that is built into the SoC 100. As the external network device 220 of the SoC 100, often a driver IC (a chip) of the physical layer (PHY) is connected. In the case of using a wireless LAN or ZigBee, often a communication module having an interface such as SPI, SDIO, USB, or UART is used as the network device 220. In that case, many of the necessary functions for communication are implemented in the communication module serving as the network device 220. As the network controller 105 is used an SPI controller, an SDIO controller, a USB controller, or a UART controller.

The network controller 105 controls the network device 220, and sends and receives data. At the time of sending data to the network, either a DMA controller built into the network controller 105 or an external DMA controller of the network controller 105 reads the data to be sent from the main memory 30; the network controller 105 transfers the read data to the network device 220; and the network device 220 further sends the received data to the network. At the time of receiving data from the network, the network device 220 transfers the received data to the network controller 105; and either a DMA controller built into the network controller 105 or an external DMA controller of the network controller 105 stores the received data in the main memory 30. Then, the network controller 105 issues an interrupt via the interrupt controller 120 and notifies the processor core 101 about the completion of sending or receiving the data by.

In an I/O device such as a wireless LAN communication module having an SDIO interface, the following components are built into the communication module: a wireless (RF) circuit or a control processor; a memory; an SDIO controller; a bus for interconnecting the components; and a clock oscillator. In the case of using such a communication module as the network device 220; as long as the power is supplied to the communication module, regardless of whether the network controller (SDIO controller) 105 to which the communication module is connected is stopped, it is possible to send data from a memory in the wireless LAN communication module to the network and to receive data from the network into the memory in the wireless LAN communication module. At the time of sending and receiving data between the wireless LAN communication module and the SoC 100, it is necessary that the SDIO controller serving as the network controller 105 is in operation.

The HID 230 is a general term for devices such as a keyboard, a touch-sensitive panel, and a mouse used by user to perform an input. In the case in which a keyboard or a mouse having a USB interface is used as the HID 230, the device controller (the HID controller 106) to which the HID 230 is connected is a USB controller. In the case of using a keyboard having a USB interface, the code (key code) corresponding to a pressed key is sent from the keyboard to the SoC 100 via a USB bus. Herein, for example, the SoC 100 has a keypad controller to which key switches arranged in a matrix-like manner (i.e., a key pad) can be directly connected. When any one of the connected key switches is pressed, the keypad controller issues an interrupt to the processor core 101 via the interrupt controller 120. Upon receiving the interrupt, the processor core 101 reads, from the keypad controller, information that enables identification of the pressed key switch; converts the information into a key code corresponding to that key switch as may be necessary; and notifies the OS or an application about the pressed key switch.

In the case in which a touch-sensitive panel having an I2C interface is used as the HID 230, an I2C controller is used as the HID controller 106. Upon being touched, the touch-sensitive panel sends coordinate data to the SoC 100 via the I2C interface. The processor core 101 is notified about the coordinate data by an interrupt. Then, the processor core 101 corrects the coordinate data (i.e., performs noise removal or coordinate conversion) as may be necessary; and then notifies the OS or an application about the coordinate data. If the SoC 100 has an analog-to-digital (A/D) converter built into it, then sometimes the touch-sensitive panel is connected via the A/D converter. In that case, the processor core 101 of the SoC 100 operates the A/D converter at an appropriate timing and detects the coordinate data; corrects the coordinate data as may be necessary; and notifies the OS or an application about the coordinate data.

Figure 10:
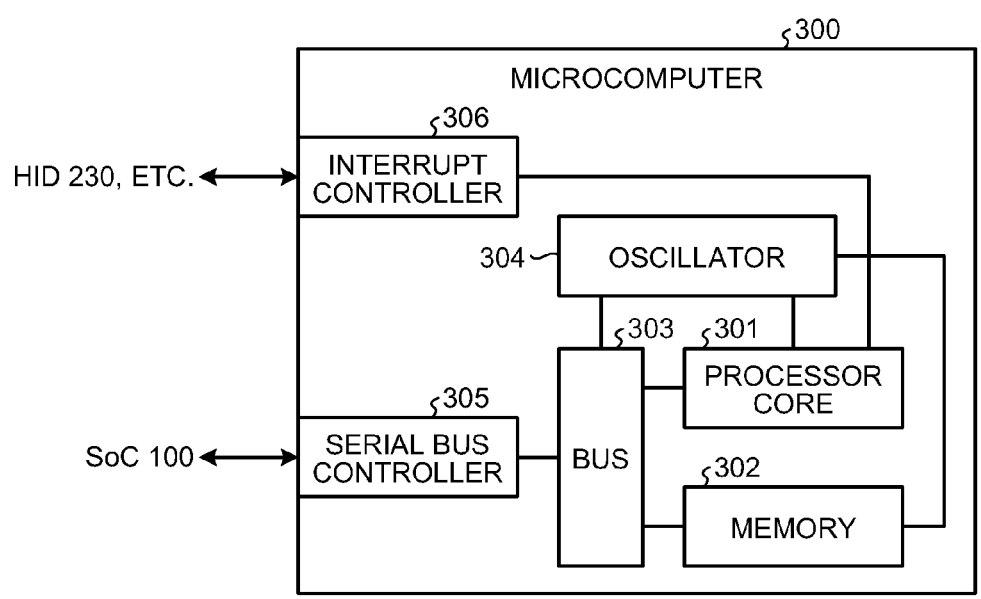
FIG. 10 is a diagram illustrating an exemplary configuration of a microcomputer according to the first embodiment.

Meanwhile, instead of directly connecting the HID 230 to the SoC 100, it is also possible to connect the HID 230 via, for example, a microcomputer 300 illustrated in FIG. 10. Herein, a microcomputer is an LSI product having a computer system integrated into a single semiconductor chip. Although the microcomputer 300 is lower in performance to the processor core 101 of the SoC 100, it has low power consumption. Hence, during I/O operations of an I/O device, the operations that need to performed on a frequent basis but that get over in a short period of time can be assigned (offloaded) to the microcomputer 300. With that, it becomes possible to reduce the power consumption of the entire information processing device 1. For example, in the case in which a keypad (a matrix of key switches) is used as the HID 230 and is connected to the SoC 100 via the microcomputer 300; the operations such as chattering prevention, repeat processing, and key code conversion can be offloaded to the microcomputer 300. In the case of using a touch-sensitive panel; based on the data input by an A/D converter built into the microcomputer 300, operations such as coordinate conversion, noise removal, and dragging can be offloaded to the microcomputer 300. In addition, it is often the case that the microcomputer 300 is equipped with the functions of controlling the HID 230 and managing the power supply in such a way that, when a touch-sensitive panel or a keyboard is pressed, the SoC 100 is powered to be able to resume the operations. Besides, it is also often the case that not only the HID 230 but also various sensor devices are connected to the microcomputer 300, and computing for noise removal regarding the data input from the sensor devices is offloaded to the microcomputer 300. Meanwhile, the microcomputer 300 and the SoC 100 are connected to each other by a serial bus, such as I2C or SPI, or by GPIO, or by an external memory bus of the SoC 100; and perform data communication with each other via such connections.

FIG. 10 is a diagram illustrating a configuration example of the microcomputer 300. As illustrated in FIG. 10, the microcomputer 300 has the following components built into it: a processor core 301; a memory 302; a bus 303; an oscillator 304; a serial bus controller 305 such as I2C or SPI or UART that is used at the time of communicating data with the SoC 100; and an interrupt controller 306. Moreover, although not illustrated in FIG. 10, the microcomputer 300 sometimes also has I/O devices such as GPIO, an A/D converter, a D/A converter, and a PWM circuit built into it. Furthermore, the microcomputer 300 has an oscillator built into it. Hence, even if the SoC 100 is in a low power-consumption state, or even the high-frequency oscillator 108 is stopped or the main memory 30 is switched to the power saving mode thereby making it inaccessible; it is still possible for the microcomputer 300 to perform operations. In order to perform data communication with the SoC 100 via a serial bus, the serial bus controller 305 of the microcomputer 300 needs to be switched to an operable state. When an interrupt request is received from the HID 230, the interrupt controller 306 registers an interrupt vector, which enables identification of the type of the interrupt, in a register (not illustrated) included therein, and sends an interrupt signal to the processor core 301 (i.e., notifies the processor core 301 about the interrupt). Upon receiving the interrupt signal, the processor core 301 can refer to the interrupt vector registered in the register of the interrupt controller 306, and thus can identify the cause for the interrupt.

Returning to the explanation with reference to FIG. 1, the interrupt controller 120 receives an interrupt request from a device controller or an I/O device; registers an interrupt vector, which enables identification of the type of the interrupt, in a register included therein; and sends an interrupt signal to the processor core (i.e., notifies the processor core 101 about the interrupt). Upon receiving the interrupt signal, the processor core 101 refers to the interrupt vector registered in the register of the interrupt controller 120 and identifies the cause for the interrupt; clears the interrupt vector registered in the register of the interrupt controller 120; and executes an interrupt handler corresponding to the identified cause for the interrupt. At the time of receiving an interrupt signal, the processor core 101 can be either in the running state, in which computer programs are executed, or in the idle state in which an interrupt is awaited. If the interrupt signal is received during the running state, then the processor core 101 discontinues the execution of the computer program being executed and executes an interrupt handler. On the other hand, if the interrupt signal is received during the idle state, the processor core 101 enters the running state and then executes the interrupt handler. Even if the SoC 100 is in the DEEP SLEEP mode, the interrupt controller 120 remains in operation on the sub-clock generated by the low-frequency oscillator 109. Thus, when an interrupt is received from an activation-enabled device (i.e., a device capable of activating the SoC 100 from the DEEP SLEEP mode), the low-frequency oscillator 109 can switch the processor core 101 to the running state and notify it about the interrupt signal.

Meanwhile, various controllers in the SoC 100 are connected to the processor core 101 via the bus 107, which can be of various types. For example, when the processor core 101 is of the ARM type, an AMBA AXI bus is widely used. Herein, in order to enhance the data transfer capability of the entire SoC 100, it is also possible to combine a plurality of types of buses. Moreover, the memory controller 102 and the internal memory 125 can be connected by dedicated buses so that the processor core 101 can access them at high speeds.

As far as the internal memory 125 of the SoC 100 is concerned, it is possible to use a high-speed SRAM. Generally, the main memory 30 can also access the internal memory 125 at high speeds. The internal memory 125 is also called a scratch-pad memory. Unlike the main memory 30 that cannot be accessed unless initialization of the memory controller 102 is completed, the internal memory 125 can be accessed immediately after booting. Hence, the internal memory 125 can be used in the boot process too. Moreover, the internal memory 125 also includes a code for performing a switching operation from a RUN mode (i.e., the state of the SoC 100 of the information processing device 1 when the processor core 101 is in the running state) to the DEEP SLEEP mode or performing a returning operation for returning to the RUN mode from the DEEP SLEEP mode after the main memory 30 switches to the self-refresh mode. Hence, the internal memory 125 can also be used entirely or partially in the code for performing the switching operation and the returning operation.

Till now, the explanation is given about the hardware configuration of the information processing device 1. While the information processing device 1 is in use, it is not always the case that the various I/O devices constituting the information processing device 1 and the modules in the SoC 100 are performing valid operations. Moreover, there are long periods of time in which the processor core 101 is in the idle state without executing computer programs because of waiting for a user input via the HID 230 or waiting for the data to reach a communication device (the network device 220), or because of waiting for the destination time set by a timer. Hence, if the devices or the modules are carefully and actively stopped during the idle state, then it becomes possible to reduce the power consumption of the entire information processing device 1.

However, regardless of the idle state of the processor core 101, there are I/O devices which perform input-output operations and there are I/O devices which perform no operations. That is, each I/O device is in a different state. At the time when the processor core 101 enters the idle state and waits for an interrupt; it is necessary that, without interrupting the normal operations of the information processing device 1, appropriate power saving is done by performing the following tasks: determining whether or not each I/O device is performing an operation, accordingly determining whether to switch the SoC 100 to the WAIT mode or the DEEP SLEEP mode, deciding whether to continue with the clock supply or to stop the clock supply, and deciding whether or not to switch the main memory 30 to the power saving mode. A power consumption reduction method according to the invention makes it possible to carry out these tasks. Herein, the WAIT mode can be considered to be the state (the state of the entire information processing device 1 or the state of the SoC 100) in which the power consumption is lower as compared to the running state of the processor core 101; and corresponds to a "third state" mentioned in claims. The DEEP SLEEP mode can be considered to be the state in which the power consumption is lower as compared to the WAIT mode; and corresponds to a "fourth state" mentioned in claims.

The power consumption reduction method according to the invention is implemented when the operating system (OS), which is executed by the processor core 101 of the SoC 100, controls the operating states of the various I/O devices in the information processing device 1 and the various modules in the SoC 100. The operating system is a computer program stored in a secondary memory device such as a NAND flash memory or an SD card. Immediately after the information processing device 1 is powered, the kernel of the operating system (i.e., the core portion of the operating system) is read into the main memory 30 and executed by the processor core 101. It is also often the case that some functions of the operating system are not read into the main memory 30 but are read into the internal memory 125 of the SoC 100 before being executed. For example, consider the case in which an interrupt is issued for releasing the idle state of the processor core 101. In that case, if the computer program that is to be initially executed by the processor core 101 is stored in the main memory 30 which has switched to the power saving mode during the idle state, the processor core 101 cannot promptly execute the concerned computer program. In that regard, a computer program for switching the main memory 30 from the power saving mode to the normal mode is stored in the internal memory 125, which is promptly accessible to the processor core 101 upon returning from the idle state. Thus, firstly, the processor core 101 executes that computer program, and then executes the computer programs stored in the main memory 30.

In the information processing device 1, it is possible to install various operating systems (OS) such as Linux (registered trademark), Android, Windows, iOS, and iTron. FIG. 11 is a block diagram illustrating an exemplary functional configuration of the OS installed in the information processing device 1 according to the first embodiment. Herein, the OS installed in the information processing device 1 includes, as main functions, a process manager 410, a device manager 420, a file manager 430, and a memory manager 440.

The process manager 410 manages an application program, which is executed by the processor core 101, in units called processes (or executable units of a computer program such as tasks or threads). Each application program, which implements various functions that can be provided by the information processing device 1, is executed by one or more processes. The process manager 410 performs multiprocessing by switching (dispatching) in a timely manner between a plurality of processes to be executed by the processor core 101. This function of switching between the processes (also called context switching) is referred to as a process switcher (or a dispatcher) 411. The switching between processes is performed when a process issues an input-output (I/O) request to the OS and waits for the result, or when it is detected by a timer that the processor core 101 has executed that process for a certain period of time, or when a process having a high priority becomes executable as a result of an interrupt operation by an I/O device. Hence, the process manager 410 performs interrupt management too.

In the first embodiment, when the processor core 101 switches to the idle state, if an operation for data transfer is being performed between at least one I/O device and the main memory 30, then the process switcher 411 performs control to switch the information processing device 1 (the SoC 100) to the WAIT mode. However, when the processor core 101 enters the idle state, if an operation for data transfer is not being performed between any I/O device and the main memory 30, then the process switcher 411 performs control to switch the information processing device 1 (the SoC 100) to the DEEP SLEEP mode. The details of such control are given later. Herein, the process switcher 411 can be considered to correspond to a "state controller" mentioned in claims.

As illustrated in FIG. 11, the process switcher 411 includes a device state determiner 412. In the case in which the processor core 101 stops the process being currently executed and attempts to switch (dispatch) to another process, but itself switches to the idle state because of the absence of an executable process at that point of time; the device state determiner 412 determines whether to switch the SoC 100 (the information processing device 1) to the WAIT mode or to the DEEP SLEEP mode based on device state management information managed by a device state manager 421 (described later).

The device manager 420 illustrated in FIG. 11 manages various devices such as various I/O devices and timers. For each type of device, the device manager 420 includes a software module called a device driver. When an input-output operation request (an I/O request) is issued from an application program or the OS with respect to a device, the device manager 420 instructs the device driver corresponding to the concerned device to perform input-output operations. Besides, the device manager 420 also performs protocol handling that is required to enable communication via a network.

The device manager 420 includes the device state manager 421 that manages the device state management information based on notifications received from each device driver. The device state management information at least holds information that is required in determining that, because one or more devices are performing input-output operations or are waiting for an input event, the SoC 100 should not be switched to the DEEP SLEEP mode. FIG. 12 is a diagram illustrating an example of the device state management information that is managed by the device state manager 421. According to the first embodiment, the device state management information is in the form of a table in which device identifiers used in identifying the types of I/O devices are held in a corresponding manner with state information indicating the states of I/O devices (in FIG. 12, state information "in execution" indicates that an I/O device is executing an input-output operation, while state information "stopped" indicates that an I/O device is not performing any operation).

Each device driver notifies the device state manager 421 about the fact that the corresponding I/O device is performing input-output operations or is waiting for an input event (i.e., about the fact that the SoC 100 should not be switched to the DEEP SLEEP mode). As a result, it becomes possible to prevent a situation in which the SoC 100 is switched to the DEEP SLEEP mode so that input-output operations cannot be carried on or an input event cannot be awaited. In the first embodiment, when an I/O device is performing input-output operations or is waiting for an input event, the corresponding device driver operates the I/O device and registers the start and the end of the input-output operations or registers the start and the end of waiting for the input event directly in the device state management information; and notifies the device state manager 421 about the status.

The file manager 430 illustrated in FIG. 11 manages the data, which is stored in the memory area of the second memory device (such as a NAND flash memory, an SD card, an SSD, or an HDD) managed by the device manager 420, in units called files. The memory manager 440 illustrated in FIG. 11 divides the space of the main memory 30 into small areas and manages those areas with the aim of effectively using the main memory 30 of the information processing device 1; as well as allocates/releases the areas in the main memory 30 in response to the requests from the OS or individual computer programs. Moreover, the memory manager 440 manages the virtual memory too.

Given below is the detailed explanation of the operations performed by the information processing device 1 and the operating system (OS) in which the power consumption reduction method according to the invention is implemented.

Figure 13:
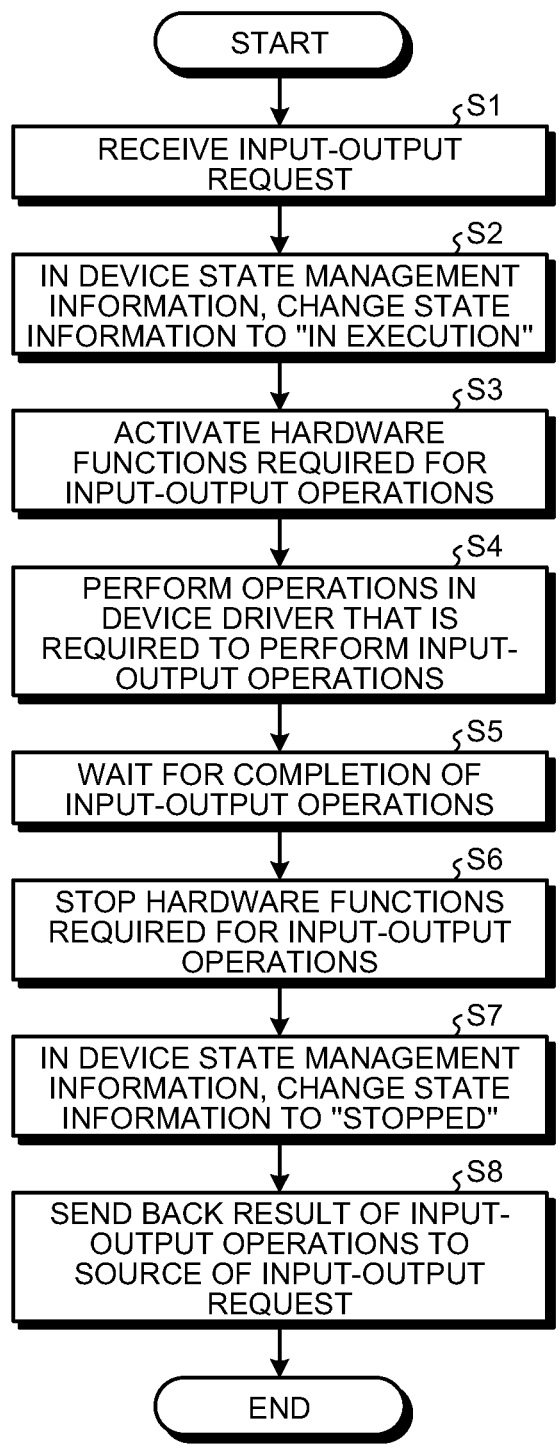
FIG. 13 is a flowchart for explaining an example of operations performed by a device driver according to the first embodiment.

Firstly, explained below with reference to FIG. 13 is an example of operations performed by a device driver according to the first embodiment. FIG. 13 is a flowchart for explaining an example of operations performed by a device driver according to the first embodiment. As illustrated in FIG. 13, when an input-output request is received from the OS or an application program (Step S1); from among the pieces of state information included in the device state management information, the device driver sets "in execution" as the state information corresponding to the device identifier that identifies the corresponding I/O device (Step S2). Then, the device driver performs an operation to activate the hardware configuration required to perform the requested input-output operations (Step S3). Subsequently, the device driver performs operations (such as managing a buffer area in the memory used in the data transfer using DMA) that are required to perform the requested input-output operations (Step S4). Then, the device driver waits for the completion of the activated input-out operations (is notified about the completion by means of an interrupt or a graph indicating completion is detected by polling) (Step S5); and performs an operation to stop the hardware functions as may be necessary (Step S6). Subsequently, in the device driver management information, the device driver sets "stopped" as the state information corresponding to the device identifier that identifies the corresponding I/O device (Step S7) and sends back the result of the input-output operations to the source of the input-output request (Step S8).

Thus, in the first embodiment, the device state manager 421 manages the device state management information in the form of a table, and each device driver writes the state information directly in the table. However, that is not the only possible case. Alternatively, for example, the device state manager 421 can provide a function for registering the state information, and each device driver can call that function and update the table in an indirect manner.

In the case of using a storage device such as a NAND flash memory or an SD card, or in the case of using an I/O device that communicates using a serial interface such as I2C or SPI; the operations of a device driver are performed in the sequence illustrated in FIG. 13. However, in the case of using a network device such as a wireless LAN, if the operations of an I/O device are started/stopped in response to each input-output request as illustrated in FIG. 13, then it leads to an increase in the overhead. Hence, in the case in which input-output requests are issued for a number of times within a short period of time; even after the operations in response to a single input-output request are completed, the hardware functions are not stopped and the corresponding state information in the device state management information is set to "in execution". If a state in which input-output requests are not issued goes on, then the hardware functions can be stopped and the corresponding state information in the device state management information can be changed to "stopped".

In the case of using an activation-enabled device such as a keypad (a keyboard); the input can be monitored even in the DEEP SLEEP mode of the SoC 100, and the SoC 100 can be activated in response to an input. Hence, the activation-enabled devices need not be managed by the device state manager 421.

Generally, the OS performs operations while switching a plurality of processes using the process switcher 411. The processes managed by the OS can broadly take two states, namely, an executable state and an event waiting state. Moreover, the processes are managed in a queue (a process queue) according to their priority. The processor core 101 executes a process that is selected based on its priority from among the processes in the executable state. When a process issues an input-output request to an I/O device and is waiting for the completion of the request processing, or when a process is waiting for the arrival of communication data from another process; the process switches to the event waiting state. Regarding the cases in which the process switcher 411 switches the process being executed by the processor core 101, it is possible to think of the following three cases. In the first case, a process being executed issues an input-output request and switches to the event waiting state till the completion of the request processing. In the second case, an interrupt regarding input-output completion is received from an I/O device, and the corresponding process in the event waiting state switches to the executable state and has a higher priority than the process being executed. In the third case, an interrupt is issued by a timer that is set by the OS to issue interrupts at regular time intervals so that no particular process occupies the processor core 101 for a prolonged time. In each of these cases, when an input-output request is issued to the OS and the mode is a kernel mode or when an interrupt signal is received and an interrupt handler is running in the kernel mode, the operations are performed in the Kernel of the OS.

Figure 14:
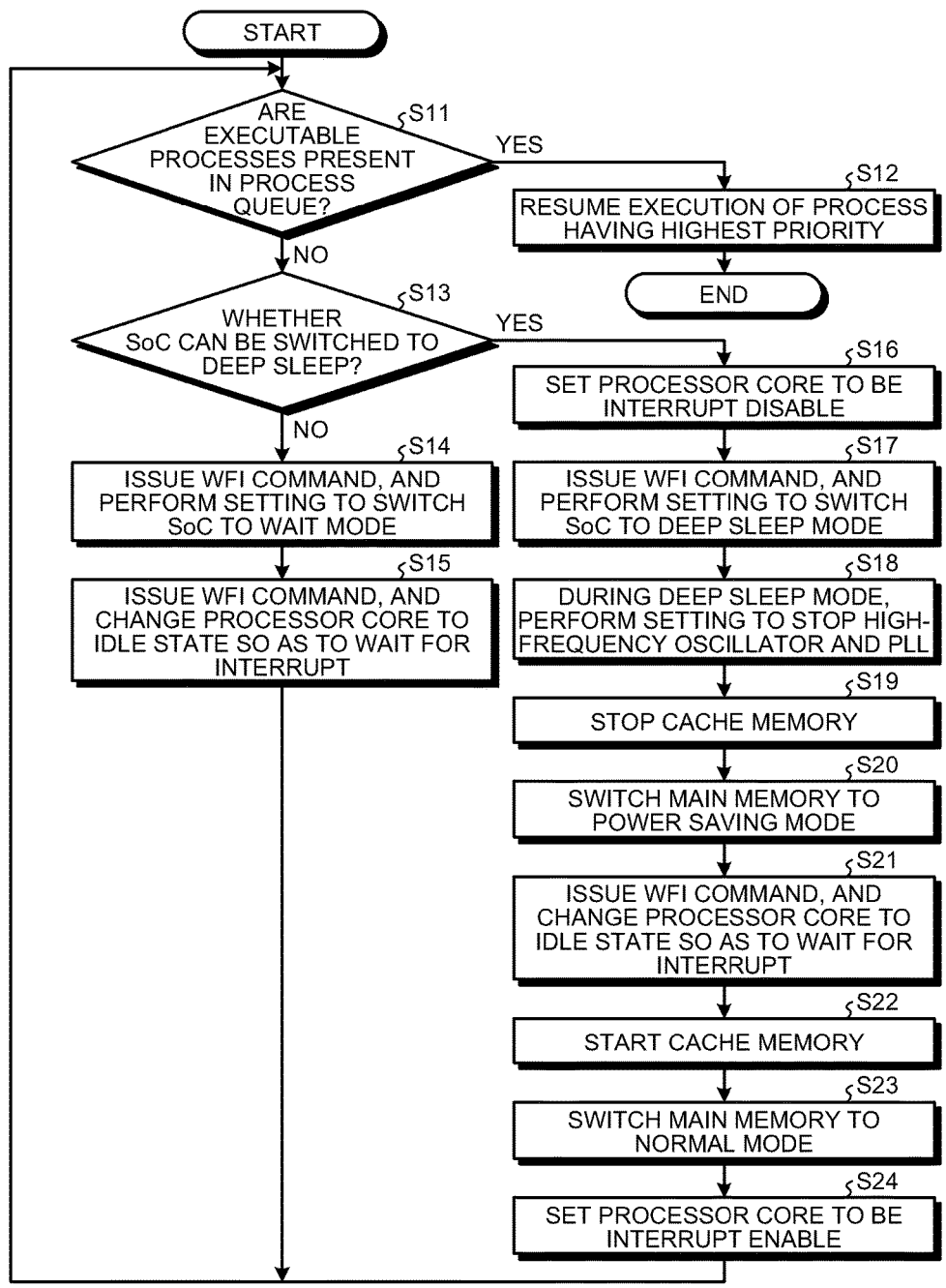
FIG. 14 is a flowchart for explaining an example of operations performed by a process switcher according to the first embodiment.

Explained below with reference to FIG. 14 is an example of operations performed by the process switcher 411 according to the first embodiment. FIG. 14 is a flowchart for explaining an example of operations performed by the process switcher 411. At the time of switching between processes in response to the occurrence of any one of the three cases mentioned above; firstly, the process switcher 411 stops the process being executed (and stores the execution state so that the execution can be resumed later), and inserts that process in the process queue. After that, the operations illustrated in FIG. 14 are started. As illustrated in FIG. 14, firstly, the process switcher 411 refers to the process queue and checks whether or not processes in the executable state are present in the process queue (Step S11). If processes in the executable state are present in the process queue (YES at Step S11), then the process switcher 411 selects the process having the highest priority from among the processes in the executable state in the process queue, and resumes the execution of the selected process (Step S12). However, if no process in the executable state is present in the process queue (NO at Step S11), then the device state determiner 412 of the process switcher 411 refers to the device state management information and determines whether or not the SoC 100 can be switched to the DEEP SLEEP mode when the processor core 101 enters the idle state (Step S13). In the first embodiment, if one or more device identifiers specified in the device state management information have the corresponding state information set to "in execution", then the device state determiner 412 determines that the SoC 100 should not be switched to the DEEP SLEEP mode.

If it is determined that the SoC 100 should not be switched to the DEEP SLEEP mode (NO at Step S13), then the device state determiner 412 sets the control register of the SoC 100, which performs setting about whether to switch the SoC 100 to the WAIT mode or the DEEP SLEEP mode when a wait for interrupt (WFI) command is issued and the processor core 101 enters the idle state so as to wait for an interrupt, to switch the SoC 100 to the WAIT mode (Step S14). For example, in the control register, the process switcher 411 can write information that specifies the WAIT mode. In essence, when the processor core 101 enters the idle state (an interrupt waiting state), if an operation for data transfer (including preprocessing for data transfer) is being performed between at least one I/O device and the main memory 30, then it is possible to think that the process switcher 411 performs control to switch the SoC 100 to the WAIT mode (the third state) in which the power consumption is lower as compared to the running state (a command execution state) of the processor core 101.

Subsequent to the operation performed at Step S14, the process switcher 411 issues a WFI command and switches the processor core 101 to the idle state so as to wait for an interrupt (Step S15). When the processor core 101 switches from the idle state to the running state due to an interrupt signal from an I/O device; only after the interrupt handler performs interrupt handling, the process switcher 411 repeats the operations starting from Step S11.

Meanwhile, at Step S13, if it is determined that the SoC 100 can be switched to the DEEP SLEEP mode (YES at Step S13), then the process switcher 411 sets the processor core 101 to be interrupt disable (Step S16) and then sets the control register of the SoC 100, which performs setting about whether to switch the SoC 100 to the WAIT mode or the DEEP SLEEP mode when a wait for interrupt (WFI) command is issued and the processor core 101 enters the idle state, to switch the SoC 100 to the DEEP SLEEP mode (Step S17). For example, in the control register, the process switcher 411 can write information that specifies the DEEP SLEEP mode. In essence, when the processor core 101 enters the idle state, if an operation for data transfer is not being performed between any one I/O device and the main memory 30, then it is possible to think that the process switcher 411 performs control to switch the SoC 100 to the DEEP SLEEP mode (the fourth state) in which the power consumption is lower than the WAIT mode.

Subsequent to the operation performed at Step S17, the process switcher 411 sets a control register of the clock control module 110 to stop the operations of the high-frequency oscillator 108 and the PLL 111 during the DEEP SLEEP mode (Step S18). That is, during the DEEP SLEEP mode, it is possible to think that the process switcher 411 performs control to stop the oscillations of the high-frequency oscillator 108, which generates the high-frequency clock (the main clock) used in the running state of the processor core 101. However, that is not the only possible case. Alternatively, subsequent to the operation performed at Step S17, the process switcher 411 can set a control register of the PMIC 20 to stop the power supply from the PMIC 20 to the high-frequency oscillator 108 during the DEEP SLEEP mode. That is, during the DEEP SLEEP mode, the process switcher 411 can perform control to stop the power supply to the high-frequency oscillator 108, which generates the high-frequency clock (the main clock) used in the running state of the processor core 101.

Meanwhile, regarding the setting value of the control register set at Step S18; depending on the SoC, it is often the case that the setting value which is set once at the start remains valid till the settings are changed again. Hence, in such a case, if the setting value is set during the initialization of the OS, then the operation at Step S18 can be skipped.

Subsequent to the operation performed at Step S18, in preparation of stopping the power supply to the cache memory 140 during the DEEP SLEEP mode, the process switcher 411 stops the operations of the cache memory 140 of the processor core 101 (Step S19); unloads such data stored in the cache memory 140 for which a dirty flag is set to an active level (i.e., the data that is written by the processor core 101 only in the cache memory 140 but not in the main memory 30) to the main memory 30; and sets the control register of the PMIC 20 to stop the power supply from the PMIC 20 to the cache memory 140 during the DEEP SLEEP mode. That is, at the time of switching to the DEEP SLEEP mode, it is possible to think that the process switcher 411 writes such data stored in the cache memory 140 which is not written in the main memory 30 (i.e., writes the dirty data) in the main memory 30, and then performs control to stop the power supply to the cache memory 140. Meanwhile, alternatively, the configuration can be such that, even during the DEEP SLEEP mode, the power supply to the cache memory 140 is not stopped so as to ensure that the data is not erased. In that case, the operation at Step S19 can be skipped. Instead, the process switcher 411 can set the control register of the PMIC 20 in such a way that, during the DEEP SLEEP mode, the value of the power-supply voltage supplied to the cache memory 140 is equal to the value of the power-supply voltage supplied in the running state of the processor core 101 (or greater than the value supplied in the DEEP SLEEP mode). That is, in the fourth state, the process switcher 411 can perform control to set the power-supply voltage supplied to the cache memory 140 to a value same as the value of the power-supply voltage supplied in the running state of the processor core 101.

Subsequently, the process switcher 411 switches the main memory 30 to the power saving mode (Step S20). When a DRAM such as an LPDDR2 is used as the main memory 30, a control register of the memory controller 102 is set and a control command is sent from the memory controller 102 to the DRAM so that the DRAM switches to the self-refresh mode. That is, if a volatile memory is used as the main memory 30, then it is possible to think that, during the DEEP SLEEP mode, the process switcher 411 performs control to switch the main memory 30 to the self-refresh state. However, if a nonvolatile memory is used as the main memory 30, then the process switcher 411 can set the control register of the PMIC 20 in such a way that the power supply from the PMIC 20 to the main memory 30 is stopped. Thus, if a nonvolatile memory is used as the main memory 30, then it is possible to think that, during the DEEP SLEEP mode, the process switcher 411 stops the power supply to the main memory 30.

Then, the process switcher 411 issues a WFI command and the processor core 101 enters the idle state so as to wait for an interrupt (Step S21). Later, when the processor core 101 enters the running state from the idle state due to an interrupt signal from an I/O device; firstly, an invalidation operation is performed in which an invalidation flag indicating invalidity of data is set with respect to all cache lines in the cache memory 140, and the cache memory 140 is initialized and operated (Step S22). Then, the main memory 30 is switched from the power saving mode to the normal operating mode (Step S23). If a DRAM is used as the main memory 30, then the control register of the memory controller 102 is set and a control command is sent from the memory controller 102 to the DRAM so that the DRAM is released from the self-refresh mode and is switched to the normal mode. On the other hand, if a nonvolatile memory is used as the main memory 30, then the control register of the PMIC 20 is set in such a way that there is resumption of the power supply from the PMIC 20 to the main memory 30. Subsequently, the processor core 101 is set to be interrupt enable (Step S24). After the interrupt handler performs interrupt handling, the process switcher 411 repeats the operations starting from Step S11.

Meanwhile, of the computer programs of the process switcher 411, the computer programs corresponding to operations which should be performed during the power saving mode of the main memory 30 need to be loaded either in the internal memory 125 of the SoC 100, which is accessible even during the power saving mode of the main memory 30, or in a second main memory that is not switched to the power saving mode. Even in the case in which the result of determination at Step S13 illustrated in FIG. 14 is not affirmative (NO at Step S13) and in which the SoC 100 is switched to the WAIT mode; it is possible to stop the cache memory 140 in an identical manner to the case of switching the SoC 100 to the DEEP SLEEP mode or, if the I/O devices that access the main memory 30 are not in operation, it is possible to switch the main memory 30 to the power saving mode.

Figure 15:
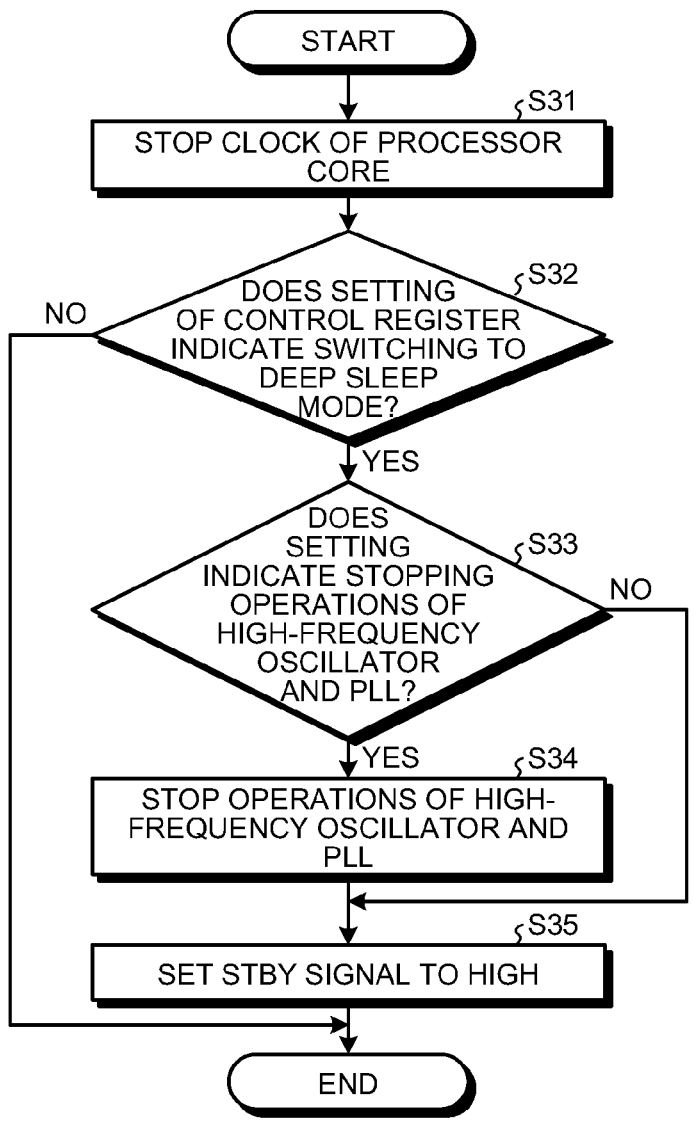
FIG. 15 is a flowchart for explaining an example of operations performed by the SoC according to the first embodiment.

As described above, as the processor core 101 enters the idle state in response to the issuing of a WFI command, the SoC 100 performs an operation to switch to the WAIT mode or the DEEP SLEEP mode according to a sequence illustrated in FIG. 15. Firstly, the clock control module 110 stops the clock of the processor core 101 (i.e., performs clock gating) (Step S31). Then, the clock control module 110 refers to the control register of the clock control module 110 and determines whether to switch the SoC 100 to the WAIT mode or the DEEP SLEEP mode (Step S32). In this example, whether to switch the SoC 100 to the WAIT mode or the DEEP SLEEP mode is set in the control register of the clock control module 110. Moreover, the state of the high-frequency oscillator 108 and the state of the PLL 111 during the DEEP SLEEP mode are also set in the control register of the clock control module 110. However, that is not the only possible case. In essence, as long as the configuration includes a clock controller that controls the clock at the time of switching the SoC 100 to the WAIT mode or the DEEP SLEEP mode, it serves the purpose. In this example, the explanation is given for a case in which the clock control module 110 functions as the clock controller. However, that is not the only possible case.

At Step S32, if it is determined to switch the SoC 100 to the DEEP SLEEP mode (YES at Step S32), then the clock control module 110 checks whether or not the control register thereof is set to stop the high-frequency oscillator 108 and the PLL 111 during the DEEP SLEEP mode (Step S33). If the control register is set to stop those components (YES at Step S33), then the clock control module 110 stops the high-frequency oscillator 108 and the PLL 111 (Step S34). Subsequently, the clock control module 110 sets an output signal, which is used in notifying to the outside that the SoC 100 has switched to the DEEP SLEEP mode, to HIGH (or to Enable) (Step S35). That marks the end of the operations performed to switch the SoC 100 to the DEEP SLEEP mode. Meanwhile, if it is determined not to switch the SoC 100 to the DEEP SLEEP mode (NO at Step S32); then, at that point of time, it marks the end of the operations performed to switch the SoC 100 to the WAIT mode.

Figure 16:
FIG. 16 is a diagram for explaining the cooperation between the SoC and the PMIC according to the first embodiment.

As illustrated in FIG. 16, to the PMIC 20, the SoC 100 supplies an STBY signal that indicates whether or not the SoC 100 is in the DEEP SLEEP mode (for example, if the SoC 100 is in the DEEP SLEEP mode, the STBY signal is set to a high level (HIGH)). When the SoC 100 and the PMIC 20 perform operations in cooperation with each other, it becomes possible to control the power supply. For example, with respect to a DC/DC converter built into it, the PMIC 20 sets the voltage that is to be output when the STBY signal is set to a high level and sets the voltage that is to be output when the STBY signal is set to a low level (LOW).

At the time when the STBY signal is at the high level due to the DEEP SLEEP mode of the SoC 100, if the voltage supplied to the processor core 101 by the PMIC 20 is set to "0", then it becomes possible to stop the power supply during the DEEP SLEEP mode. The DC/DC converter, which supplies power to the devices that are not activation-enabled and to the nonvolatile main memory in the SoC 100, supplies voltage according to that setting. As a result, it becomes possible to reduce the power consumption during the DEEP SLEEP mode. Moreover, at the time when the STBY signal is at the high level due to the DEEP SLEEP mode of the SoC 100, if the voltage supplied to the processor core 101 by the PMIC 20 is set to the minimum voltage that enables retention of values of the registers in the circuit, it becomes possible to reduce the power consumption while retaining the state of the circuit. When the DC/DC converter, which supplies power to the processor core 101, supplies voltage according to that setting, it becomes possible to reduce the power consumption during the DEEP SLEEP mode while retaining the state. In essence, in the DEEP SLEEP mode, as long as the power-supply voltage supplied to the processor core 101 is set to a lower value than the power-supply voltage supplied in the running state of the processor core 101 (for example, a lower value than the value during the WAIT mode), it serves the purpose. From another perspective, as described above, when the processor core 101 enters the idle state, if an operation for data transfer is not being performed between any I/O device and the main memory 30, then it is possible to think that the process switcher 411 performs control for setting the control register of the SoC 100 to switch to the DEEP SLEEP mode and for lowering the voltage supplied to the processor core 101. When the STBY signal is set to the high level, the voltage of the DC/DC converter, which supplies power to the cache memory 140, is either set to "0" if the dirty data stored in the cache memory 140 is to be written in the main memory 30 before the SoC 100 switches to the DEEP SLEEP mode or set to the minimum voltage that enables retention of data if the data is to be retained without losing even during the DEEP SLEEP mode.

Figure 17:
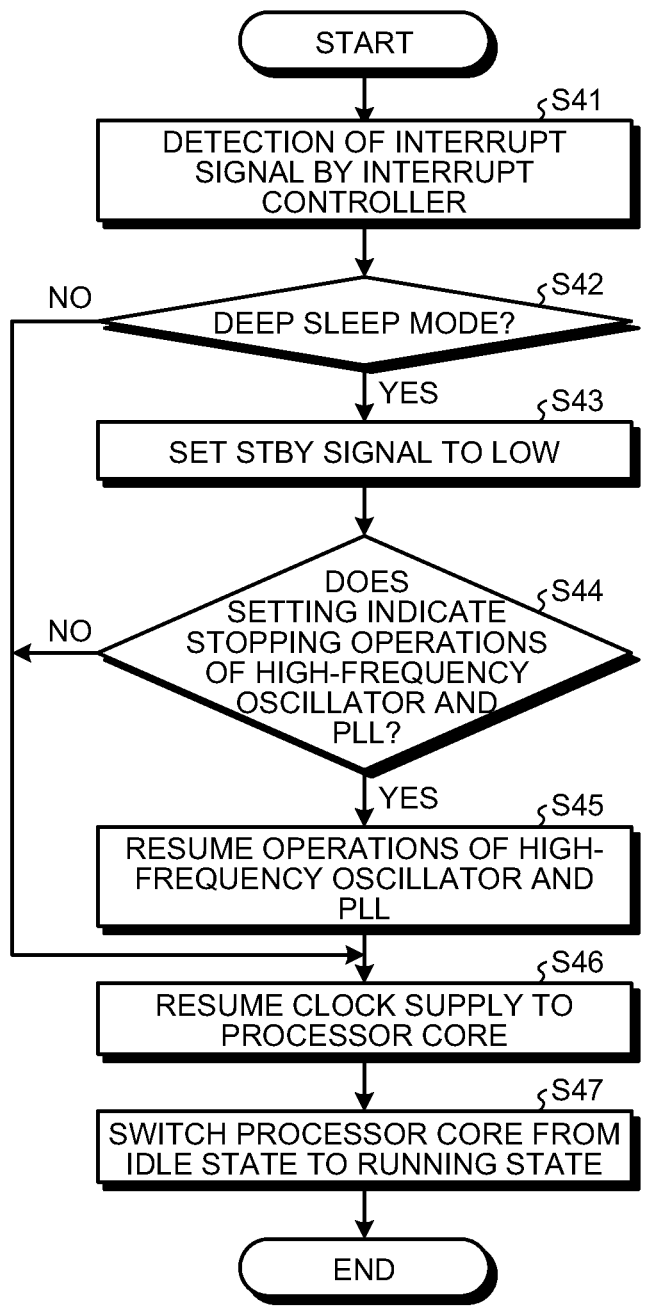
FIG. 17 is a flowchart for explaining an example of operations performed by the SoC according to the first embodiment.

Explained below with reference to FIG. 17 is an example of operations performed in the SoC 100 in response to a case in which the processor core 101 returns to the running state from the idle state due to an interrupt signal. In this example, the explanation is given for an example in which the clock control module 110 functions as a state manager that manages the state of the SoC 100. However, that is not the only possible case. Alternatively, for example, it is possible to have a configuration in which a state manager is disposed separately from the clock control module 110.

As illustrated in FIG. 17, firstly, in the SoC 100 that is waiting for an interrupt event, when the interrupt controller 120 detects an interrupt signal from an I/O device or a timer (Step S41); the clock control module 110 refers to the control register and checks whether the SoC 100 is in the DEEP SLEEP mode or in the WAIT mode (Step S42). If the SoC 100 is in the DEEP SLEEP mode (YES at Step S42), then the clock control module 110 sets the STBY signal to the low level (Step S43). Consequently, the PMIC 20 resets the value of the output voltage of the DC/DC converter from a lower-than-normal value to the normal value.

Subsequently, the clock control module 110 checks whether or not the control register has been set to stop the operations of the high-frequency oscillator 108 and the PLL 111 during the DEEP SLEEP mode (Step S44). If the control register has been set to stop the operations of the high-frequency oscillator 108 and the PLL 111 during the DEEP SLEEP mode (YES at Step S44), then the clock control module 110 resumes the operations of the high-frequency oscillator 108 and the PLL 111 (Step S45). Then, regardless of whether the SoC 100 is in the DEEP SLEEP mode or in the WAIT mode, the clock control module 110 resumes the clock supply to the processor core 101 (Step S46) and the processor core 101 enters the running state from the idle state (Step S47). Upon being entered the running state, the processor core 101 resumes the operations. If the SoC 100 was in the WAIT mode during the period of time in which the processor core 101 was in the idle state, the interrupt handler immediately starts performing interrupt handling. On the other hand, if the SoC 100 was in the DEEP SLEEP mode during the period of time in which the processor core 101 was in the idle state, then the computer programs store in the internal memory 125 initialize the cache memory 140 and resume the operations of the main memory 30, and then the SoC 100 becomes interrupt enable. Only then, the interrupt handler starts performing interrupt handling.

As described above, in the first embodiment, when the processor core 101 enters the idle state, if an operation for data transfer is being performed between at least one I/O device and the main memory 30, then the information processing device 1 is switched to the WAIT mode. However, if an operation for data transfer is not being performed between any I/O device and the main memory 30, then the information processing device 1 is switched to the DEEP SLEEP mode. As a result, it becomes possible to prevent the overhead of the suspend operation that is performed for the purpose of switching to the DEEP SLEEP mode. Hence, power saving can be achieved in a proper manner without impairing the performance of the information processing device 1.

Second Embodiment

In the second embodiment, the control register 115 of the clock control module 110 is used as the device state management information. As illustrated in FIG. 8, by controlling the clock gate 113, the clock control module 110 can perform ON/OFF control of the clock supply to the subsequently-connected device controllers. Hence, by referring to the control register 115 of the clock control module 110, it becomes possible to determine whether the clock is supplied to each device controller. That is, it can be determined whether or not the I/O device corresponding to each device controller is performing operations.

There, information that enables clock supply ON/OFF determination and that is set in the control register 115 of the clock control module 110 is used as the device state management information. In this case, the clock control module 110 fulfils the role of the device state manager 421. With reference to FIG. 13, at Step S2 prior to the start of operations performed by the I/O devices, each device driver sets the control register to ensure the clock supply from the clock control module 110. Then, at Step S7 after the end of operations performed by the I/O devices, each device driver sets the control register to ensure that the clock supply from the clock control module 110 is stopped. With such a configuration, by referring to the control register 115 of the clock control module 110, it becomes possible to determine whether or not the I/O devices are performing operations. If the device state determiner 412 refers to the control register 115 of the clock control module 110 and if the control register 115 is set to supply the clock, then it is possible to determine that an I/O device is "in execution". On the other hand, if the control register is set to stop the clock supply, then it is possible to determine that an I/O device is "stopped".

Third Embodiment

In a third embodiment, a status register of a device controller or a device is used as the device state management information. Some device controllers or devices have a status register that indicates whether or not the respective I/O devices are performing operations. For example, a status register is set to "1" when the corresponding I/O device is performing operations and is set to "0" when the corresponding I/O device is not performing operations. Hence, by referring to the status register of a device controller or a device, the device state determiner 412 can determine whether or not the corresponding I/O device is performing operations. Thus, in the third embodiment, each device controller or each device doubles up as the device state manager 421 described above.

Fourth Embodiment

In a fourth embodiment, setting information of the control register of the PMIC 20 is used as the device state management information. The PMIC 20 has a control register for the purpose of setting the DC/DC converters of various power-supply lines. Thus, by referring to the control register, it becomes possible to identify which I/O device connected to which power-supply line is being supplied with electrical power. There, a device driver operates the control register of the PMIC 20 before the corresponding I/O device performs operations, and sets the control register of the PMIC 20 to ensure that electrical power is supplied to that I/O device. At the point of time when the device ends operations, the device operator operates the setting register and sets the control register of the PMIC 20 to ensure that the power supply to the I/O device is stopped. Thus, by referring to the setting control register of the PMIC 20, the device state determiner 412 can determine which I/O devices are performing operations.

Fifth Embodiment

In a fifth embodiment, Linux is used as the operating system, and the device drivers are implemented based on the framework of Runtime PM. Thus, in a device driver that is implemented based on the framework of Runtime PM, the operations (such as hardware booting and initialization) that need to be performed before the start of input-output operations by the corresponding I/O device are implemented as a pre-operation callback function (runtime_resume( ) callback). Moreover, the operations (such as hardware stopping) that need to be performed after the end of input-output operations by the corresponding I/O device are implemented as a post-operation callback function (runtime_suspend( ) callback). Thus, before and after the execution of the input-output operations by the I/O device, the respective callback functions are called at appropriate timings. Examples of the operations that need to be performed before the start of input-output operations by an I/O device include the operation of starting the clock supply to the device controller corresponding to the I/O device and the operation of setting a value in the control register of the PMIC 20 for starting the power supply to the I/O device. Examples of the operations that need to be performed after the end of input-output operations by an I/O device include the operation of stopping the clock supply and the power supply to the corresponding device controller.

Figure 18:
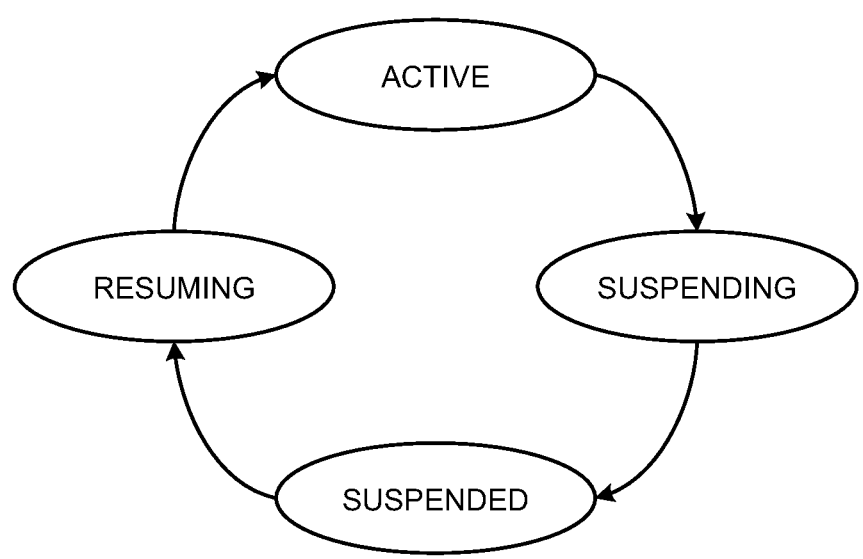
FIG. 18 is a diagram illustrating state transition of an I/O device according to a fifth embodiment.

As illustrated in FIG. 18, in Runtime PM, the states of an I/O device are expressed as one of the following four states: ACTIVE, SUSPENDING, SUSPENDED, and RESUMING. The ACTIVE state indicates that the I/O device is performing operations. The SUSPENDING state indicates that the I/O device is in the transition phase from performing the operations to stopping the operations. The SUSPENDED state indicates that the I/O device has stopped performing operations. The RESUMING state indicates that the I/O device is in the transition phase from not performing the operations to performing the operations.

Once a device driver completes the initialization operation, it switches the corresponding I/O device to the SUSPENDED state. Then, before starting the operations, the device driver calls the pre-operation callback function. Once the pre-operation callback function is called, the I/O device is switched to the RESUMING state. While the pre-operation callback function is being implemented, the I/O device is held in the RESUMING state. When the execution of the pre-operation callback function is completed, the I/O device is switched to the ACTIVE state. Then, once the I/O device finishes the operations, the device driver calls the post-operation callback function. When the post-operation callback function is called, the I/O device is switched from the ACTIVE state to the SUSPENDING state. While the post-operation callback function is being implemented, the I/O device is held in the SUSPENDING state. Once the execution of the post-operation callback function is completed, the I/O device is switched to the SUSPENDED state. In Runtime PM, the abovementioned states of an I/O device are managed using a variable called runtime_status present in the structure that manages the I/O device.

In the fifth embodiment, the timing at which the pre-operation callback function is called is same as the timing of Step S2 (registration of the start of operations with respect to the device state management information) illustrated in FIG. 13, while the timing at which the post-operation callback function is called is same as the timing of Step S7 (registration of the end of operations with respect to the device state management information) illustrated in FIG. 13. Thus, for example, in the pre-operation callback function, an operation can be performed to register the start of operations with respect to the device state management information (i.e., an operation can be performed to change the device information of the corresponding I/O device to "in execution"). Similarly, for example, in the post-operation callback function, an operation can be performed to register the end of operations with respect to the device state management information (i.e., an operation can be performed to change the device information of the corresponding I/O device to "stopped"). With that, even in an I/O device that operates according to the sequence in which Steps S2 and S7 illustrated in FIG. 13 are skipped, it becomes possible to update the device state management information at appropriate timings.

Sixth Embodiment

In a sixth embodiment, when Linux is used as the operating system and when the device drivers are implemented based on the framework of Runtime PM, the states of the I/O devices managed by the Runtime PM (i.e., the state recorded in the variable runtime_status present in the structure that manages each I/O device) are used as the state information in the device state management information illustrated in FIG. 12. In this case, the ACTIVE state, the SUSPENDING state, and the RESUMING state indicate that an I/O device is performing input-output operations; while the SUSPENDED state indicates that an I/O device is not performing any operation. That is, the ACTIVE state, the SUSPENDING state, and the RESUMING state correspond to "in execution" illustrated in FIG. 12; while the SUSPENDED state corresponds to "stopped" illustrated in FIG. 12.

In the sixth embodiment, based on the framework of the Runtime PM, as long as a device driver uses the pre-operation callback function for hardware activation and initialization, and uses the post-operation callback function for hardware stopping; it serves the purpose. Thus, the operations for updating the device state management information, such as the operations performed at Steps S2 and S7 illustrated in FIG. 13, are not required.

In the sixth embodiment, the device state determiner 412 refers to the state (runtime_status) of an I/O device held by a device driver compatible to Runtime PM. Then, if the state is the SUSPENDED state, then the I/O device is determined to have been stopped. However, if the state indicates any other state other than the SUSPENDED state, then the I/O device is determined to be performing operations. At the time of kernel initialization, the device state determiner 412 registers in advance the target device drivers for determination. Then, at Step S13 illustrated in FIG. 14, if all target I/O devices for determination have the SUSPENDED state as the states managed by Runtime PM, then the device state determiner 412 determines that the SoC 100 can be switched to the DEEP SLEEP mode (YES at Step S13). However, if all target I/O devices for determination do not have the SUSPENDED state as the states managed by Runtime PM, then the device state determiner 412 determines that the SoC 100 should not be switched to the DEEP SLEEP mode (NO at Step S13).

Seventh Embodiment

In a seventh embodiment, in the case in which an electrical storage device in the power-supply device 10 is holding sufficient electrical energy, the SoC 100 is switched to the WAIT mode even if it is possible to switch the SoC 100 to the DEEP SLEEP mode. As a result, it becomes possible to enhance the response time. In the seventh embodiment, an electrical energy detecting device (not illustrated) is additionally disposed for detecting the electrical energy stored in the electrical storage device.

Figure 19:
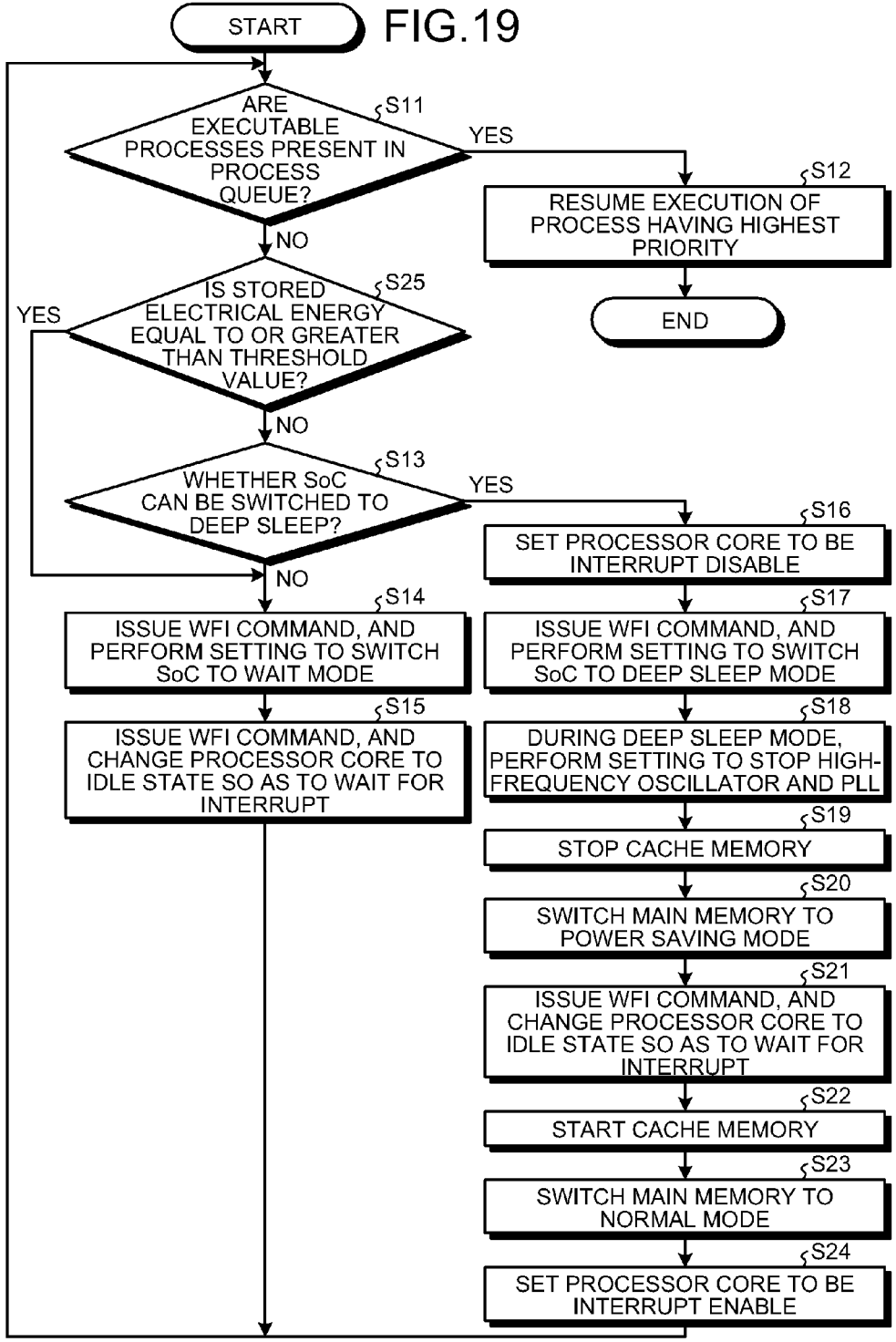
FIG. 19 is a flowchart for explaining an example of operations performed by a process switcher according to a seventh embodiment.

In the seventh embodiment, as illustrated in FIG. 19, in the sequence of operations for switching (dispatching) to a process, the operation performed at Step S13 illustrated in FIG. 14 (i.e., the operation of determining whether to switch the SoC 100 to the WAIT mode or the DEEP SLEEP mode) is preceded by an additional operation of determining whether or not the electrical energy detected by the electrical energy detecting device (i.e., the electrical energy stored in the electrical storage device) is equal to or greater than a predetermined value (threshold value) (Step S25). If it is determined that the electrical energy detected by the electrical energy detecting device is equal to or greater than the threshold value (YES at Step S25), then the process switcher 411 performs setting to invariably switch the SoC 100 to the WAIT mode.

The electrical energy detecting device detects the electrical energy stored in a primary battery or a secondary battery used in the power-supply device as well as detects the electrical energy stored in an electrical storage device that is used in combination with an energy harvesting device. For example, regarding a primary battery, or regarding a secondary battery, or regarding a capacitor such as an electrical double layer capacitor or a lithium-ion capacitor used as an electrical storage device in combination with an energy harvesting device; the electrical energy stored therein can be known by measuring the output voltage thereof. Hence, an A/D converter can be used as an electrical energy detecting device. If a battery such as a lithium-ion battery is used as the electrical storage device, then a coulomb counter can be used as the electrical energy detecting device. That is, the electrical energy stored in the battery can be known if the electrical charging-discharging of the battery is measured using a coulomb counter.

The electrical energy detecting device can read data from the SoC 100 using a connection of I2C, SPI, or GPIO. Meanwhile, the electrical energy detecting device can be connected to the microcomputer described above and can periodically send the electrical energy read from the microcomputer to the SoC 100. Alternatively, only when the electrical energy falls below a threshold value, the electrical energy detecting device can send the electrical energy from the microcomputer to the SoC 100. Still alternatively, the SoC 100 can periodically read the electrical energy stored in the microcomputer.

Eighth Embodiment

Figure 20:
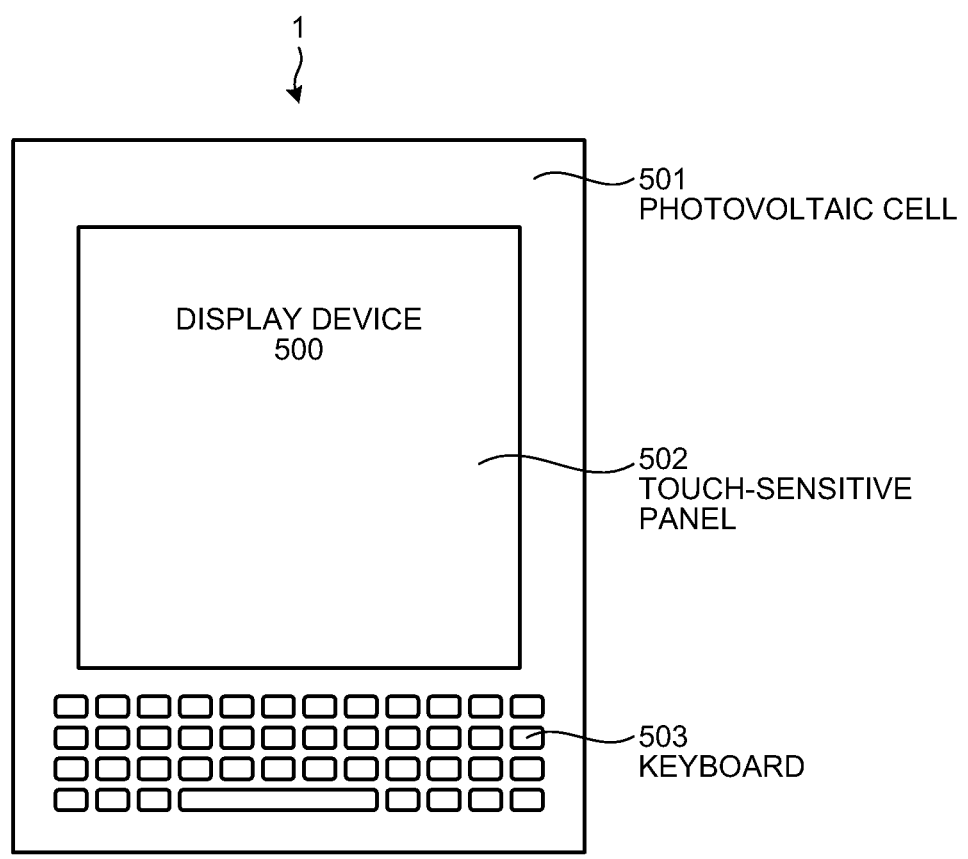
FIG. 20 is a diagram illustrating an external appearance of the information processing device according to an eighth embodiment.

Given below is the explanation of an eighth embodiment. In the following explanation, the portion that is common with the embodiments described above is not explained again. In the eighth embodiment, the information processing device to which the invention is implemented is a tablet-type information processing device that operates on the electrical power generated using a photovoltaic cell. FIG. 20 is a diagram illustrating an external appearance of the information processing device 1 according to the eighth embodiment. The tablet-type information processing device 1 includes, on the terminal front surface, a display device 500 in the form of a reflection-type liquid crystal display or an electronic paper having low power consumption; and includes a photovoltaic cell 501 in the portion other than the display device 500 that is disposed on the terminal front surface. Moreover, a touch-sensitive panel 502 that functions as a pointing device is provided on the surface of the display device 500; while a keyboard 503 is provided in the portion on the terminal front surface that does not overlap with the display device 500. Herein, the keyboard 503 can be implemented by superimposing the touch-sensitive panel 502, which is transparent in nature, on the surface of the photovoltaic cell 501; or can be implemented as a mechanical keyboard using a transparent material or using a material having only a small portion having the light shielding property.

Figure 21:
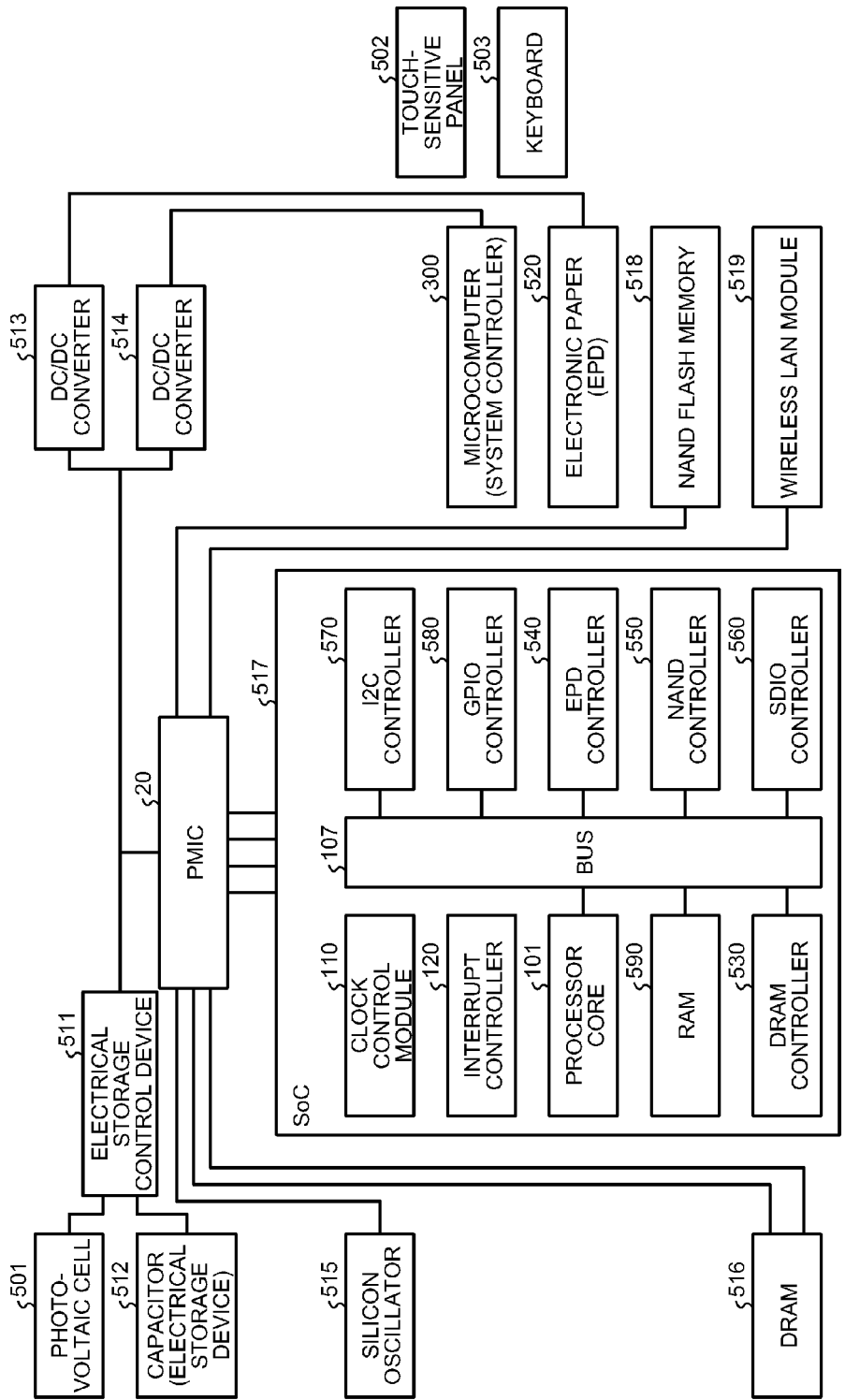
FIG. 21 is a diagram illustrating an exemplary configuration of the information processing device according to the eighth embodiment.
Figure 22:
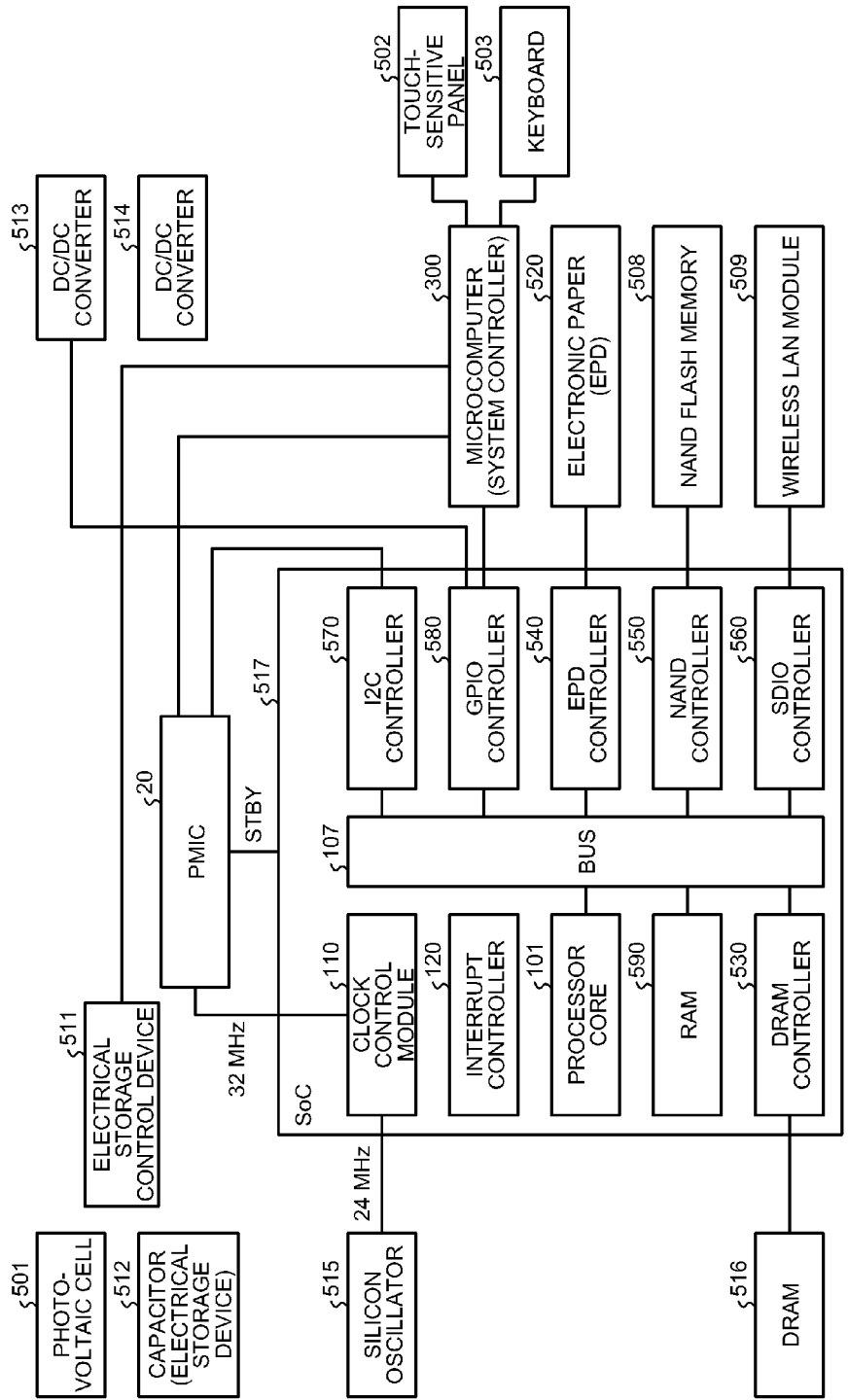
FIG. 22 is a diagram illustrating an exemplary configuration of the information processing device according to the eighth embodiment.

FIGS. 21 and 22 are diagrams illustrating an exemplary configuration of the information processing device 1 according to the eighth embodiment. In FIG. 21 is illustrated the relation of connection of power supply lines among the components (modules) constituting the information processing device 1. In FIG. 22 is illustrated the relation of connection of signal lines among the components (modules) constituting the information processing device 1.

As illustrated in FIGS. 21 and 22, the information processing device 1 includes the photovoltaic cell 501, an electrical storage control device 511, a capacitor (an electrical storage device) 512, the PMIC 20, DC/DC converters 513 and 514, a silicon oscillator 515, a DRAM 516, an SoC 517, the microcomputer 300, a NAND flash memory 518, a wireless LAN module 519, an electronic paper (EPD) 520, the touch-sensitive panel 502, and the keyboard 503. Herein, the combination of the photovoltaic cell 501, the electrical storage control device 511, and the capacitor 512 can be considered to be an example of the power-supply device 10 described above. Moreover, the silicon oscillator 515 can be considered to be an example of the high-frequency oscillator 108 described above. Furthermore, the DRAM 516 can be considered to be an example of the main memory 30 described above. Moreover, the NAND flash memory 518 can be considered to be an example of the storage device 210 described above. Furthermore, the wireless LAN module 519 can be considered to be an example of the network device 220. Moreover, the electronic paper 520 can be considered to be an example of the display device 200 described above. Furthermore, the touch-sensitive panel 502 and the keyboard 503 can be considered to be an example of the HID 230 described above.

The SoC 517 includes, as internal modules, the processor core 101, a DRAM controller 530, an EPD controller 540, a NAND controller 550, an SDIO controller 560, an I2C controller 570, a GPIO controller 580, the clock control module 110, the interrupt controller 120, a RAM 590, and the bus 107. Moreover, although not illustrated in the drawings, the SoC 517 includes, as an internal module, a real time clock (RTC) having a clocking function in an identical manner to the first embodiment. In this example, The DRAM controller 530 can be considered to be an example of the memory controller 102 described above. Moreover, the EPD controller 540 can be considered to be an example of the display device controller 103. Furthermore, the NAND controller 550 can be considered to be an example of the storage controller 104. Moreover, the SDIO controller 560 can be considered to be an example of the network controller 105. Furthermore, the RAM 590 can be considered to be an example of the internal memory 125.

Meanwhile, although not illustrated in detail in the drawings, in an identical manner to the first embodiment, the interrupt controller 120 is connected to each of the following components by a dedicated line different than the bus 107: the clock control module 110, the processor core 101, the DRAM controller 530, the EPD controller 540, the NAND controller 550, the SDIO controller 560, the I2C controller 570, the GPIO controller 580, the RAM 590, and the RTC (not illustrated). In an identical manner, the clock control module 110 is connected to each of the following components by a dedicated line different than the bus 107: the interrupt controller 120, the processor core 101, the DRAM controller 530, the EPD controller 540, the NAND controller 550, the SDIO controller 560, the I2C controller 570, the GPIO controller 580, the RAM 590, and the RTC (not illustrated).

Firstly, explained below with reference to FIG. 21 is a power supply system of the information processing device 1 according to the eighth embodiment. The information processing device 1 according to the eighth embodiment runs on the electrical power generated by the photovoltaic cell 501. However, the electrical power generated only by the photovoltaic cell 501 is not sufficient to cover the power consumption at the peak of the operations performed by the entire information processing device 1. Hence, the electrical storage control device 511 performs peak assist control using the capacitor (the electrical storage device) 512. As illustrated in FIG. 21, the output of the photovoltaic cell 501 is connected to the electrical storage control device 511. Moreover, to the electrical storage control device 511 is further connected the capacitor 512. Thus, the electrical storage control device 511 is a power circuit that performs peak assist using the photovoltaic cell 501 and the capacitor 512, and converts the output voltage in tune with the input voltage of the PMIC 20 or the DC/DC converters 513 and 514 as may be necessary. In the case in which the SoC 517 is switched to a waiting mode, such as the WAIT mode or the DEEP SLEEP mode, having low power consumption and in which the electrical power generated only by the photovoltaic cell 501 is sufficient to cover the power consumption of the entire information processing device 1; the electrical storage control device 511 charges the capacitor 512 with the surplus electricity. However, when the electrical power generated only by the photovoltaic cell 501 is not sufficient to cover the power consumption of the entire information processing device 1; the electrical storage control device 511 makes up the deficit using the electrical power stored in the capacitor 512 and outputs the required electrical power.

Examples of the capacitor 512 that is used as the electrical storage device include a high-capacity capacitor such as an electrical double layer capacitor or a lithium-ion capacitor. Alternatively, instead of using a capacitor, a battery such as a lithium-ion battery can also be used as the electrical storage device. Still alternatively, the electrical storage device can be configured using the combination of a battery and a capacitor.

As illustrated in FIG. 21, the output of the electrical storage control device 511 is connected to the DC/DC converter 513 as well as the DC/DC converter 514. The PMIC 20 includes a plurality of DC/DC converters and LDO regulators, and converts the electrical power input into various voltages and then outputs the voltages. According to the control register included therein, the PMIC 20 is configured, for each DC/DC converter and each LDO regulator, to make changes in the output voltage during normal times or to make changes in the output voltage during the standby mode. The output of the PMIC 20 is connected to the silicon oscillator 515, the DRAM 516, the SoC 517, the NAND flash memory 518, and the wireless LAN module 519. Thus, the PMIC 20 supplies the necessary electrical power for the operations of those components.

When the SoC 517 switches to the standby state (the DEEP SLEEP mode), the PMIC 20 stops the power supply to the silicon oscillator 515. Once the SoC 517 comes out from the standby state (the DEEP SLEEP mode), the PMIC 20 resumes the power supply to the silicon oscillator 515. As a result, it becomes possible to reduce the power consumption of the silicon oscillator 515. The DRAM 516 requires electrical power of different voltages for a memory array and an interface circuit. Hence, for this requirement, the output of two types of voltages is connected from the PMIC 20. Regarding the SoC 517 too, electrical power of a plurality of (in the example illustrated in FIG. 21, four types of) voltages is required. Hence, in tune with that, electrical power of a plurality of voltages is connected from the PMIC 20. Meanwhile, if a plurality of different components (modules) requires electrical power of the same voltage, the output for a single DC/DC converter or a single LDO regulator from the PMIC 20 may be connected to the concerned components (modules).

The DC/DC converter 514 (in the following explanation, sometimes referred to as a "second DC/DC converter 514)", which is connected to the output of the electrical storage control device 511, supplies electrical power to the microcomputer 300. Since the microcomputer 300 controls the PMIC 20 and thus performs ON/OFF control of the power source of the entire information processing device 1, the electrical power required for the operations of the microcomputer 300 is supplied from the DC/DC converter 514 that is independent of the PMIC 20.

The DC/DC converter 513 (in the following explanation, sometimes referred to as a "first DC/DC converter 513") which is connected to the output of the electrical storage control device 511, supplies electrical power to the electronic paper 520. However, if the electrical power required for the operations of the electronic paper 520 can be supplied from the PMIC 20, then the configuration can be such that the electrical power to the electronic paper 520 is supplied from the PMIC 20 without using the first DC/DC converter 513.

Meanwhile, in the eighth embodiment, although the photovoltaic cell 501 is used as the power source supply, it is also possible to use a power-generating equipment in which energy harvesting of heat energy or vibrational energy is used. Alternatively, for example, wireless power feed can also be used as the power supply source. Still alternatively, for example, a dry cell can be used as the power supply source, and can be configured to perform peak assist in combination with a capacitor.

Explained below with reference to FIG. 22 are the components (modules) of the information processing device 1 according to the eighth embodiment, and connection among those components. The SoC 517, which is the main constituent element of the information processing device 1, is a semiconductor chip having a computer system integrated therein. As far as the clock signals required to operate the SoC 517, a main clock of 24 MHz (i.e., the high-frequency clock described above) and a sub-clock of 32 KHz (i.e., the low-frequency clock described above) are connected to the input of the clock control module 110. Herein, the sub-clock of 32 KHz is required also by the PMIC 20. Hence, in the configuration illustrated in FIG. 22, clock signals that are generated by the oscillation of a 32 KHz oscillator, which is built in the PMIC 20, are connected as the sub-clock to the clock control module 110 of the SoC 517. Meanwhile, although not clearly illustrated in FIG. 22, to the oscillator built into the PMIC 20, a 32 KHz crystal oscillator is attached from outside. As far as the main clock is concerned, clock signals of 24 MHz that are generated by the silicon oscillator 515 are connected as the main clock to the clock control module 110 of the SoC 517. The configuration of the clock control module 110 of the SoC 517 is identical to the first embodiment. Thus, in the clock control module 110, clock signals of a plurality of frequencies are generated by a plurality of PLLs, multipliers, and dividers; and are distributed to the components of the SoC 517. Meanwhile, in the eighth embodiment as well as the embodiments described above, the frequency of the main clock and the frequency of the sub clock are only exemplary. That is, the frequencies are not limited to those frequencies.

The interrupt controller 120 in the SoC 517 receives an interrupt request from each device in the SoC 517 (such as the I2C controller 570, the GPIO controller 580, the EPD controller 540, the NAND controller 550, the SDIO controller 560, and the timer (not illustrated); registers an interrupt vector, which enables identification of the type of the interrupt, in a register included therein; and sends an interrupt signal to the processor core 101 (i.e., notifies the processor core 101 about the interrupt). Upon receiving the interrupt signal, the processor core 101 can refer to the interrupt vector registered in the register of the interrupt controller 120, and thus can determine the device that issued the interrupt. Moreover, depending on the register settings, it is also possible to set whether or not to allow interrupts from each device. Meanwhile, the interrupt controller 120 has a function by which, when an interrupt request is received from a device during the DEEP SLEEP mode of the SoC 517, the SoC 517 is activated and guided out of the DEEP SLEEP mode.

The processor core 101 executes application programs and the operating system (OS). In FIG. 22 is illustrated a configuration of the SoC 517 as a single core SoC having a single processor core 101 built into it. However, that is not the only possible case. Alternatively, for example, it is also possible to configure the SoC 517 as a multicore SoC such as a dual core SoC having two processor cores built in or a quad core SoC having four processor cores built in.

The RAM 590 that is built in the SoC 517 is a SRAM that can be accessed at high speeds. The RAM 590 can be used as a scratch-pad memory serving as a temporary work area. Besides, since the RAM 590 is available at all times even when the main memory (in this case, the DRAM 516) cannot be used, the RAM 590 can be used in the booting of the operating system or in the operations for activation from the standby state.

Figure 23:
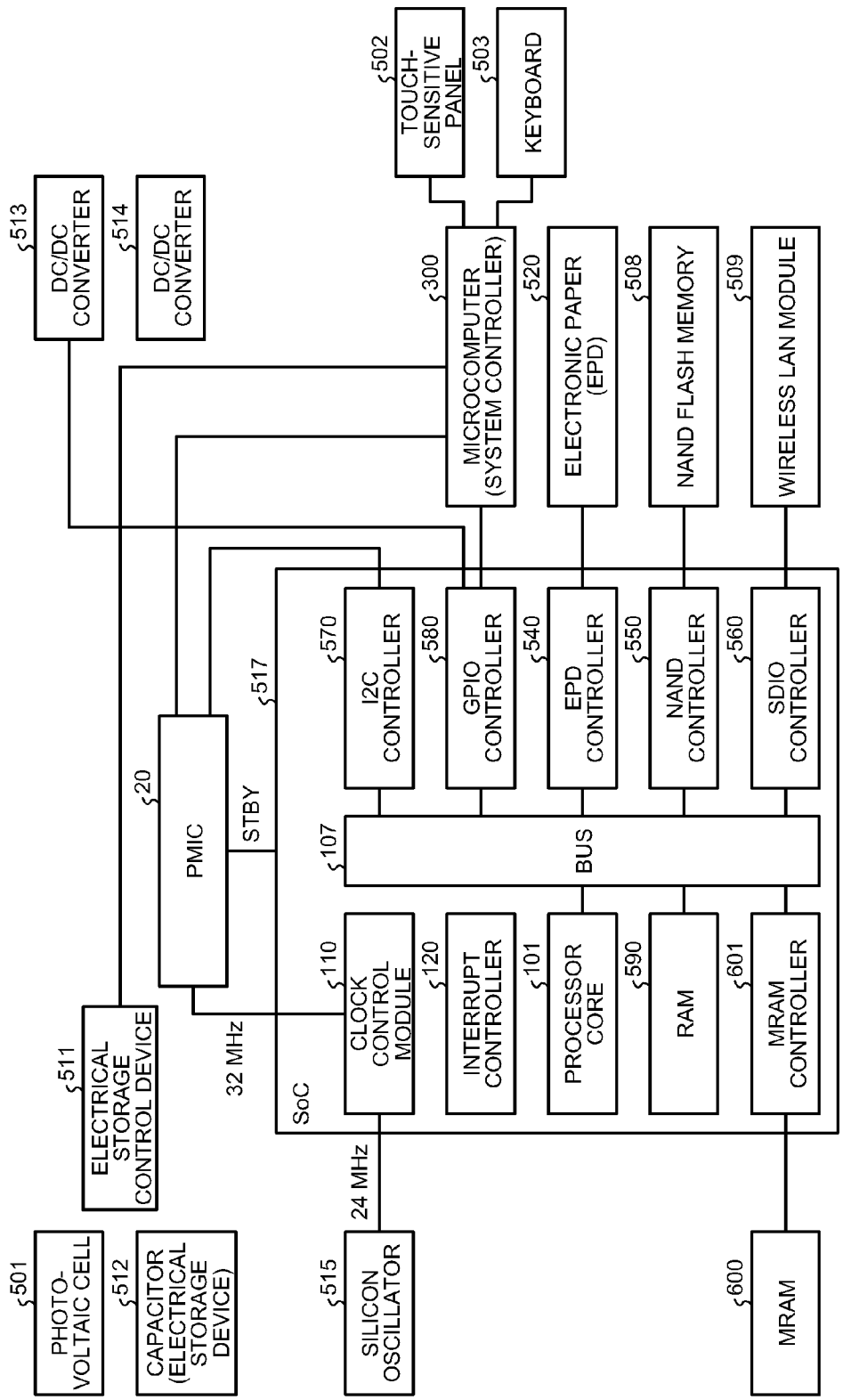
FIG. 23 is a diagram illustrating an exemplary hardware configuration of the information processing device according to a modification example.

In the information processing device 1 according to the eighth embodiment, the DRAM 516 is used as the main memory. Moreover, the DRAM 516 is connected to the DRAM controller 530 of the SoC 517. The DRAM 516 can be accessed from the processor core 101 and from various devices. In FIG. 23 is illustrated a configuration example of the information processing device 1 in the case in which an MRAM is used as the main memory. As compared to the configuration illustrated in FIG. 22, the configuration illustrated in FIG. 23 differs in the way that an MRAM 600 is used in place of the DRAM 516 as the main memory and that an MRAM controller 601 is used in place of the DRAM controller 530 as the memory controller of the SoC 517 to which the main memory is connected. As a result of using a nonvolatile memory as the main memory, while stopping the power supply to the main memory during a HIBERNATION mode (described later), the data stored in the main memory need not be unloaded in a nonvolatile secondary memory device such as a NAND flash memory.

Returning to the explanation with reference to FIG. 22, the I2C controller 570 of the SoC 517 is a general-purpose communication device to which various devices having an I2C interface can be connected. The PMIC 20 is also connected to the SoC 517 using an I2C interface. Thus, the processor core 101 of the SoC 517 can perform reading and writing with respect to the control register of the PMIC 20. Alternatively, instead of using an I2C interface, an SPI interface can also be used for establishing connection between the SoC 517 and the PMIC 20. Moreover, in addition to the I2C interface, the SoC 517 and, the PMIC 20 are also connected to each other via a signal line for the purpose of providing an STBY signal, which indicates whether or not the SoC 517 (or the processor core 101) is in the DEEP SLEEP mode. For example, when the STBY signal is switched to the active level (for example, the high level); the PMIC 20 changes the output of each DC/DC converter and each LDO regulator to the setting meant for the DEEP SLEEP mode. That results in a decrease in the power consumption during the DEEP SLEEP mode.

The GPIO controller 580 is a general-purpose digital I/O port. In the information processing device 1 according to the eighth embodiment, the GPIO controller 580 is used in the communication between the SoC 517 and the microcomputer 300 and in controlling the DC/DC converter 514 that supplies electrical power to the electronic paper 520. Herein, the electronic paper 520 consumes electrical power only for the rewriting of the display content. Hence, control is performed in such a way that electrical power to the electronic paper 520 is supplied only during rewriting. In order to achieve that, ON/OFF control of an ENABLE signal of the DC/DC converter 514 is performed from the processor core 101 via the GPIO controller 580. As is the case according to the eighth embodiment, in an information processing device that runs on the electrical power generated by a photovoltaic cell, it is desirable to use I/O devices having low power consumption. Hence, an electronic paper that consumes electrical power only at the time of rewriting the display content is particularly suitable as the display device of the information processing device that runs on the electrical power generated by a photovoltaic cell.

Meanwhile, to the SoC 517 is connected the microcomputer 300 via the GPIO controller 580. Moreover, to the microcomputer 300 are connected the touch-sensitive panel 502 and the keyboard 503. In this case, the microcomputer 300 detects the position at which the touch-sensitive panel 502 is touched; and performs chattering removal and pressed-key determination when the keyboard 503 is pressed. Then, the microcomputer 300 sends the touched position or the code of the pressed key to the processor core 101 of the SoC 517 via the GPIO controller 580. Meanwhile, the microcomputer 300 is connected also to the electrical storage control device 511, and is configured to be able to detect the stored electrical energy of the capacitor (the electrical storage device) 512 that is managed by the electrical storage control device 511. More particularly, when an electrical double layer capacitor is used as the capacitor 512, there exists a relative relationship between the output voltage of the capacitor 512 and the stored electrical energy of the capacitor 512. Hence, the configuration can be such that an A/D converter that is built into the microcomputer 300 reads the output voltage of the electrical double layer capacitor. Herein, the microcomputer 300 is also connected to the PMIC 20. Thus, if ON/OFF control of the PMIC 20 is instructed from the microcomputer 300, it becomes possible to perform ON/OFF control of the power supply for the entire information processing device 1. As described later, the microcomputer 300 receives an input from the user as well as treats the stored electrical energy of the capacitor (electrical storage device) 512 as the input, and accordingly functions as a system controller for performing ON/OFF control of the PMIC 20.

The EPD controller 540 performs a drawing operation with respect to the electronic paper 520 connected thereto. The EPD controller 540 reads image data stored in the DRAM (the main memory) 516 and/or the RAM 590; performs data conversion as may be necessary for the purpose of rewriting the data of the electronic paper 520; and outputs a signal indicating rewriting of the electronic paper 520.

The NAND controller 550 performs data reading and/or data writing with respect to the chip of a NAND flash memory 508 connected thereto. In the information processing device 1 according to the eighth embodiment, the NAND flash memory 508 is used as a secondary storage, and the memory area thereof is managed by the operating system using a file system.

Meanwhile, according to the eighth embodiment, the information processing device 1 includes a wireless LAN module 509 that is connected to the SoC 517 via the SDIO controller 560. However, that is not the only possible case. Alternatively, for example, instead of using an SDIO interface, the wireless LAN module 509 and the SoC 517 can be connected by an interface such as USB, PCI-express, SPI, or UART. Meanwhile, it is also possible to have a wireless LAN circuit built into the SoC 517.

In the information processing device 1 according to the eighth embodiment, it is possible to use i.MX508 manufactured by Freescale Semiconductor, Inc. as the SoC 517. However, that is not the only possible case. That is, it is possible to use various types of the SoC. Moreover, in the information processing device 1 according to the eighth embodiment, it is possible to use MC34708 manufactured by Freescale Semiconductor, Inc. as the PMIC 20. However, that is not the only possible case. That is, it is possible to use various types of the PMIC. Alternatively, for example, instead of using the PMIC 20, it is also possible to use a combination of a plurality of DC/DC converters and LDO regulators.

Figure 24:
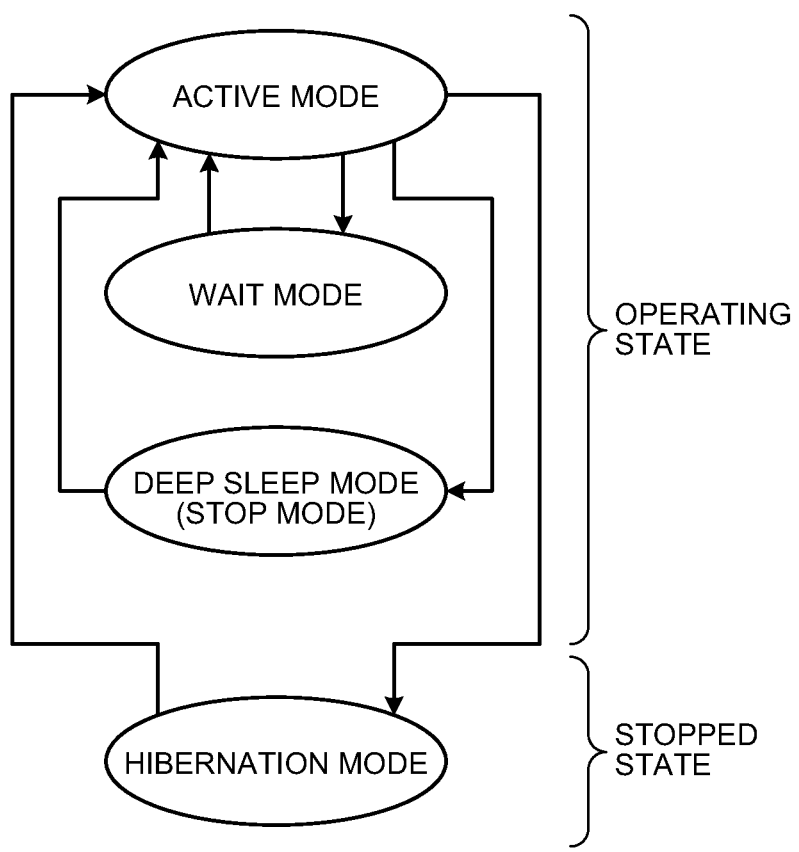
FIG. 24 is a diagram illustrating an example of state transition of the SoC according to the eighth embodiment.

FIG. 24 is a diagram illustrating an example of state transition of the SoC 517 in the information processing device 1 according to the eighth embodiment. Since the SoC 517 represents a computer system centered on the processor core 101, the processor core 101 that is built into the SoC 517 can also be considered to have an identical state transition to the state transition illustrated in FIG. 24. In this example, while the processor core 101 is executing a command (i.e., when the processor core 101 is in the running state), the state of the SoC 517 is called an ACTIVE mode. When the processor core 101 is not executing any command and is waiting for an interrupt (i.e., when the processor core 101 is in the idle state), the state of the SoC 517 is either the WAIT mode or the DEEP SLEEP mode (for an SoC such as i.MX508, the DEEP SLEEP mode is also called a STOP mode). In an identical manner to the embodiments described above, when any I/O device (or any controller) is performing I/O operations, the SoC 517 switches to the WAIT mode. However, if none of the I/O devices (none of the controllers) is performing I/O operations, the SoC 517 switches to the DEEP SLEEP mode. During the WAIT mode as well as the DEEP SLEEP mode, the processor core 101 is in the waiting state (the idle state) in which command execution is stopped. However, as described earlier, during the DEEP SLEEP mode, the main clock in the SoC is also stopped thereby resulting in further decrease in the power consumption as compared to the WAIT mode. While the user is using the information processing device 1, that is, in the operating state of the information processing device 1; the SoC (or the processor core 101) in the information processing device 1 switches between the ACTIVE mode, the WAIT mode, and the DEEP SLEEP mode.

If the user turns OFF the power of the information processing device 1, or if only a small amount of electrical energy is stored in the capacitor (the electrical storage device) 512 and only a small amount of electricity is generated by the photovoltaic cell 501 so that the information processing device 1 cannot be maintained in the operating state; the internal state of the SoC 517 is unloaded in the DRAM (the main memory) 516, and the data in the DRAM 516 is then unloaded in the NAND flash memory 508 serving as a secondary storage. Subsequently, the power supply to the information processing device 1 is stopped (the power is turned OFF). This state is called the HIBERNATION mode. Thus, in the eyes of the user, the information processing device 1 in the HIBERNATION mode appears to be in the stopped state. Moreover, when a nonvolatile memory such as an MRAM is used as the main memory, the power can be turned OFF after unloading the internal state of the SoC 517 in the main memory. That is, the data stored in the main memory need not be unloaded in the NAND flash memory 508 serving as a secondary storage.

Figure 25:
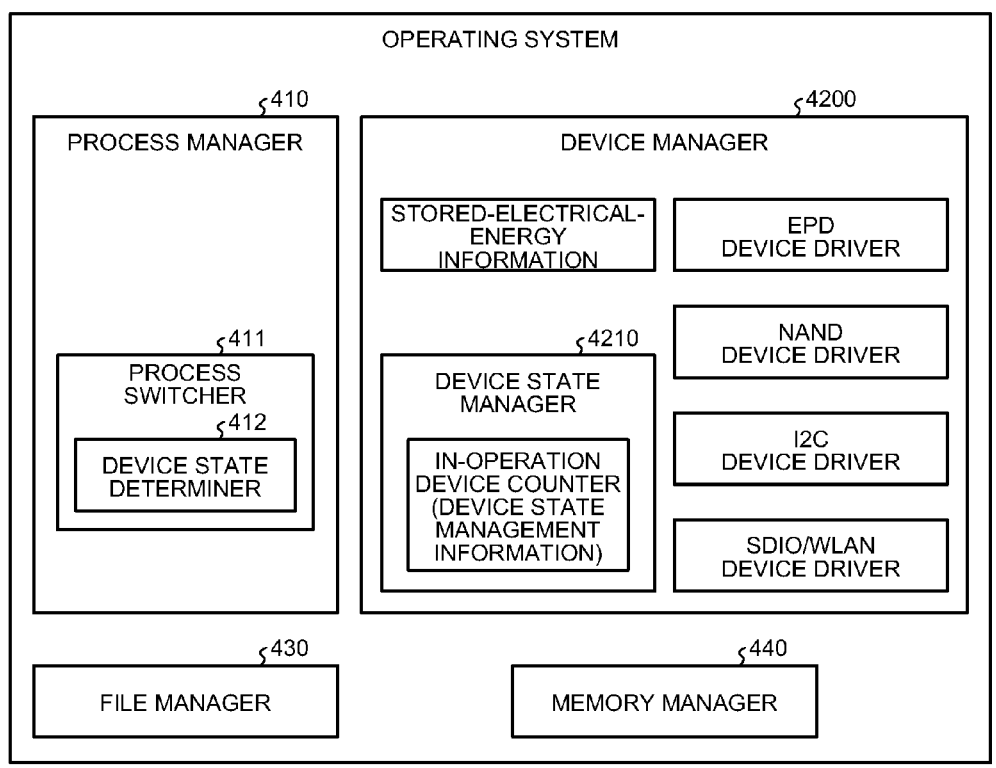
FIG. 25 is a diagram illustrating an exemplary functional configuration of the operating system (OS) according to the eighth embodiment.

FIG. 25 is a block diagram illustrating an exemplary functional configuration of the operating system (OS) installed in the information processing device 1 according to the eighth embodiment. Herein, for example, Linux can be used as the operating system. However, that is not the only possible case, and it is possible to use various operating systems. The operating system is stored in a file system of the NAND flash memory 508 serving as the secondary storage. In the operating state of the information processing device 1, the processor core 101 reads the operating system in the main memory (the DRAM 516) and executes it. The operating system installed in the information processing device 1 includes the main functions of a process manager 410, a device manager 4200, the file manager 430, and the memory manager 440.

The device manager 4200 includes the device driver of each I/O device (i.e., includes an EPD device driver, a NAND device driver, an I2C device driver, an SDIO/WLAN device driver, a keyboard driver (not illustrated) and a touch-sensitive panel driver (not illustrated)). In addition, as a feature specific to the eighth embodiment, the device manager 4200 manages stored-electrical-energy information that indicates the electrical energy stored in the capacitor (the electrical storage device) 512, and manages an in-operation device counter (as an example of the device state management information described above). In the eighth embodiment, the microcomputer 300 serving as the system controller detects the stored electrical energy of the capacitor (the electrical storage device) 512 at an appropriate timing, and notifies the processor core 101 of the SoC 517 about the detected value. The processor core 101 registers the notified value as the stored-electrical-energy information. The in-operation device counter represents an area that is used in registering the number of I/O devices (or controllers) currently performing I/O operations, and that is managed by the device state manager 4210.

In an identical manner to the first embodiment, when the processor core 101 enters the idle state, the device state determiner 412 of the process switcher 411 refers to the value of the in-operation device counter. If that value is equal to "0", it implies that no I/O device (or controller) is performing I/O operations. Hence, the device state determiner 412 determines that the SoC 517 can be switched to the DEEP SLEEP mode. However, if the value of the in-operation device counter is not equal to "0", then the device state determiner 412 determines that the SoC 517 should not be switched to the DEEP SLEEP mode.

Given below is the detailed explanation of the operations of the information processing device 1 and the operating system (OS) according to the eighth embodiment.

Figure 26:
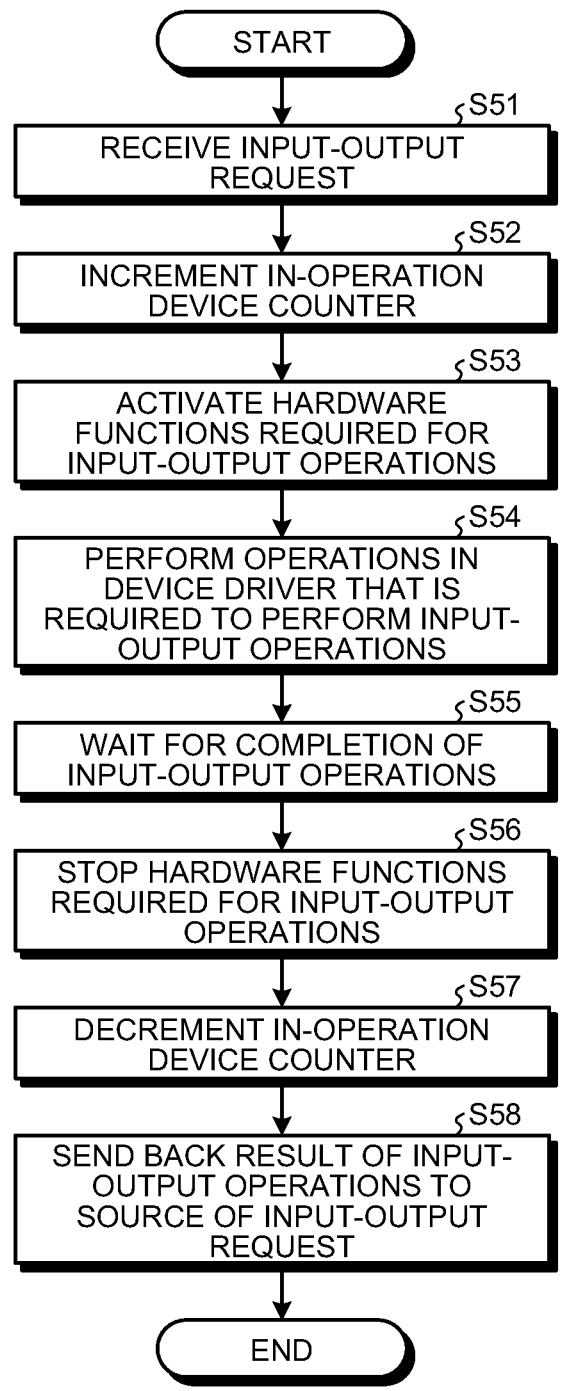
FIG. 26 is a flowchart for explaining an example of operations performed by a device driver according to the eighth embodiment.

In FIG. 26 is illustrated a typical operation flowchart of the operations performed by a device driver managed by the device manager 4200. As illustrated in FIG. 26, when a device driver receives an input-output request from the OS or an application program (Step S51), it increments the value of the in-operation device counter of the device state manager 4210 (Step S52). For example, if an input-output request meant for the NAND device driver is received, then the request is issued for data reading or data writing purposes. Similarly, if an input-output request meant for the EPD device driver is received, then the request is issued for displaying on a screen. Moreover, if an input-output request meant for the SDIO/WLAN device driver is received, then the request is issued for sending or receiving data to or from a network.

Then, in order to execute the requested input-output operations, the concerned device driver activates the hardware functions by writing a predetermined value in the control register of the corresponding device (Step S53). Subsequently, if the input-output operations include an operation that requires the involvement of the device driver (for example, an instruction for switching between a plurality of buffer areas used in data transfer, or exception handling during the input-output operations), the device driver performs that operation (Step S54) and waits for the input-output operations that are started to complete (Step S55). Once the input-output operations are completed, the device driver stops the hardware functions of the corresponding device by writing a predetermined value in the control register of that device (Step S56); decrements the value of the in-operation device counter (Step S57); and sends back the result of the input-output operations (i.e., the success or failure of the input-output operations or the input data) to the source of the input-output request (Step S58). Meanwhile, since the operating system runs on multiprogramming, while the hardware of the device is performing input-output operations (from Step S53 to Step S55), the processor core 101 executes another executable process (or an executable thread or an executable task) if present.

In the flow of operations of the device driver as illustrated in FIG. 26, every time an input-output request is processed; the hardware is activated so that the input-output operations are performed and then the hardware is stopped. However, in the case of a device such as a wireless LAN for which activation of the hardware takes time, control is performed in such a way that the hardware is not immediately stopped after the completion of the input-output operations but is stopped only if an input-output request is not received for a certain amount of time. As a result, it becomes possible to lower the frequency of activating/stopping the hardware and to reduce the power consumption. Thus, the flow of operations illustrated in FIG. 26 can be expanded to perform such operations.

Figure 27:
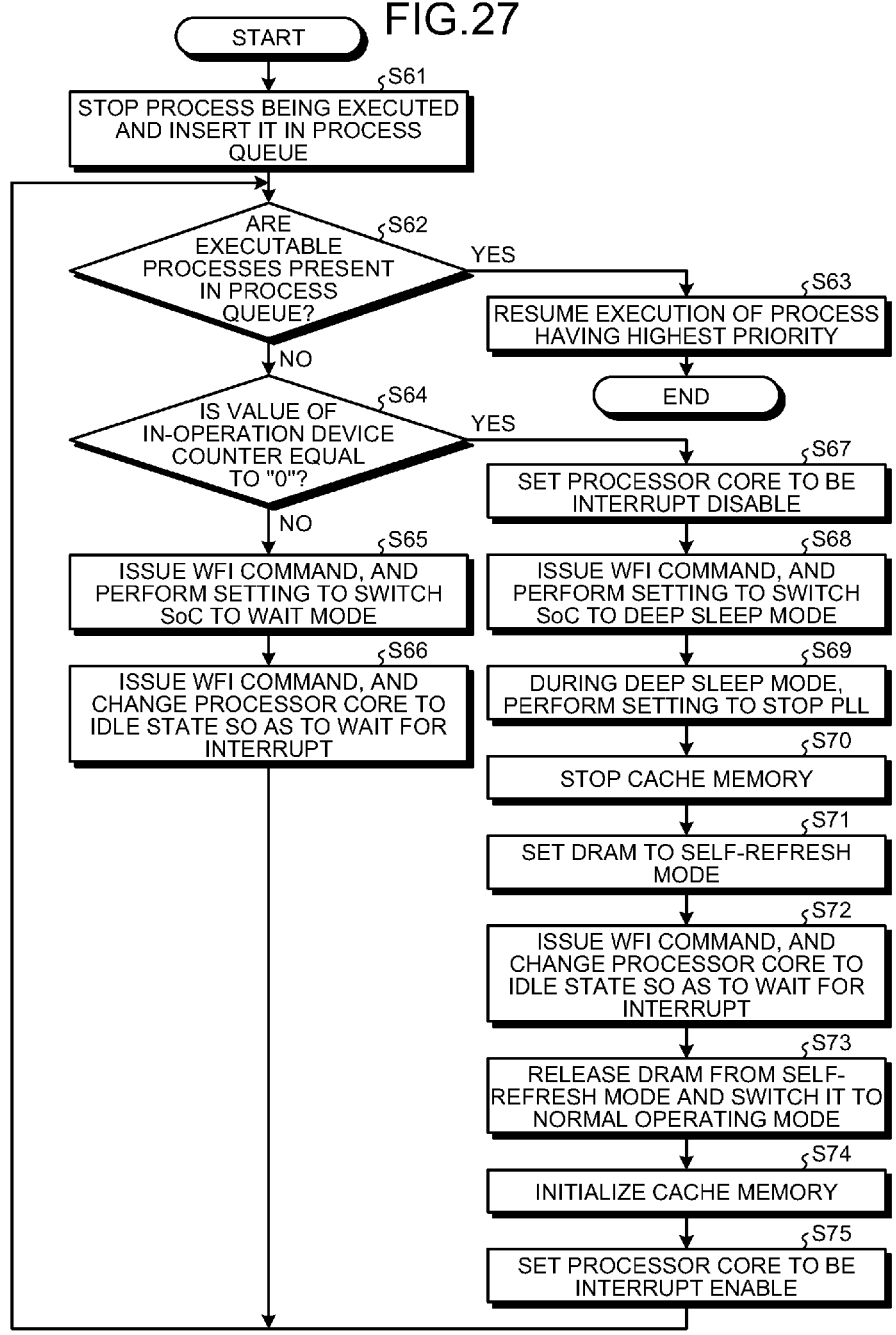
FIG. 27 is a flowchart for explaining an example of operations performed by the process switcher according to the eighth embodiment.

Explained below with reference to FIG. 27 is an example of operations performed by the process switcher 411 according to the eighth embodiment. FIG. 27 is a flowchart for explaining an example of operations performed by the process switcher 411. Herein, switching between processes is performed when, for example, the process being executed by the processor core 101 either issues an input-output request, or calls a function of the OS such as inter-process communication or memory management, or enters the kernel of the OS in response to an interrupt issued from an I/O device (a controller) or a timer.

At the time of switching between processes, firstly, the process switcher 411 stops the process being executed and inserts it in a process queue (Step S61). The process queue has two types, namely, an executable process queue in which executable processes are inserted and an event-waiting process queue in which processes waiting for an event, such as input-output completion, are inserted. In the executable process queue, the processes are managed based on priorities. At Step S61, when the process being executed starts to wait for an event, the process switcher 411 stops that process and inserts it in the event-waiting queue. However, instead of starting to wait for an event, if the process being executed is changed for another process having a higher priority, then the process switcher 411 stops the concerned process and inserts it in the executable process queue.

Subsequently, the process switcher 411 checks whether or not processes are present in the executable process queue (Step S62). If processes are present in the executable process queue (YES at Step S62), then the process switcher 411 selects the process having the highest priority from among the processes present in the executable process queue, and instructs the processor core 101 to start executing the selected process (Step S63). On the other hand, if there is no process present in the executable process queue (NO at Step S62), then the device state determiner 412 of the process switcher 411 refers to the value of the in-operation device counter managed by the device state manager 4210, and determines whether the value of the in-operation device counter is equal to "0" (Step S64). That is, the device state determiner 412 determines whether or not the SoC 517 can be switched to the DEEP SLEEP mode when the processor core 101 switches to the idle state.

At Step S64, if the value of the in-operation device counter is not equal to "0" (NO at Step S64), then it implies that some I/O devices (controllers) are performing I/O operations. Hence, the device state determiner 412 can determine that the SoC 517 should not be switched to the DEEP SLEEP mode. In this case, the process switcher 411 sets the control register of the SoC 517 in such a way that the SoC 517 switches to the WAIT mode in response to a WFI command (Step S65). Subsequently, the process switcher 411 issues a WFI command, switches the processor core 101 to the idle state, and waits for an interrupt from an I/O device (a controller) (Step S66). When an interrupt is issued by an I/O device (a controller), the SoC 517 comes out of the WAIT mode. Then, the system control returns to Step S62.

Meanwhile, at Step S64, if the value of the in-operation device counter is equal to "0" (YES at Step S64), then it implies that no I/O device (controller) is performing I/O operations. Hence, the device state determiner 412 can determine that the SoC 517 can be switched to the DEEP SLEEP mode. In this case, the process switcher 411 sets the processor core 101 to be interrupt disable (Step S67) and sets the control register of the SoC 517 in such a way that the SoC 517 switches to the DEEP SLEEP mode in response to a WFI command (Step S68). Then, the process switcher 411 sets the control register of the SoC 517 (for example, the control register 115 of the clock control module 110) in such a way that the PLL 111 is stopped during the DEEP SLEEP mode (Step S69). Subsequently, the process switcher 411 writes the dirty data from the cache memory 140 of the processor core into the DRAM 516 serving as the main memory, and then stops the cache memory 140 (Step S70). Then, the process switcher 411 sends a command to the DRAM 516 and switches the DRAM 516 to the self-refresh mode (Step S71). Subsequently, the process switcher 411 issues a WFI command and switches the processor core 101 to the idle state to wait for an interrupt (i.e., switches the SoC 517 to the DEEP SLEEP mode). Thus, the processor core 101 waits for an interrupt from an I/O device (a controller) (Step S72).

When an activation-enabled interrupt is issued by an I/O device (a controller), the SoC 517 comes out of the DEEP SLEEP mode. Hence, the process switcher 411 sends a command to the DRAM 516 to release the DRAM 516 from the self-refresh mode, and switches it to the normal operating mode (Step S73). Then, the process switcher 411 initializes the cache memory 140 and sets it to an operational state (Step S74). Subsequently, the process switcher 411 sets the processor core 101 to be interrupt enable (Step S75). Then, the system control returns to Step S62. From Step S67 to Step S75, the processor core 101 is set to be interrupt disable because of the fact that the interrupt handling routine is stored in the DRAM 516 and, once activated, the DRAM 516 needs to be made accessible before allowing interrupts.

Meanwhile, in the case in which the data stored in the cache memory 140 of the processor core 101 is retained during the DEEP SLEEP mode, the Steps S70 and S74 need not be performed. For example, in i.MX508, whether or not the cache memory is to be subjected to power gating in the STOP mode (the DEEP SLEEP mode) can be selected according to the setting of the control register. Hence, depending on that setting, Steps S70 and S74 can be skipped.

Figure 28:
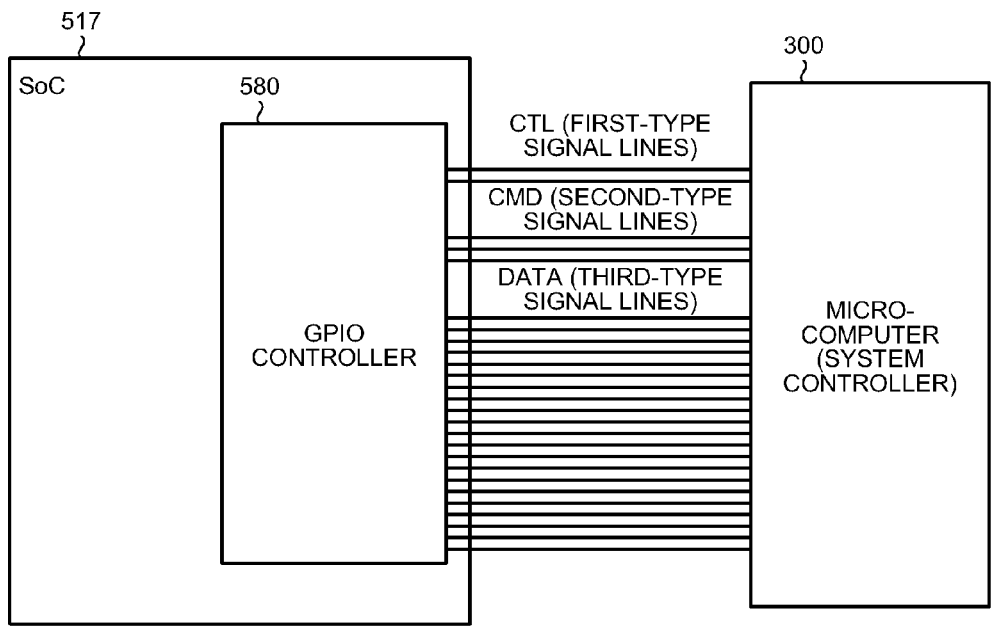
FIG. 28 is a diagram illustrating an example of connections between the microcomputer and the SoC according to the eighth embodiment.

FIG. 28 is a diagram illustrating an example of connections between the microcomputer 300, which operates as a system controller, and the GPIO controller of the SoC 517. In the example illustrated in FIG. 28, the microcomputer 300 and the SoC 517 are connected by three main types of signal lines. With reference to FIG. 28, first-type signal lines represent two signal lines for handshaking purposes and are referred to as CTL. The two signal lines include a signal line for issuing an interrupt to the SoC 517 at the time of sending data from the microcomputer 300 to the SoC 517 (i.e., a signal line for sending an interrupt signal); and a signal line for sending back an acknowledgment (ACK: a response signal) from the SoC 517 to the microcomputer 300. However, that is not the only possible method. Moreover, with reference to FIG. 28, second-type signal lines represent three lines for identifying the type of data and are referred to as CMD. The three signal lines are used in notifying a code that enables identification of whether, at the time of sending data from the microcomputer 300 to the SoC 517, the body of the data indicates a key code of the keyboard 503, or indicates the start of touching the touch-sensitive panel 502, or indicates the current touching position, or indicates the end of touching, or indicates the remaining electrical energy in the capacitor (the electrical storage device) 512, or indicates an instruction to switch to the HIBERNATION mode. Furthermore, with reference to FIG. 28, third-type signal lines represent a plurality of signal lines for sending the body of data and are referred to as DATA.

Figure 29:
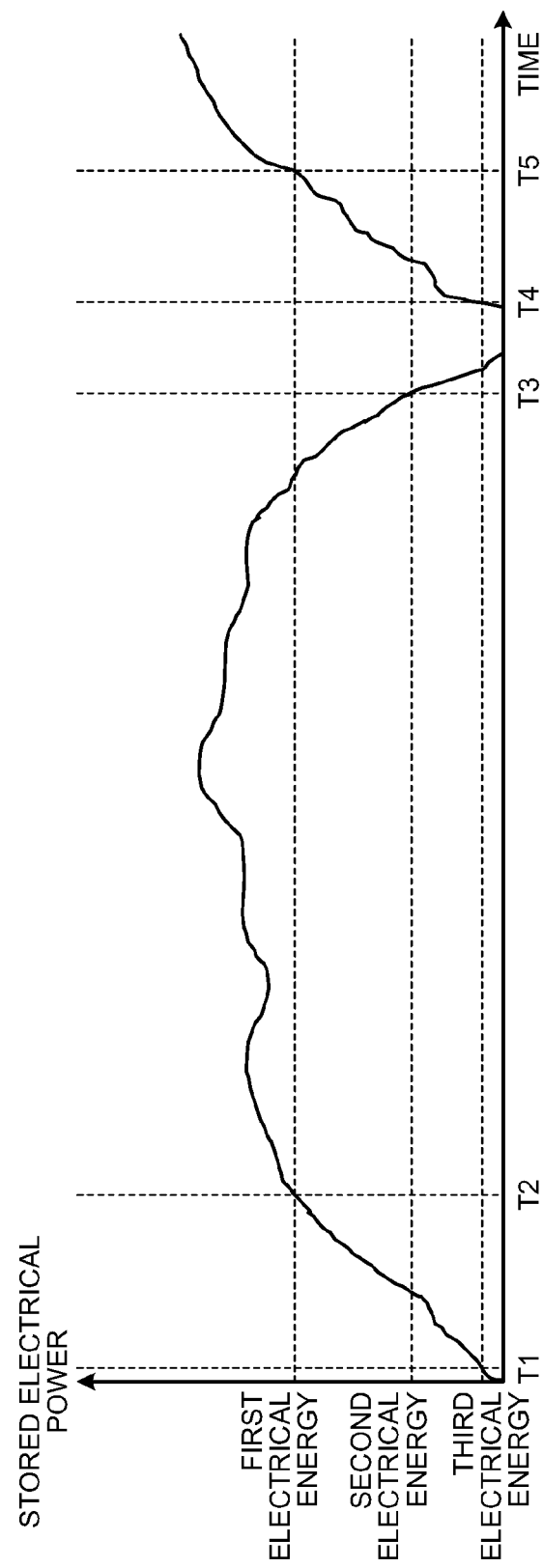
FIG. 29 is a diagram for explaining the power source management performed by the microcomputer according to the eighth embodiment.

FIG. 29 is a diagram for explaining the power source management performed by the microcomputer 300 operating as a system controller. In the graph illustrated in FIG. 29, the vertical axis represents the stored electrical energy of the capacitor (the electrical storage device) 512, while the horizontal axis represents the passage of time. Starting from the state of no stored electrical energy of the capacitor 512, when the electrical power generated by the photovoltaic cell 501 gets stored in the capacitor 512 and becomes equal to a third electrical energy at a timing T1; firstly the microcomputer 300 of the information processing device 1 starts the operations. At this point of time, the power is not supplied to the PMIC 20, and the SoC 517 is stopped in the HIBERNATION mode. After a timing T2 which comes later than the timing T1 and at which the stored electrical energy of the capacitor 512 becomes equal to a first electrical energy; when the microcomputer 300 detects a user input from the keyboard 503 or the touch-sensitive panel 502, it issues an instruction to start the power supply to the PMIC 20 and makes the SoC 517 resume the operations (i.e., makes the SoC 517 come out of the HIBERNATION mode). Then, once the electrical power generated by the photovoltaic cell 501 becomes insufficient to cover the power consumption of the information processing device 1, the stored electrical energy of the capacitor 512 goes on decreasing. At a timing T3 which comes later than the timing T2, when the microcomputer 300 detects that the stored electrical energy has become equal to a second electrical energy, it instructs the SoC 517 to switch to the HIBERNATION mode. Moreover, even if the stored electrical energy of the capacitor 512 becomes equal to zero, when the electrical power generated by the photovoltaic cell 501 gets stored in the capacitor 512 and again becomes equal to the third electrical energy at a timing T4; the microcomputer 300 resumes the operations. Then, after a timing T5 at which the stored electrical energy of the capacitor 512 becomes equal to the first electrical energy; when the microcomputer 300 detects a user input, it issues an instruction to again start the power supply to the PMIC 20 and makes the SoC 517 resume the operations. Upon resuming the operations, the SoC 517 continues with the operations from the state attained at the timing T3.

Herein, the first electrical energy represents the electrical energy required for the SoC 517 to perform operations starting from coming out of the HIBERNATION mode, performing some operations, and again switching to the HIBERNATION mode. The second electrical energy represents the electrical energy required for the SoC 517 to switch to the HIBERNATION mode. Thus, the second electrical energy is smaller than the first electrical energy.

Figure 30:
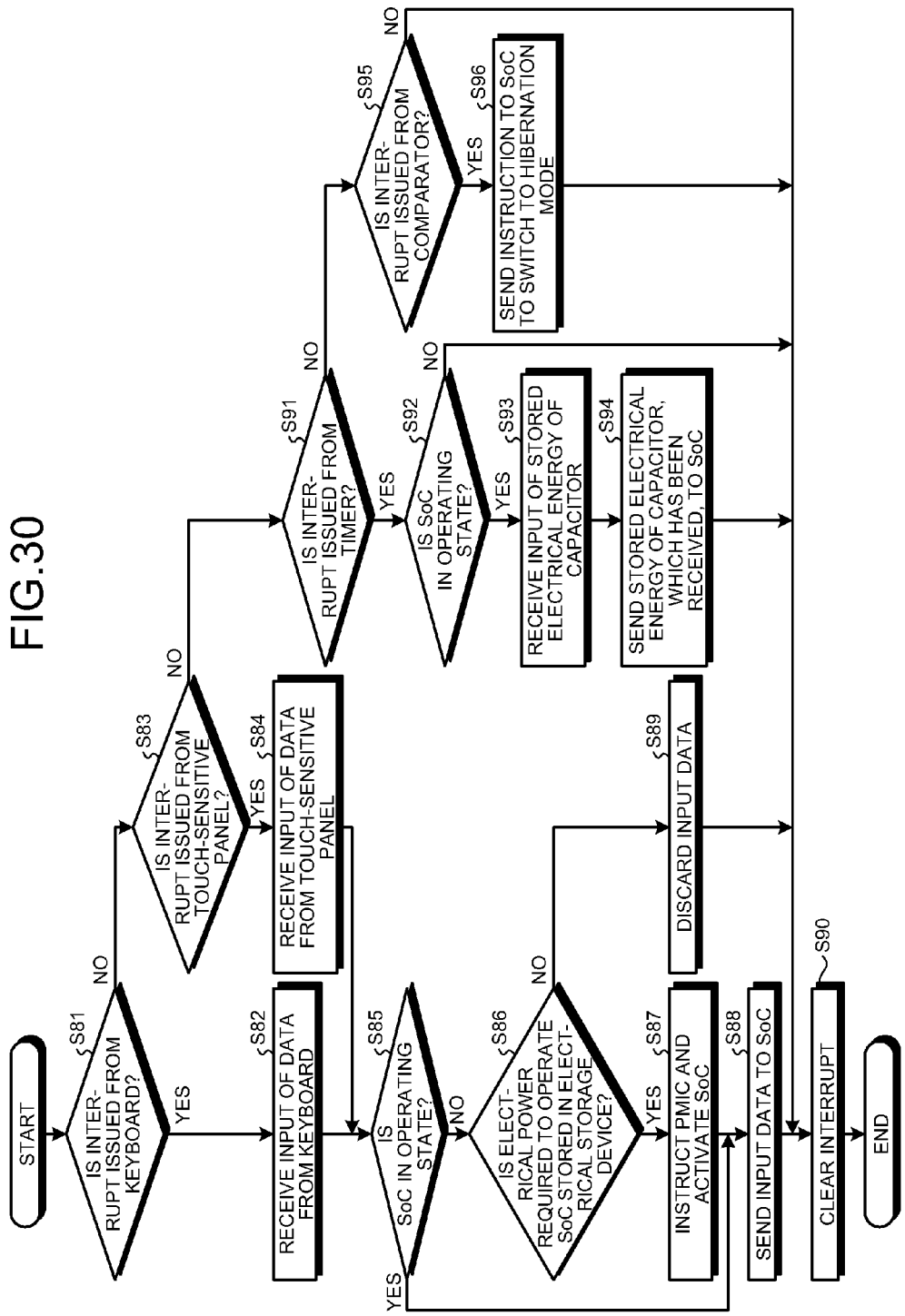
FIG. 30 is a flowchart for explaining an example of operations performed by the microcomputer according to the eighth embodiment.

FIG. 30 is a flowchart for explaining an example of operations of the microcomputer 300 that performs the power source management as illustrated in FIG. 29 and that controls the keyboard 503 and the touch-sensitive panel 502. The computer program of the microcomputer 300 is written to operate on an event-driven basis in response to interrupt events from various I/O devices (for example, external devices such as the keyboard 503 and the touch-sensitive panel 502, and devices such as a comparator built into the microcomputer 300) or the timer included in the microcomputer 300. Thus, in FIG. 30 is illustrated the flowchart of an interrupt handling routine executed by the microcomputer 300 in response to an interrupt issued by an I/O device or the timer.

When an interrupt request is received from an I/O device or the timer, the interrupt controller 306 built into the microcomputer 300 registers an interrupt vector, which enables identification of the type of the requested interrupt, in a register (not illustrated) included therein, and sends an interrupt signal to the processor core 301 built into the microcomputer 300 (i.e., notifies the processor core 301 about the interrupt). Upon receiving the interrupt signal, the processor core 301 can refer to the interrupt vector registered in the register of the interrupt controller 306, and thus can identify the cause for the interrupt. That is, upon receiving the interrupt signal from the interrupt controller 306, the processor core 301 firstly checks the cause for the interrupt and determines whether the interrupt is issued by the keyboard 503 (Step S81). If the interrupt is issued by the keyboard 503 (YES at Step S81), the processor core 301 receives input of data from the keyboard 503 (Step S82). At that time, the processor core 301 also performs operations such as keyboard chattering prevention as may be necessary.

However, if the interrupt is not issued by the keyboard 503 (NO at Step S81), the processor core 301 determines whether the interrupt is issued by the touch-sensitive panel 502 (Step S83). If the interrupt is issued by the touch-sensitive panel 502 (YES at Step S83), the processor core 301 receives input of data from the touch-sensitive panel 502 (Step S84). An interrupt from the touch-sensitive panel 502 is issued in response to the start of touching, a change in the touching position during the touching, and the end of touching. Upon receiving input of the data either from the keyboard 503 at Step S82 or from the touch-sensitive panel at Step S84; the processor core 301 checks whether or not the SoC 517 is in the operating state (i.e., not in the HIBERNATION mode) (Step S85). If the SoC 517 is not in the operating state (NO at Step S85), then the processor core 101 checks whether or not the electrical power required to operate the SoC 517 in the operating state is stored in the electrical storage device (i.e., checks whether or not the stored electrical energy of the capacitor 512 is greater than the first electrical energy described above) (Step S86). If the electrical power required to operate the SoC 517 in the operating state is stored in the electrical storage device (YES at Step S86), then the processor core 301 instructs the PMIC 20 to start the power supply and makes the SoC 517 resume the operations (Step S87), and sends the input data to the SoC 517 (Step S88). Then, from the register of the interrupt controller 306, the processor core 301 deletes (clears) the interrupt vector used in identifying the type of the interrupt which corresponds to the data sent to the SoC 517 (Step S90). That marks the end of the interrupt handling.

Meanwhile, at Step S85, if it is determined that the SoC 517 is in the operating state (YES at Step S85), then the system control proceeds to Step S88. Moreover, at Step S86, if the electrical power required to operate the SoC 517 is not available (NO at Step S86), the input data is discarded (Step S89) and the system control proceeds to Step S90. Then, the interrupt is cleared (Step S90). That marks the end of the interrupt handling.

At Step S87, at the time of instructing the PMIC 20 to start the power supply and making the SoC 517 resume the operations; after issuing an instruction to the PMIC 20, the microcomputer 300 needs to know that the SoC 517 has resumed operations. As a method to achieve that, the SoC 517 can be configured to use predetermined GPIO signal lines and notify the microcomputer 300 about the resumption of operations. As another method, the time taken for the resumption of operations by the SoC 517 since issuing the instruction to the PMIC 20 can be gauged in advance; and, if at least that period of time elapses since issuing the instruction to the PMIC 20, the microcomputer 300 can interpret that the SoC 517 has resumed the operations and can continue with the operations. As still another method, the SoC 517 and the microcomputer 300 can be connected by a communication line or I2C or SPI, and resumption of the operations by the SoC 517 can be notified to the microcomputer 300 using the communication line. Still alternatively, a signal line indicating the state of the SoC 517 can be connected to the microcomputer 300 so that the microcomputer 300 can get to know about the resumption of the operations by the SoC 517 via the signal line. Still alternatively, the microcomputer 300 can be configured to perform the determination using various signal lines that change the state in response to the resumption of operations by the SoC 517.

Meanwhile, at Step S83, if the interrupt is not issued by the touch-sensitive panel 502 (NO at Step S83), the processor core 301 of the microcomputer 300 checks whether or not the interrupt is issued by the timer (Step S91). If the interrupt is issued by the timer (YES at Step S91), then the processor core 301 checks whether or not the SoC 517 is in the operating state (Step S92). If the SoC 517 is in the operating state (YES at Step S92), then the processor core 301 of the microcomputer 300 receives input of the stored electrical energy in the capacitor 512 (Step S93) and sends that stored electrical energy to the SoC 517 (Step S94). The system control then proceeds to Step S90 and the interrupt is cleared. That marks the end of the interrupt handling.

However, at Step S92, if the SoC 517 is not in the operating state (NO at Step S92), then the processor core 301 does not perform any operation and the system control returns to Step S90 so that the interrupt is cleared. That marks the end of the interrupt handling. Meanwhile, an interrupt from the timer is issued to notify the stored electrical energy of the capacitor 512 to the SoC 517 from the microcomputer 300. Herein, the setting is done in such a way that the interrupt is issued at fixed time intervals.

Meanwhile, at Step S91, if the interrupt is not issued by the timer (NO at Step S91), then the processor core 301 of the microcomputer 300 checks whether or not the interrupt is issued by the comparator (Step S95). The comparator is one of the devices built into the microcomputer 300 and is capable of issuing an interrupt when an CONTROL REGISTER SETTING signal exceeds or falls below a voltage set in advance. In this example, the configuration is such that the comparator is used to detect a decrease in the stored electrical energy of the capacitor 512 below the second electrical energy. At Step S95, if the interrupt is issued by the comparator (YES at Step S95); it implies that the stored electrical energy of the capacitor 512 has decreased. Hence, the processor core 301 of the microcomputer 300 instructs the SoC 517 to switch to the HIBERNATION mode (Step S96). Then, the system control returns to Step S90 so that the interrupt is cleared. That marks the end of the interrupt handling. However, if the interrupt is not issued by the comparator (NO at Step S95), then the processor core 301 of the microcomputer 300 does not perform any operation and the system control returns to Step S90 so that the interrupt is cleared. That marks the end of the interrupt handling.

Meanwhile, in FIG. 30 is illustrated the flowchart of operations performed in the case in which, every time an interrupt event from an I/O device (or a controller) occurs (i.e., every time an interrupt request is received), the interrupt controller 306 of the microcomputer 300 sends an interrupt signal to the processor core 301 of the microcomputer 300. That is, in this case, the number of times for which an interrupt event from an I/O device (a controller) occurs is equal to the number of interrupts received by the processor core. In contrast, there are some interrupt controllers that, in response to the occurrence of interrupt events from a plurality of I/O devices (controllers), issues a collective interrupt to the processor core. In that case, even if the interrupts are issued due to a plurality of interrupt reasons, the operations in the flowchart illustrated in FIG. 30 can be performed with respect to only a single interrupt reason. In such a case, after the interrupt clearing is performed corresponding to the interrupt reason processed at Step S89, the processor core 301 of the microcomputer 300 can refer to the control register of the interrupt controller 306 of the microcomputer 300; and can check whether any unprocessed interrupt is remaining. If any unprocessed interrupt is remaining, then the system control can return to Step S81 and that interrupt can be processed.

Figure 31:
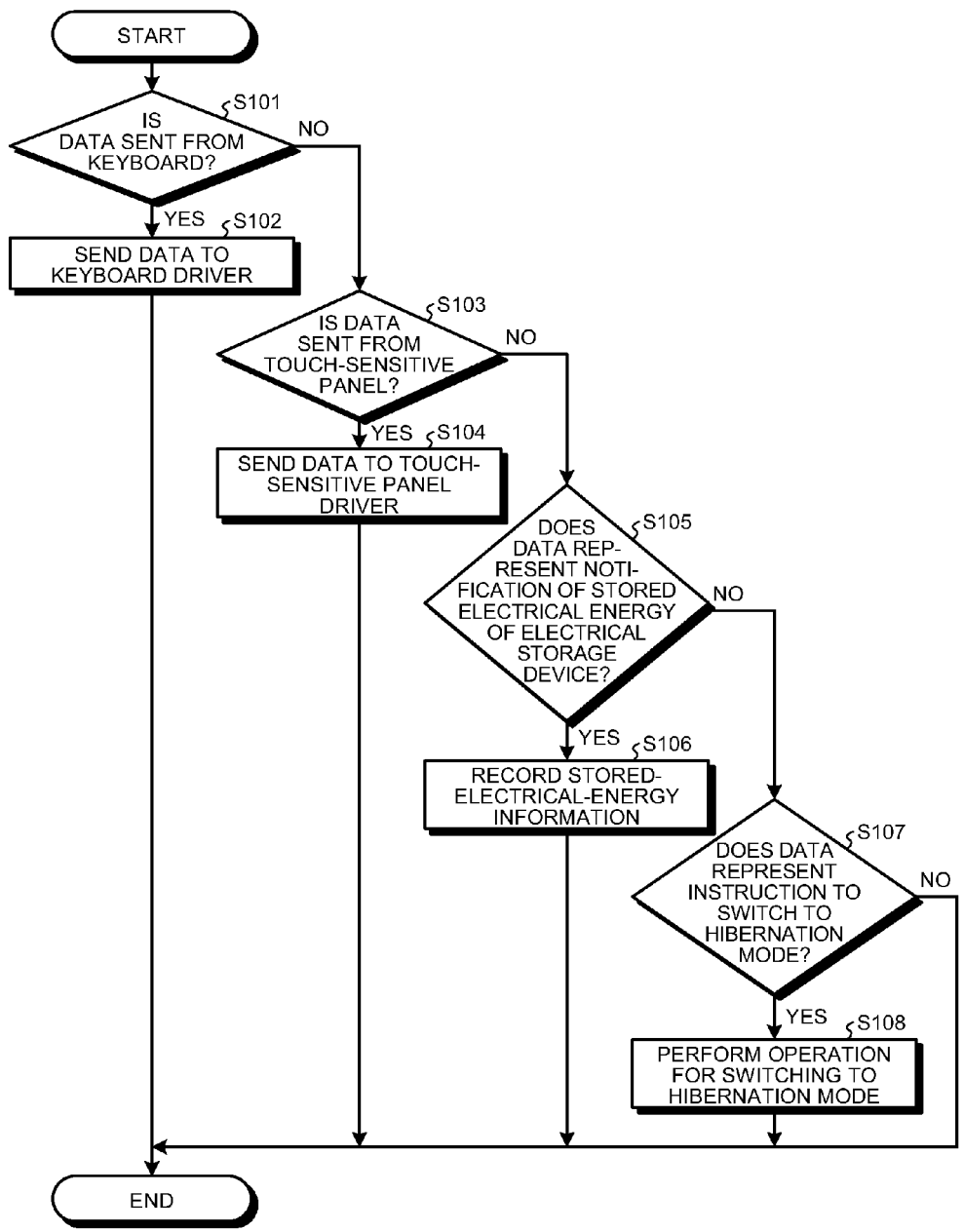
FIG. 31 is a flowchart for explaining an example of operations performed by the SoC according to the eighth embodiment.

FIG. 31 is a flowchart for explaining an example of operations performed by the SoC 517 in response to an interrupt received from the microcomputer 300 that operates according to the flowchart of operations illustrated in FIG. 30. Upon receiving an interrupt from the microcomputer 300, the processor core 101 of the SoC 517 refers to the second signal line (illustrated as CMD in FIG. 28) and determines whether the data received from the microcomputer 300 represents the data sent from the keyboard 503 (Step S101), or represents the data sent from the touch-sensitive panel 502 (Step S103), or represents a notification of the stored electrical energy of the capacitor (the electrical storage device) 512 (Step S105), or represents an instruction to switch to the HIBERNATION mode (Step S107).

At Step S101, if the data received from the microcomputer 300 represents the data sent from the keyboard 503 (YES at Step S101), then the processor core 101 sends the data, which has been sent using the third-type signal lines (illustrated by DATA in FIG. 28), to the keyboard driver (Step S102). Similarly, at Step S103, if the data received from the microcomputer 300 represents the data sent from the touch-sensitive panel 502 (YES at Step S103), then the processor core 101 sends the data, which has been sent using the third-type signal lines (illustrated by DATA in FIG. 28), to the touch-sensitive panel driver (Step S104). Moreover, at Step S105, if the data received from the microcomputer 300 represents a notification of the stored electrical energy of the capacitor (the electrical storage device) 512 (YES at Step S105), then the processor core 101 records the data, which has been sent using the third-type signal lines (illustrated by DATA in FIG. 28), as the stored-electrical-energy information of the electrical storage device (Step S106). Furthermore, at Step S107, if the data received from the microcomputer 300 represents an instruction to switch to the HIBERNATION mode (YES at Step S107), then the processor core 101 performs the operation for switching to the HIBERNATION mode (Step S108).

Meanwhile, a system controller either can be implemented using the microcomputer 300 as is the case according to the eighth embodiment, or can be implemented using dedicated hardware, or can be implemented using a combination of the dedicated hardware and a processor. Moreover, the system controller can be built into the SoC or can be built into the PMIC. Furthermore, in addition to controlling the keyboard and the touch-sensitive panel, the system controller can be connected to a communication device such as a wireless LAN, Bluetooth, or ZigBee for the purpose of controlling the communication device. Besides, the system controller can perform power source control to activate the SoC in response to the reception of data. Alternatively, the functions of the system controller can be implemented in a dispersed manner among a plurality of microcomputers and processors. For example, the keyboard and the touch-sensitive panel can be managed by a microcomputer serving as the system controller, while the wireless LAN can be managed by a processor serving as the system controller in a wireless LAN module. Moreover, both system controllers can be made to operate in a coordinated manner.

Ninth Embodiment

In the embodiments described above, the explanation is given for a case in which the power consumption reduction method according to the invention is implemented by the operating system which is executed by the processor core 101 of the information processing device 1. In contrast, in a ninth embodiment, the explanation is given for a case in which the power consumption reduction method according to the invention is implemented using a hypervisor, which is software for enabling parallel execution of a plurality of OSs and is sometimes also called a virtual machine or a virtual machine monitor.

Figure 32:
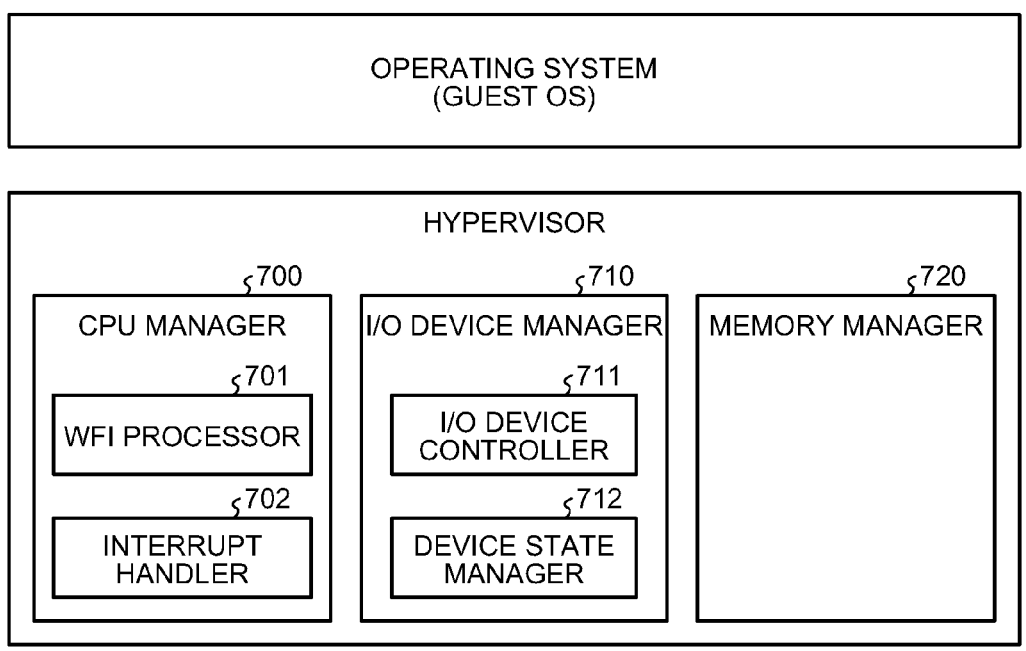
FIG. 32 is a diagram illustrating an exemplary functional configuration of a hypervisor according to a ninth embodiment.

FIG. 32 is a diagram illustrating an exemplary functional configuration of the hypervisor according to the ninth embodiment and for explaining the relationship between the hypervisor and the operating system. It is a well-known fact that a hypervisor represents system software that runs in the layer below the operating system and that virtualizes the hardware platform, and the operating system uses the virtualized hardware platform as the real hardware platform. Thus, the operating system is executed in the hardware virtualized by the hypervisor. The operating system that runs on the hardware virtualized by the hypervisor is sometimes called a "guest OS". With reference to FIG. 32, a single operating system (a single guest OS) is running on the hypervisor. However, that is not the only possible case.

Alternatively, it is also possible to run a plurality of operating systems in a concurrent manner on the hypervisor.

As illustrated in FIG. 32, the hypervisor has three main resource management functions, namely, virtualization of a CPU using a CPU manager 700, virtualization of I/O devices using an I/O device manager 710, and virtualization of a memory using a memory manager 720. The CPU manager 700 includes a WFI processor 701 and an interrupt handler 702. The I/O device manager 710 includes an I/O device controller 711 and a device state manager 712.

In the ninth embodiment, it is the I/O device manager 710 which is equipped with the function (the device state manager 712) of managing the information (the device state managing information) which enables determination of whether or not an I/O device currently performing input-output operations (I/O operations) is present. As a method of managing the device state management information, for example, the I/O device manager 710 can be configured to count the number of I/O devices currently performing the input-output operations. Alternatively, the I/O device manager 710 can be configured to manage, for each piece of information that enables identification of an I/O device, the information in a table form corresponding to the information (for example, can be represented as a predetermined value) indicating whether that I/O device is performing input-output operations.

Meanwhile, in the ninth embodiment, the function of updating the information, which is managed by the device state manager 712, at appropriate timings is assigned to the I/O device controller 711, which controls the actual I/O devices according to an instruction from the guest OS, and to the interrupt handler 702, which receives an interrupt event from an I/O device and routes the interrupt event to the appropriate guest OS. Moreover, it is the WFI processor 701 which is equipped with the function of determining whether to set the WAIT mode or the DEEP SLEEP mode based on the information managed by the device state manager 712 at the time of switching to the idle state. In this example, the WFI processor 701 can be considered to correspond to the process switcher 411 according to the embodiments described above and correspond to the "state controller" mentioned in claims.

Figure 33:
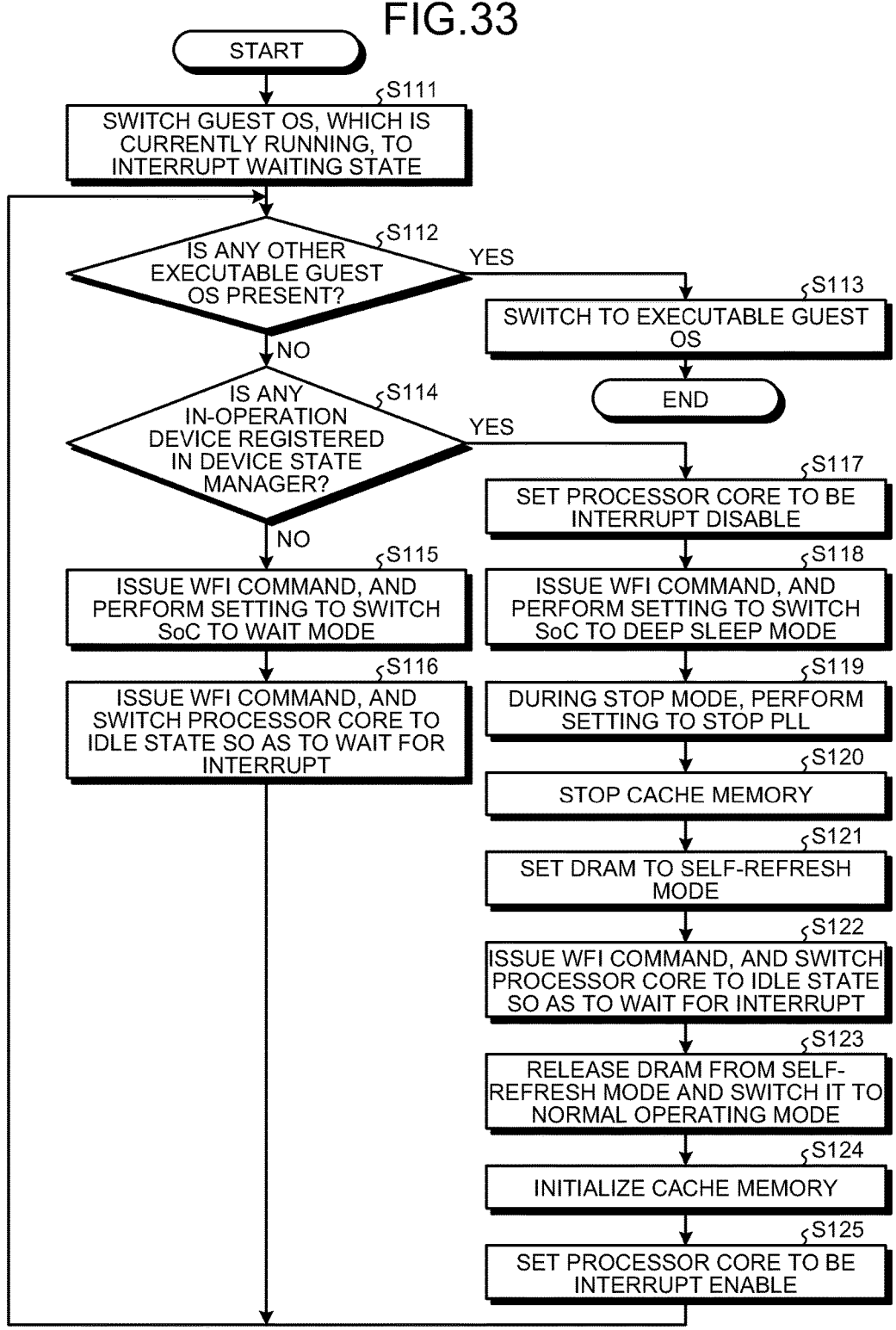
FIG. 33 is a flowchart for explaining an example of operations performed by a WFI processor according to the ninth embodiment.

FIG. 33 is a flowchart for explaining an example of operations performed by the WFI processor 701 of the CPU manager 700. Upon trapping the issuance of a WFI command by a guest OS, the hypervisor performs the operations illustrated in FIG. 33. As far as the method of trapping the issuance of a WFI command by a quest OS is concerned, if the platform hardware is equipped with a virtual machine assist, then the hardware is able to detect the issuance of the WFI command. As another method, the portion in the guest OS which issues a WFI command is rewritten so as to transfer the control to the WFI processor 701 of the hypervisor.

When the issuance of a WFI command by a guest OS is detected, the WFI processor 701 performs the operations according to the flowchart illustrated in FIG. 33. Firstly, the WFI processor 701 switches the guest OS, which is currently running, to the interrupt waiting state (Step S111). Then, the WFI processor 701 checks whether or not any other executable guest OS is present (Step S112). If any other executable guest OS is present (YES at Step S112), then the WFI processor 701 switches to the guest OS having the highest priority and makes it resume the operations (Step S113). However, if no other executable guest OS is present (NO at Step S112), then the WFI processor 701 refers to the information managed by the device state manager 712 (i.e., refers to the device state managing information) and determines whether or not any I/O device (any controller) currently performing input-output operations is present (Step S114). If any I/O device currently performing input-output operations is present (YES at Step S114), then the WFI processor 701 determines that the SoC should not be switched to the DEEP SLEEP mode when the processor core 101 switches to the idle state, and sets the control register of the SoC in such a way that the SoC switches to the WAIT mode in response to the issuance of a WFI command (Step S115). Subsequently, when a WFI command is issued, the WFI processor 701 switches the processor core 101 to the idle state so as to wait for an interrupt from an I/O device (Step S116). When an interrupt is issued from an I/O device (a controller), the SoC comes out of the WAIT mode. Then, the system control returns to Step S112.

Meanwhile, at Step S114, if no I/O device is currently performing input-output operations (NO at Step S114), then the WFI processor 701 determines that the SoC can be switched to the DEEP SLEEP mode when the processor core 101 enters the idle state, and firstly sets the processor core 101 to be interrupt disable (Step S117); and sets the control register of the SoC in such a way that the SoC switches to the DEEP SLEEP mode in response to the issuance of a WFI command (Step S118). Moreover, the WFI processor 701 sets the control register in such a way that the PLL 111 is stopped during the DEEP SLEEP mode (Step S119). Then, the WFI processor 701 writes the dirty data, which is stored in the cache memory 140 of the processor core 101, in the main memory (in this example, assumed to be a DRAM) and then stops the main memory (Step S120). Subsequently, the WFI processor 701 sends a command to the DRAM so that the DRAM switches to the self-refresh mode (Step S121). When a WFI command is issued, the WFI processor 701 changes the processor core 101 to the idle state so as to wait for an interrupt from an I/O device (a controller) (Step S122).

When an activation-enabled interrupt is issued by an I/O device (a controller), the SoC comes out of the DEEP SLEEP mode. Hence, the WFI processor 701 sends a command to DRAM and releases the DRAM from the self-refresh mode, and switches it to the normal operating mode (Step S123). Then, the WFI processor 701 initializes the cache memory 140 and sets it to an operational state (Step S124). Subsequently, the WFI processor 701 sets the processor core 101 to be interrupt enable (Step S125). Then, the system control returns to Step S112.

Meanwhile, in the case in which the data stored in the cache memory 140 of the processor core 101 is retained during the DEEP SLEEP mode, the Steps S120 and S124 need not be performed. For example, in i.MX508, whether or not the cache memory is to be subjected to power gating in the STOP mode (the DEEP SLEEP mode) can be selected according to the setting of the control register. Hence, depending on that setting, Steps S120 and S124 can be skipped.

Figure 34:
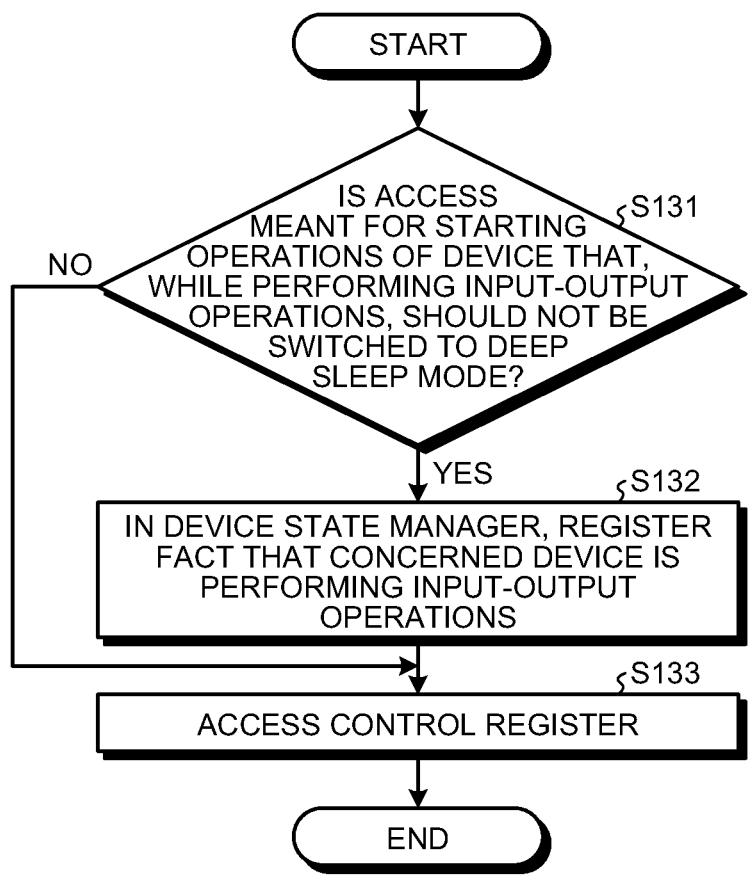
FIG. 34 is a flowchart for explaining an example of operations performed by an I/O device controller according to the ninth embodiment.

FIG. 34 is a flowchart for explaining an example of operations in the case when the I/O device controller 711 of the hypervisor traps an access to the control register of an I/O device by a guest OS and accesses the control register of the I/O device of the actual hardware. As far as the method of trapping an access to the control register of an I/O device by a guest OS is concerned, if the platform hardware is equipped with a virtual machine assist, then the hardware is able to detect the issuance of the WFI command. As another method, the portion in the guest OS which accesses the control register of an I/O device is rewritten so as to transfer the control to the I/O device controller 711 of the hypervisor.

When an access to the control register of an I/O device by a guest OS is detected; then, as illustrated in FIG. 34, the I/O device controller 711 determines whether the I/O device corresponding to the control register that is going to be accessed should not be switched to the DEEP SLEEP mode during the input-output operations and whether the detected access is meant for starting the input-output operations of that I/O device (Step S131). If that is the case (YES at Step S131), then the I/O device controller 711 registers, in the device state manager 712, the fact that the concerned I/O device is performing input-output operations (Step S132). Then, on behalf of the guest OS, the I/O device controller 711 accesses the control register of the actual I/O device (Step S133).

FIG. 35 is a flowchart for explaining an example of operations performed in the case in which the interrupt handler 702 of the hypervisor receives an interrupt from an I/O device of the actual hardware and routes that interrupt to an appropriate guest OS. Upon detecting an interrupt, the interrupt handler 702 firstly determines whether or not the I/O device that issued the interrupt is a device with respect to which it is determined that the SoC should not be switched to the DEEP SLEEP mode when the I/O device is performing input-output operations, and determines whether or not the detected interrupt notifies the completion of the input-output operations that were being performed by the concerned device (Step S141). If that is the case (YES at Step S141), then the interrupt handler 702 registers, in the device state manager 712, the fact that the input-output operations of the concerned I/O device are completed (Step S142). Then, the interrupt handler 702 sends the interrupt to the guest OS which is supposed to receive the interrupt (Step S143).

In this way, in the case in which the power consumption reduction method according to the invention is implemented using a hypervisor, in order to prevent an unauthorized access to the hypervisor (by means of reverse engineering or tampering), it is desirable to boot the hypervisor using the secure boot function of the SoC; and it is also desirable to load the entire code of the hypervisor or some portion of the code of the hypervisor in a RAM that is built into the SoC and to execute it from the RAM. In the secure boot function of the SoC, computer programs are encrypted using unique keys and signatures (hash values) are assigned thereto. While booting, decryption is performed and it is confirmed whether or not the signatures (the hash values) are correct. As a result, it becomes possible to prevent booting with unauthorized computer programs. Moreover, the computer programs that are decrypted and loaded in a memory are stored in the RAM built into the SoC. Hence, it becomes possible to make it difficult to perform an unauthorized access by means of a probe of the signal line (such as the bus for connecting the main memory) that is observable from the outside of the SoC. Besides, when the SoC is switched to the HIBERNATION mode, the power supply to the built-in RAM is also stopped, thereby causing a loss of the data stored therein. Hence, it becomes possible to reduce the risk of exposure to unauthorized accesses.

MODIFICATION EXAMPLES

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

In the embodiments described above, whether or not each I/O device (or each device controller) in the information processing device 1 is performing operations is managed using the device state management information. However, it is not necessary to use the device state management information to manage the states of all I/O devices in the information processing device 1. That is, as long as the states of at least such devices with respect to which it is determined that the SoC should not be switched to the DEEP SLEEP mode when the device is in operation, such as performing input-output operations or waiting for the arrival of data from outside, is managed in the device state management information; it serves the purpose. In contrast, the devices (such as a keypad) that, even during the DEEP SLEEP mode, can detect an input and can activate the SoC are always available to be switched to the DEEP SLEEP mode. Hence, it is not necessary to use the device state management information to manage the states of such activation-enabled devices.

The device state management information described above in the embodiments can be implemented in various forms. For example, in a single information processing device 1, the device state manage information in a plurality of forms can be used. For example, regarding an I/O device having the device driver implemented based on the framework of Runtime PM, the information (runtime_status) managed by Runtime PM is used as the device state management information. Similarly, regarding a device having the conventional device driver not implemented based on the framework of Runtime PM, the configuration can be such that the device state management information illustrated in FIG. 12 is updated according to the sequence of operations illustrated in FIG. 13. In these cases, the abovementioned device state determiner refers to each piece of device state management information. Then, if none of the pieces of device state management information indicates that the corresponding I/O device is in operation, the device state determiner determines in a comprehensive manner to switch the SoC to the DEEP SLEEP mode.

In the embodiments described above, the device state determiner (412) refers to the device state management information and determines whether or not to switch the SoC to the DEEP SLEEP mode. In that regard, it is also possible to perform the determination by taking into account other information besides the device state management information. For example, even if the device state management information indicates that the SoC can be switched to the DEEP SLEEP mode; if it is understood from timer management information that timer interrupts are issued within short periods of time, then the SoC may be switched to the WAIT mode. As compared to switching the SoC to the WAIT mode, switching the SoC to the DEEP SLEEP mode requires higher power consumption and a longer period of time. Hence, if it can be predicted that a timer interrupt would occur soon, switching the SoC to the WAIT mode enables achieving an overall reduction in the power consumption even if it is possible to switch the SoC to the DEEP SLEEP mode.

In the embodiments described above, the device state determiner determines whether to switch the SoC to the WAIT mode or to the DEEP SLEEP mode. Alternatively, for example, instead of determining between two modes, the device state determiner can be configured to determine the mode to which the SoC should be switched from among three or more modes. In the embodiments described above, in the DEEP SLEEP mode, the generation (or the supply) of the main clock is stopped, and the main memory is switched to the self-refresh mode so as to achieve reduction in the power consumption. In contrast, in the WAIT mode, one or more I/O devices are in operation and may access the bus or the main memory. Hence, the bus and the main memory are also kept in operation. However, not all I/O devices access the bus or the main memory. Hence, it is also possible to have a new mode (herein, called a WAIT2 mode), which is an intermediate mode between the WAIT mode and the DEEP SLEEP mode. Although equivalent to the WAIT mode, in the WAIT2 mode, the bus is stopped and the main memory is switched to the self-refresh mode. For example, when one or more in-operation I/O devices access the bus or the main memory, the device state determiner determines to switch the SoC to the WAIT mode. However, when in-operation I/O devices do not access the bus or the main memory, the device state determiner determines to switch the SoC to the WAIT2 mode. Moreover, when none of the I/O devices are in operation, the device state determiner determines to switch the SoC to the DEEP SLEEP mode. In such a configuration, the power consumption in the WAIT2 mode is lower than the power consumption in the WAIT mode but higher than the power consumption in the DEEP SLEEP mode. Hence, it becomes possible to further enhance the effect of power saving. Herein, although the explanation is given about an example in which a mode is selected from among three modes, it is easy to expand the scope and to provide various other modes from which the mode of the SOC can be selected. For example, it is possible to provide a mode in which the main memory is switched to the self-refresh mode but the bus is not stopped.

In this way, while deciding on a single mode to which the SoC is to be switched from among a plurality of modes, the device state determiner needs to take into account whether or not each I/O device makes use of the bus or the main memory while performing the operations. In order to achieve that, for example, the device state determiner stores therein a table of correspondence information in which, for each piece of information that enables identification of an I/O device, information indicating other devices used by the concerned I/O device during the operations is held in a corresponding manner. Then, the device state determiner refers to the correspondence information and the device state management information, and accordingly selects the mode to which the SoC should be switched.

As another method, the device state manager (421, 4210, or 712) stores therein the correspondence information; refers to that correspondence information; and, at the time of registering the start of operations of a particular I/O device, registers the start of the operations of the other devices that are required by the concerned I/O device during its operations. Similarly, at the time of registering the end of the operations of a particular I/O device, the device state manager registers the end of the operations of the other devices that are required by the concerned I/O device during its operations. Meanwhile, regarding the devices such as the bus and the main memory, a plurality of I/O devices uses such devices in a shared manner. Hence, these devices need to be managed in such a way that, when no I/O device is using them, the operations thereof are ended.

Meanwhile, the embodiments and the modification examples described above can be combined in an arbitrary manner.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
   a memory device;
   a second memory;
   one or more peripheral devices;
   a processor configured to execute a state controller, and to change between a first state, in which a command is executed by the processor, and a second state, in which an interrupt is awaited by the processor, wherein
   when the processor enters the second state and an operation for data transfer is being performed between at least one of the peripheral devices and the memory device, the state controller switches the information processing device to a third state, the third state being a state in which power consumption of the information processing device is lower than power consumption of the information processing device when the processor is in the first state; and
   when the processor enters the second state and an operation for data transfer is not being performed between any of the peripheral devices and the memory device, the state controller switches the information processing device to a fourth state, the fourth state being a state in which power consumption of the information processing device is lower than in the third state, and wherein
   the memory device stores an operating system including the state controller and the second memory stores a switching program that switches the memory device from a power saving mode to a normal mode, and
   the processor is configured to switch the memory device to the normal mode by executing the switching program when the processor changes from the second state to the first state, and the memory device is in the power saving mode.

2. The device according to claim 1, wherein, in the fourth state, the state controller performs control to lower a voltage to be supplied to the processor.

3. The device according to claim 1, wherein, in the fourth state, the state controller performs control to stop oscillation of a high-frequency oscillator that generates a high-frequency clock representing a clock used by the processor in the first state.

4. The device according to claim 1, wherein, in the fourth state, the state controller performs control to stop power supply to a high-frequency oscillator that generates a high-frequency clock representing a clock used by the processor in the first state.

5. The device according to claim 3, wherein the high-frequency oscillator is a silicon oscillator.

6. The device according to claim 4, wherein the high-frequency oscillator is a silicon oscillator.

7. The device according to claim 1, wherein
   the memory device is a volatile memory, and
   in the fourth state, the state controller performs control to switch the memory device to a self-refresh state in which it is possible to hold on to data stored in the memory device but it is not possible to perform data reading or data writing.

8. The device according to claim 1, wherein
the memory device is a nonvolatile memory, and
in the fourth state, the state controller performs control to stop power supply to the memory device.

9. The device according to claim 1, wherein
the processor includes a cache memory, and
when switching the information processing device to the fourth state, the state controller writes data, which is stored in the cache memory but which has not been written in the memory device, in the memory device and then perform control to stop power supply to the cache memory.

10. The device according to claim 1, wherein
the processor includes a cache memory, and
in the fourth state, the state controller performs control to lower a voltage to be supplied to the cache memory than a voltage supplied when the processor is in the first state.

11. The device according to claim 1, wherein the peripheral device is either one of a storage device, a communication device, a display device, and an image capturing device.

12. The device according to claim 1, wherein the processor is configured to further execute a device controller controlling the peripheral devices,
upon receiving an input-output request from the processor, the device controller starts the operation for data transfer, and
when the operation for data transfer is completed, the device controller issues an interrupt as a notification to the processor.

13. The information processing device according to claim 1, further comprising:
a microcomputer configured to have a lower processing performance and a lower power consumption than the processor, wherein
the microcomputer is configured to perform an interrupt handling operation if the interrupt is received from any of the peripheral devices connecting thereto, and transmit the interrupt to the processor, and the processor is configured to return from the second state to the first state.

14. An information processing method employed in an information processing device including a memory device, a second memory, one or more peripheral devices, and a processor configured to execute a state controller, and to change between a first state, in which a command is executed by the processor, and a second state, in which an interrupt is awaited by the processor, the information processing method comprising:
switching, by the state controller, when the processor enters the second state and an operation for data transfer is being performed between at least one of the peripheral devices and the memory device, the information processing device to a third state, the third state being a state in which power consumption of the information processing device is lower than power consumption of the information processing device when the processor is in the first state; and
switching, by the state controller, when the processor enters the second state and an operation for data transfer is not being performed between any of the peripheral devices and the memory device, the information processing device to a fourth state, the fourth state being a state in which power consumption of the information processing device is lower than in the third state, and wherein
the memory device stores an operating system including the state controller and the second memory stores a switching program that switches the memory device from a power saving mode to a normal mode, and
the processor is configured to switch the memory device to the normal mode by executing the switching program when the processor changes from the second state to the first state, and the memory device is in the power saving mode.

15. The method according to claim 14, wherein, when the processor enters the second state, if the operation for data transfer is not being performed between any of the peripheral devices and the memory device, the switching includes performing control to lower a voltage to be supplied to the processor.

16. The method according to claim 14, wherein, when the processor enters the second state, if the operation for data transfer is not being performed between any of the peripheral devices and the memory device, the switching includes performing control to stop oscillation of a high-frequency oscillator that generates a high-frequency clock representing a clock used by the processor in the first state.

17. The method according to claim 14, wherein, when the processor enters the second state, the operation for data transfer is not being performed between any of the peripheral devices and the memory device, the switching includes performing control to stop power supply to a high-frequency oscillator that generates a high-frequency clock representing a clock used by the processor in the first state.

18. The method according to claim 16, wherein the high-frequency oscillator is a silicon oscillator.

19. The method according to claim 17, wherein the high-frequency oscillator is a silicon oscillator.

20. The method according to claim 14, wherein
the memory device is a volatile memory, and
when the processor enters the second state, the operation for data transfer is not being performed between any of the peripheral devices and the memory device, the switching includes performing control to switch the memory device to a self-refresh state in which it is possible to hold on to data stored in the memory device but it is not possible to perform data reading or data writing.

21. The method according to claim 14, wherein
the memory device is a nonvolatile memory, and
when the processor enters the second state, if the operation for data transfer is not being performed between any of the peripheral devices and the memory device, the switching includes performing control to stop power supply to the memory device.

22. The method according to claim 14, wherein
the processor includes a cache memory, and
when the processor enters the second state, if the operation for data transfer is not being performed between any of the peripheral devices and the memory device, the switching includes writing data, which is stored in the cache memory but which has not been written in the memory device, in the memory device and then the processor performs control to stop power supply to the cache memory.

23. The method according to claim 14, wherein
the processor includes a cache memory, and
when the processor enters the second state, if the operation for data transfer is not being performed between any of the peripheral devices and the memory device, the switching includes performing control to lower a voltage to be supplied to the cache memory below a voltage supplied to the cache memory when the processor is in the first state.

24. The method according to claim 14, wherein the peripheral device is either one of a storage device, a communication device, a display device, and an image capturing device.

25. The method according to claim 14, wherein the method further comprises: controlling a corresponding peripheral device, wherein upon receiving an input-output request from the processor, the controlling includes starting the operation for data transfer, and when the operation for data transfer is completed, the controlling includes issuing an interrupt as a notification to the processor.

* * * * *